(12) United States Patent  
Tobita et al.

(10) Patent No.: US 6,919,893 B2  
(45) Date of Patent: Jul. 19, 2005

(54) IMAGE EDITING APPARATUS, IMAGE EDITING METHOD, STORAGE MEDIUM, AND COMPUTER PROGRAM

(75) Inventors: Hiroaki Tobita, Tokyo (JP); Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 383 days.

(21) Appl. No.: 10/336,916

(22) Filed: Jan. 6, 2003

(65) Prior Publication Data

US 2003/0161014 A1 Aug. 28, 2003

(30) Foreign Application Priority Data

Jan. 7, 2002 (JP) ....................................... 2002-000945

(51) Int. Cl.[7] .............................................. G06T 15/00
(52) U.S. Cl. ....................... 345/473; 345/589; 345/590
(58) Field of Search ................................ 345/473, 474, 345/475, 589, 590, 591, 423, 582

(56) References Cited

U.S. PATENT DOCUMENTS

| | | | | | |
|---|---|---|---|---|---|
| H1506 H | * | 12/1995 | Beretta | ........................ | 345/591 |
| 5,673,401 A | * | 9/1997 | Volk et al. | ................... | 725/139 |
| 6,078,331 A | * | 6/2000 | Pulli et al. | .................... | 345/423 |
| 6,362,828 B1 | * | 3/2002 | Morgan | ....................... | 345/582 |

* cited by examiner

Primary Examiner—Phu K. Nguyen  
(74) Attorney, Agent, or Firm—Frommer Lawrence & Haug LLP; William S. Frommer

(57) ABSTRACT

In an image editing apparatus, a mouse and a display function as a drawing interface, such as a digital canvas, a palette, and a pen or a brush. A stroke input by a user by dragging the mouse is regarded as a hand-drawn operation with the pen or the brush. In the digital canvas, painting is performed by using inks having various attributes and activities such as texture and animation, based on the stroke input by the user.

28 Claims, 53 Drawing Sheets

FIG. 12
 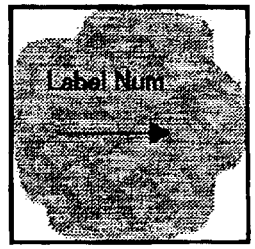
PAINT  ALLOCATE LABELING VALUE AND VECTOR
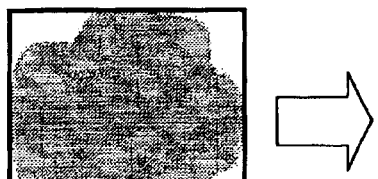 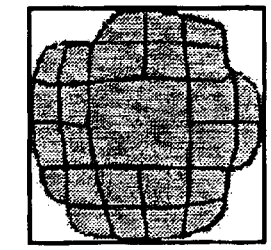 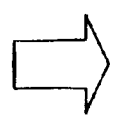 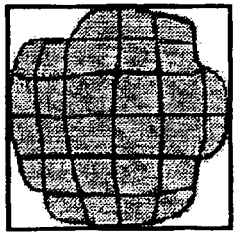
INTERPOLATE MESH  SEGMENTALIZE CELL

FIG. 13

```
Struct Painted_area {
   int labeling_num;  //LABELING VALUE OF PAINTED AREA
   List <int> vector_x;
   List <int> vector_y;
   List <pixel> mesh_data;
};
```

FIG. 14

```
Struct pixel {
  List<int> active_ink;
  int red[4];    // color information (0-255)
  int green[4];
  int blue[4];
  int alpha[4];
  float x[4];    // position information
  float y[4];
  float z[4];
  float u[4];    // texture information
  float v[4];
  char texture_name[256];

int vx[2];    // INFORMATION OF DIRECTION AND SPEED
  int vy[2];

pixel parent;  // FORM A SCENE GRAPH WITH INK FOR INCREASING FINENESS
  pixel child[4];
};
```

FIG. 15

```
struct active_ink {
    int InkID;           // MANAGE INK ID IN LIST
    int Technical_count[2];   // [0] COUNT OF INK FOR INCREASING OR DECREASING THICKNESS
                              // [1] COUNT OF INK FOR INCREASING OR DECREASING FINENESS
};
```

FIG. 26
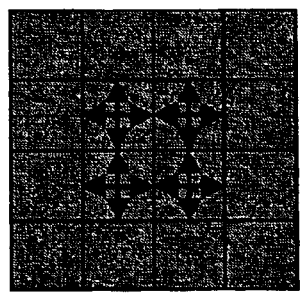  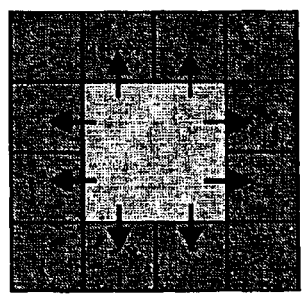
(a) NORMAL STATE    (b) INK FOR DECREASING
                        FINENESS IS USED
INCREASE
THE SIZE OF
DRAWING UNIT
 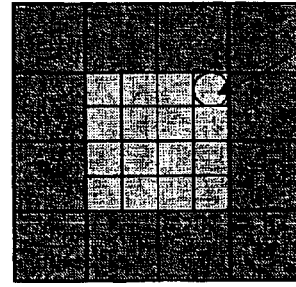 
INTERPOLATE
MESH
(c) INK FOR INCREASING
    FINENESS IS USED

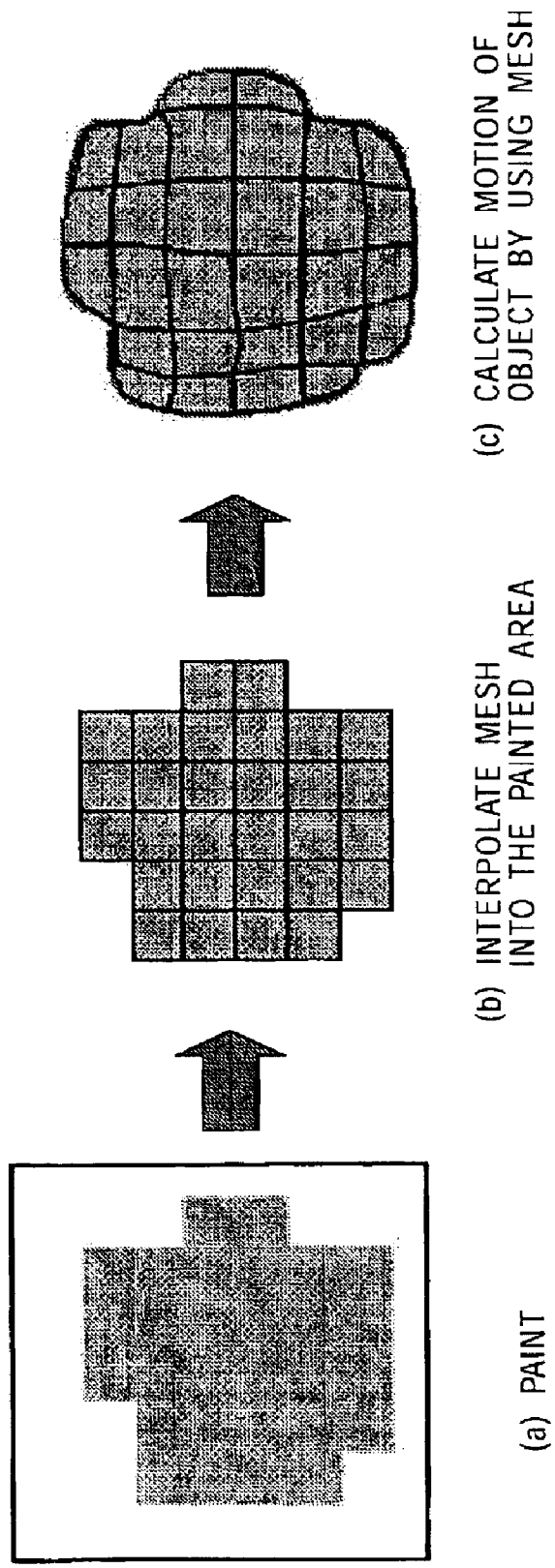

(a)

(b)

(c)

(d)

FIG. 41
(a) 
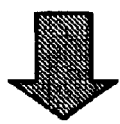
(b) 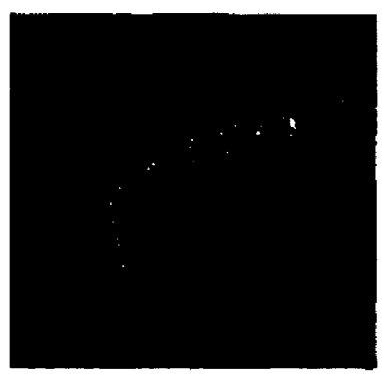
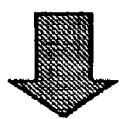
(c) 

FIG. 44
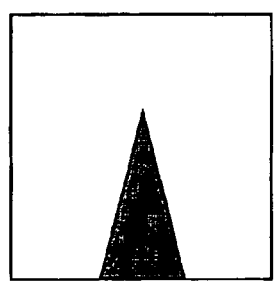
(a)
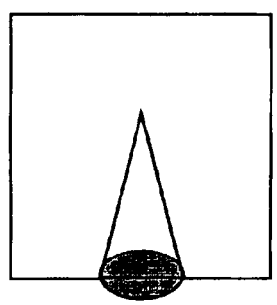
(b)
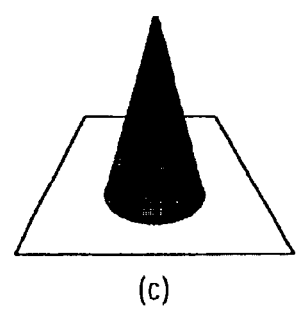
(c)

IMAGE EDITING APPARATUS, IMAGE EDITING METHOD, STORAGE MEDIUM, AND COMPUTER PROGRAM

CROSS REFERENCE TO RELATED APPLICATIONS

The present document claims priority to Japanese Priority Document JP 2002-000945, filed in the Japanese Patent Office on Jan. 7, 2002, the entire contents of which are incorporated herein by reference to the extent permitted by Low.

BACKGROUND OF THE INVENTION

1. Field of the Invention

The present invention relates to an image editing apparatus, an image editing method, a storage medium, and a computer program, for creating and editing a two-dimensional or three-dimensional image in a computer system. In particular, the present invention relates to an image editing apparatus, an image editing method, a storage medium, and a computer program, for creating and editing a two-dimensional or three-dimensional image in a computer system in accordance with a hand-drawn stroke input by using a mouse or the like.

More specifically, the present invention relates to an image editing apparatus, an image editing method, a storage medium, and a computer program, for providing an intuitive drawing interface which performs a pseudo drawing operation in which a pseudo water color or oil color is painted on a canvas in a digital space by regarding a stroke input by a user with a mouse as a hand-drawn operation with a pen or a brush. In particular, the present invention relates to an image editing apparatus, an image editing method, a storage medium, and a computer program, for painting on a canvas in a digital space by using ink which has various attributes and activities, such as texture and animation, in accordance with a stroke input by a user.

2. Description of the Related Art

With recent developments in a semiconductor technology and an information technology, relatively cheap and high-performance computer systems have become widespread in offices and homes. In this type of computer systems, various applications can be started under an execution environment provided by an operating system (OS).

Applications used in the computer system include a word processor, spreadsheet, database, communication, and graphics. For example, by using a computer system having increased computing ability and drawing function, highly realistic two- or three-dimensional graphics may be created relatively easily and also drawing and image-deformation processing may be performed.

Most drawings in the real world, such as water colors and oil colors, are drawn by making predetermined strokes on a canvas by using a brush with a desired color. On the other hand, in order to create drawing in a computer system, the user inputs strokes on a display screen by using a mouse cursor having a function of a brush so as to create a linear drawing. That is, by regarding a stroke made by a mouse operation as a hand-drawn operation using a pen or a brush, an intuitive drawing interface for performing pseudo drawing in which a pseudo water color or oil color is painted on a canvas in a digital space can be provided.

In drawing in the real world, a brush is dipped in color and the color itself is painted on a canvas by a stroke. In this case, individual paints or inks put on a palette may be used for painting on a canvas. Also, the paints or inks may be mixed and the tone may be adjusted on the palette. Patterns created on the canvas can be sequentially obtained by strokes made by a painter, and a pattern itself cannot be directly painted on the canvas. Further, however dynamic the expression of the drawing, the pattern itself on the created drawing is static or fixed and does not change temporally or spatially on the canvas.

On the other hand, in a canvas in a digital space, texture as well as colors defined in the RGB color space can be directly applied to the canvas by drawing computing of a computer. Furthermore, painting can be performed by using inks having various attributes and activities such as animation.

However, since existing image editing systems support various depictions of three-dimensional computer graphics, the configuration of a graphical user interface (GUI) is complicated. Also, operations are applied to polygons and their tops, and thus the system cannot be easily operated. Also, attributes are realized by setting parameters and describing a script. Thus, it is difficult for beginners to add animation and attributes.

Also, in the existing image editing systems, the texture of a drawing object is depicted by texture mapping or material. On the other hand, animation of water, cloud, and so on is realized by using a particle system. Although both of texture and animation are attributes applied to the surface of the object, each of them is managed as separate data. Therefore, the operation system for using these attributes is not integrated and the image editing system cannot be easily used.

Further, in the existing image editing systems, previewing or rendering must be performed after setting parameters or describing script, in order to check attributes actually set to the object.

Further, in the existing image editing systems, animation and attributes are depicted by setting parameters or describing script, and thus a plurality of inks cannot be mixed. Also, various parameters must be operated in order to set or subtly adjust the attributes of animation.

SUMMARY OF THE INVENTION

An object of the present invention is to provide an excellent image editing apparatus, image editing method, storage medium, and computer program, for creating and editing a two-dimensional or three-dimensional image in a computer system in accordance with a hand-drawn stroke input by using a mouse or the like.

Another object of the present invention is to provide an excellent image editing apparatus, image editing method, storage medium, and computer program, for providing an intuitive drawing interface which performs a pseudo drawing operation in which a pseudo water color or oil color is painted on a canvas in a digital space by regarding a stroke input by a user with a mouse as a hand-drawn operation with a pen or a brush.

Another object of the present invention is to provide an excellent image editing apparatus, image editing method, storage medium, and computer program, for painting on a canvas in a digital space by using inks which have various attributes and activities, such as texture and animation, in accordance with a stroke input by a user.

Another object of the present invention is to provide an excellent image editing apparatus, image editing method, storage medium, and computer program, in which animation and various attributes can be added to a drawing object by an easy and intuitive GUI operation, without technical knowledge such as setting of parameters and description of script.

The present invention has been made in view of the above described objects. According to a first aspect of the present invention, an image editing apparatus or method for drawing on a display in accordance with a hand-drawn stroke input by a user is provided. The apparatus or method comprises a drawing interface unit or step for displaying on the display an ink area provided with at least one usable ink and a work area for performing drawing; an input unit or step for inputting coordinates indicated by the user on the display; and a drawing processing unit or step for processing a drawing object in the work area based on the input by the user. The ink area includes color inks defined in the RGB color space and attribute inks having an animation function in which the drawing object continuously changes according to set attribute parameters. The drawing processing unit or step associates an ink selected by using the input unit or step in the ink area with the hand-drawn stroke to be input by using the input unit or step, associates the hand-drawn stroke input to the work area by using the input unit or step with the drawing object, and draws the drawing object by using the associated ink to paint the drawing object.

Herein, the attribute inks include a natural-phenomenon ink for depicting a dynamic natural phenomenon which continuously changes in accordance with the attribute parameters, such as water, cloud, snow, flame, and smoke, and other inks having active attributes.

According to the image editing apparatus or the image editing method of the first aspect of the present invention, general user interfaces such as a mouse and a display function as a drawing interface corresponding to tools such as a digital canvas, a palette, and a pen or a brush.

The hand-drawn stroke input by the user by a drag operation with the mouse can be regarded as a drawing operation using a pen or a brush. Also, painting can be performed by using inks having various attributes and activities such as texture and animation in accordance with the stroke input by the user on the digital canvas.

In the drawing interface of the present invention, the color inks defined in the RGB color space, textured ink depicting the texture and material of the object, natural phenomenon ink having an animation function for continuously changing the drawing object according to the attribute parameters, and other types of attribute ink are integrally dealt in the ink area.

With this configuration, a drawing operation of selecting an ink and then painting or pasting the ink can be smoothly performed, thereby providing excellent usability.

By just making a hand-drawn stroke in the work area corresponding to the digital canvas, animation or other attributes can be added to the drawing object. Therefore, technical knowledge and special operations, such as setting of parameters and description of script, are not necessary.

An animation function is immediately displayed by selecting an attribute ink and then inputting a hand-drawn stroke. Thus, the animation can be checked while editing an image.

The drawing interface unit or step may further display a palette area for mixing a plurality of inks.

In this case, the drawing processing unit or step associates an ink selected by using the input unit or step in the ink area or the palette area with the hand-drawn stroke to be input by using the input unit or step and sequentially associates the hand-drawn stroke made by using the input unit or step in the palette area with the drawing object, thereby mixing two or more inks associated with the same drawing object.

For example, two or more attribute inks may be mixed by calculating the average of the attribute parameters of each attribute ink.

With this arrangement, the user need not operate parameters and description of script in order to mix inks, and a slight adjustment of inks can be achieved simply by an intuitive GUI operation, in which an attribute ink is sequentially added to the palette.

Also, the drawing processing unit or step may form a mesh by dividing the drawing object in the work area and/or the palette area into minute drawing units and manage ink information for each of the drawing units.

In this case, for example, a cellular automaton can be applied to drawing processing for painting the attribute ink on the object. That is, by calculating an interaction such as an attractive or repulsive force between adjoining drawing units and by changing the attribute parameters of each drawing unit based on the calculation result, the animation function of the attribute ink can be automatically generated.

Alternatively, a particle system may be applied in order to process the object with the attribute ink. That is, by emitting particles corresponding to the attribute ink from an emitter provided in each drawing unit, the animation function of the attribute ink can be calculated.

When a particle system is applied, the particles emitted from the emitter, direction and angle of emission, emission speed, gravity and an electrostatic force including attractive and repulsive forces applied to the particles, a swirl effect, a wind effect, a turbulence effect, and the duration, characteristics for the forces, size, color, transparency, and texture of each particle can be set based on the attribute parameters of the attribute ink, and also an obstacle can be provided in a region where the particles act.

A technical ink for adjusting the thickness of the attribute ink may be provided in the ink area. In this case, an attractive force is strengthened or a repulsive force is weakened between the adjoining drawing units so as to calculate the attribute parameters when a technical ink for increasing the thickness of the attribute ink is applied to the drawing object. On the other hand, an attractive force is weakened or a repulsive force is strengthened between the adjoining drawing units so as to calculate the attribute parameters when a technical ink for decreasing the thickness of the attribute ink is applied to the drawing object. Accordingly, the attribute ink can be subtly adjusted.

Alternatively, a technical ink for adjusting the fineness of the attribute ink may be provided in the ink area. In this case, a plurality of adjoining drawing units are combined into one drawing unit when a technical ink for decreasing the fineness of the attribute ink is applied to the drawing object. On the other hand, one drawing unit is divided into a plurality of drawing units when a technical ink for increasing the fineness of the attribute ink is applied to the drawing object. Accordingly, the attribute ink can be subtly adjusted.

The drawing processing unit or step may add depth to the drawing object created in the work area so that the drawing object created in the two-dimensional work area is transformed to a three-dimensional drawing object.

For example, each of the two-dimensional drawing units forming the drawing object created in the work area may be converted to a three-dimensional Voxel. In this case, by applying calculation for generating an animation function, such as a cellular automaton or a particle system, for individual Voxels to which the attribute ink is applied, the animation function of the attribute ink can be extended to three-dimensional space.

The drawing processing unit or step may change the attribute parameters of the attribute ink associated with the drawing object based on the stroke input by using the input unit, for example, in accordance with the interaction using the mouse. In this case, a subtle adjustment of the attribute ink can be easily performed by a GUI operation without technical operations, such as setting of parameters and description of script. Accordingly, an increased usability can be realized.

According to a second aspect of the present invention, a storage medium for physically storing computer readable software, which performs in a computer system an image editing process for drawing on a display in accordance with a hand-drawn stroke input by a user, is provided. The computer software comprises a drawing interface displaying step for displaying on the display an ink area provided with at least one usable ink and a work area for performing drawing; an input step for inputting coordinates indicated by the user on the display; and a drawing processing step for processing a drawing object in the work area based on the input by the user. The ink area includes color inks defined in the RGB color space and attribute inks having an animation function in which the drawing object continuously changes according to set attribute parameters. In the drawing processing step, an ink selected in the ink area in the input step is associated with the hand-drawn stroke to be input in the input step, the hand-drawn stroke input to the work area in the input step is associated with the drawing object, and the drawing object is drawn by using the associated ink so that the drawing object is painted.

The storage medium according to the second embodiment of the present invention is a storage medium for providing computer-readable software to a multi-purpose computer system which can execute various program code. As the storage medium, a removable storage medium, such as a digital versatile disc (DVD), a compact disc (CD), a flexible disc (FD), or a magneto-optical disc (MO), can be used. Alternatively, the computer software can be provided to a specific computer system through a transmission medium, such as a wired or wireless network.

The storage medium according to the second aspect of the present invention defines the structural or functional cooperative relationship between the computer software and the storage medium for realizing the function of predetermined computer software in the computer system. In other words, by installing the predetermined computer software into the computer system through the storage medium according to the second aspect of the present invention, the cooperative function can be realized in the computer system, and thus the same operation and advantage as those of the image editing apparatus or method according to the first aspect of the present invention can be obtained.

According to a third aspect of the present invention, a computer program for performing in a computer system an image editing process for drawing on a display in accordance with a hand-drawn stroke input by a user, is provided. The computer program comprises a drawing interface displaying step for displaying on the display an ink area provided with at least one usable ink and a work area for performing drawing; an input step for inputting coordinates indicated by the user on the display; and a drawing processing step for processing a drawing object in the work area based on the input by the user. The ink area includes color inks defined in the RGB color space and attribute inks having an animation function in which the drawing object continuously changes according to set attribute parameters. In the drawing processing step, an ink selected in the ink area in the input step is associated with the hand-drawn stroke to be input in the input step, the hand-drawn stroke input to the work area in the input step is associated with the drawing object, and the drawing object is drawn by using the associated ink so that the drawing object is painted.

The computer program according to the third aspect of the present invention defines a computer-readable computer program for performing a predetermined process in the computer system. In other words, by installing the computer program according to the third aspect of the present invention into the computer system, the cooperative function can be realized in the computer system, and thus the same operation and advantage as those of the image editing apparatus or method according to the first aspect of the present invention can be obtained.

Further objects, features, and advantages of the present invention will become apparent from the following description of the preferred embodiment with reference to the attached drawings.

BRIEF DESCRIPTION OF THE DRAWINGS

FIG. 12 shows a process of dynamically generating a mesh in a painted area in the work area;

FIG. 13 shows the data structure of a mesh information block;

FIG. 14 shows the data structure of a data block mesh__data for managing drawing information of each drawing unit forming a mesh;

FIG. 15 shows the data structure of a data block for managing the information of an attribute ink registered in mesh__data;

FIG. 26 shows an example of the function of the count value Technical_count [1] of the technical ink indicating the fineness of the attribute ink;

FIG. 30 illustrates a painting function using a cellular automaton;

FIG. 41 shows a process of drawing with a smoke ink, which is a natural-phenomenon ink, by using a particle system;

FIG. 44 shows a process in which a depth component is added to a two-dimensional drawing object created by hand-drawn strokes in the work area so as to create a three-dimensional drawing object;

DESCRIPTION OF THE PREFERRED EMBODIMENT

Hereinafter, an embodiment of the present invention will be described with reference to the drawings.

A. System Configuration

Figure 1:
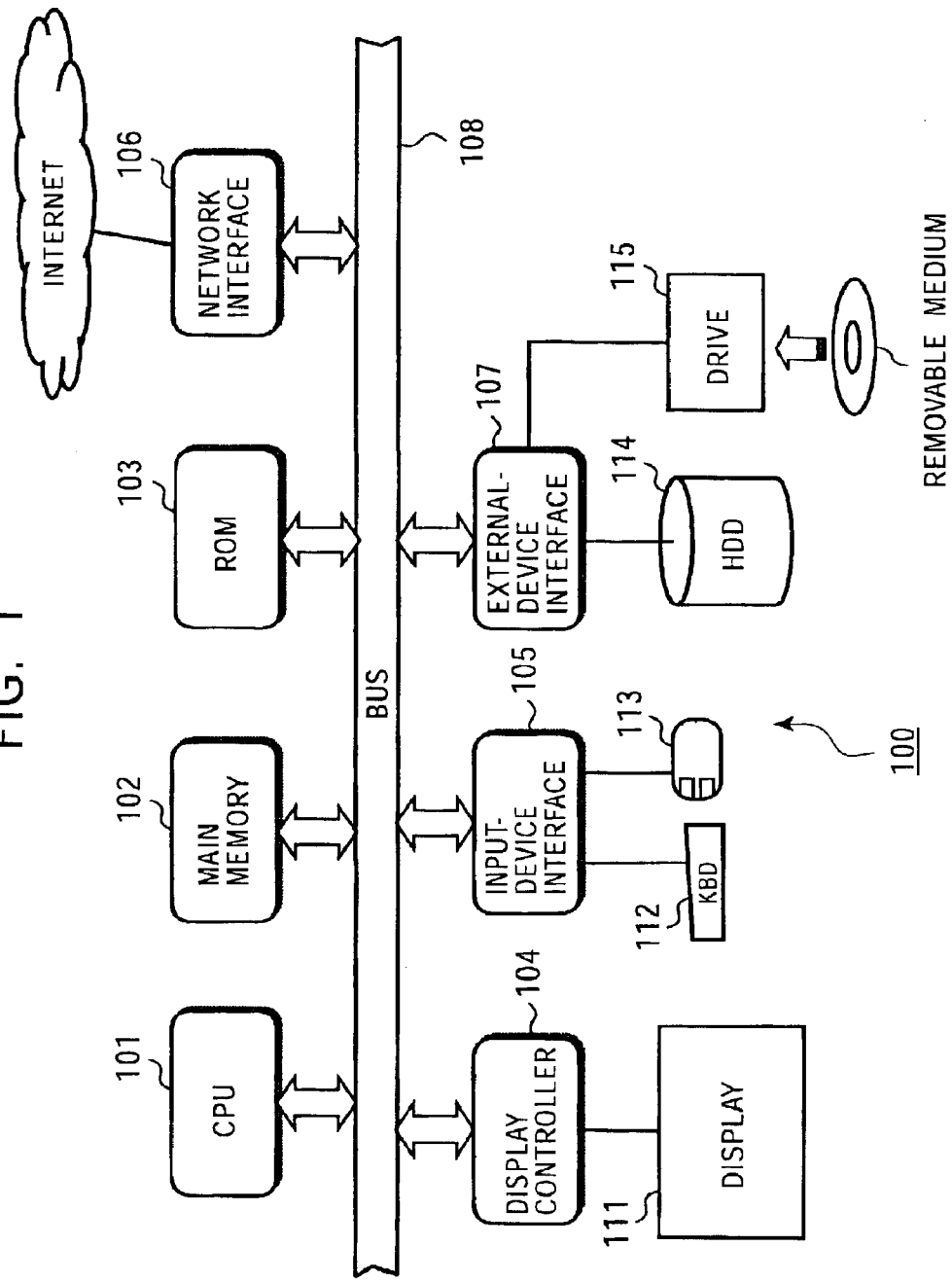
FIG. 1 is a schematic view showing the hardware configuration of an image editing apparatus according to an embodiment of the present invention.

FIG. 1 is a schematic view showing the hardware configuration of an image editing apparatus 100 according to the embodiment of the present invention. Each part of the apparatus will be described with reference to FIG. 1.

A central processing unit (CPU) 101 serving as a main controller executes various applications under the control of an operating system (OS). The operating system preferably supports a bit-map display function and provides a graphical user interface (GUI) environment based on coordinate indicating input by a mouse or the like.

The CPU 101 can execute, for example, an image editing application which provides an intuitive drawing interface for performing pseudo drawing in which a pseudo water color or oil color is painted on a canvas in a digital space (hereinafter referred to as a digital canvas). With this image editing application, the drawing interface can be provided by using general user interfaces such as a mouse and a display so that painting can be performed by using inks which have various attributes and activities such as texture and animation.

As shown in FIG. 1, the CPU 101 is connected to other devices (described later) through a bus 108.

A main memory 102 is a storage device used for storing program code executed by the CPU 101 and temporarily storing work data during an operation, such as drawing data.

A semiconductor memory such as a dynamic RAM (DRAM) is used as the main memory 102.

A read only memory (ROM) 103 is a semiconductor memory for storing data permanently. For example, a power-on self test (POST) and a basic input/output system (BIOS), which is a program for controlling hardware input/output, are written in the ROM 103.

A display controller 104 is a dedicated controller for actually processing draw commands generated by the CPU 101. Drawing data processed by the display controller 104 is first written into a frame buffer (not shown) and is then output to a display 111. In the embodiment, the display controller 104 preferably supports a bit-map display function so that a painting operation on the digital canvas can be performed more comfortably.

The display 111 visually feeds back information input by the user, the processing result thereof, or system messages such as error messages to the user. In the embodiment, the display 111 displays the digital canvas and a palette and includes a work area for painting on the canvas. This will be described later.

An input-device interface 105 is used for connecting input devices, such as a keyboard 112 and a mouse 113, to the image editing apparatus 100.

The keyboard 112 and the mouse 113 are used for obtaining data or commands input by the user and supplying them to the system. When a key is input by using the keyboard 112 or when coordinate indicating input, such as click or drag and drop, is performed by using the mouse 113, an interrupt request using a predetermined interrupt level is generated so that the CPU 101 performs interrupt handler corresponding to the interrupt level. The interrupt handler converts data input by the user to a message for a corresponding starting application, such as the image editing application. Of course, coordinate indicating devices other than the mouse 113, such as a digitizer/tablet and an input pen (not shown), can be applied to the image editing apparatus 100.

In the embodiment, a stroke input by the user by a drag operation of the mouse 113 can be regarded as a hand-drawn operation with a pen or a brush. On a digital canvas, pseudo drawing processing, in which a pseudo water color or oil color is painted, is performed based on the stroke, and the processing result is output to the display 111. In this case, the mouse 113 and the display 111 function as drawing interfaces such as a digital canvas, a palette, and a pen or a brush.

A network interface 106 is used for connecting the system 100 to a local network such as a local area network (LAN) or to a wide area network such as the Internet in accordance with a predetermined communication protocol such as Ethernet.

A plurality of host terminals (not shown) are connected to each other in a transparent state on the network so that a distributed computing environment is established. Software programs and data content can be distributed over the network. For example, the above-described image editing application can be downloaded through the network. Also, drawing information generated by using the image editing application can be distributed through the network to other host terminals.

Further, two or more host terminals which are connected through the network in a transparent state can cooperate with each other so as to provide a drawing interface and to support painting on a digital canvas. For example, one host terminal can provide a canvas and another host terminal can provide a palette used for selecting an ink or adjusting the tone (described later).

An external-device interface 107 is used for connecting external devices such as a hard disk drive (HDD) 114 and other type of medium drive 115 to the image editing apparatus 100.

The HDD 114 is an external storage device (known) in which a magnetic disk serving as a storage carrier is installed, and is superior to other external storage devices in terms of storage capacity and data transfer rate. Storing a software program in an executable state in the HDD 114 refers to installation of program into a system. Generally, the HDD 114 stores program code of an operating system which should be executed by the CPU 101, application programs, and device drivers in a nonvolatile manner. For example, the above-described image editing application can be installed into the HDD 114. Also, drawing information generated by using the image editing application may be stored in the HDD 114.

A removable medium such as a compact disc (CD), a magneto-optical disc (MO), or a digital versatile disc (DVD) is loaded into the drive 115, which accesses the data recording surface of the medium loaded therein.

Removable media are mainly used to back up software programs or data files as computer-readable data and to move (that is, sell, circulate, or distribute) the data between systems. For example, the above-described image editing application can be physically circulated or distributed to a plurality of apparatuses by using the removable media. Also, the removable media are used for permanently archiving drawing information generated by using the image editing application or moving the information to other apparatuses.

As the image editing apparatus 100 shown in FIG. 1, a compatible machine or a successor of a PC/AT computer made by IBM Corporation can be used. Of course, a computer having another architecture can be applied as the image editing apparatus 100 according to the embodiment.

B. Drawing Interface

The image editing apparatus 100 according to the embodiment can provide an intuitive drawing interface for performing pseudo drawing in which a pseudo water color or oil color is painted on a digital canvas, by starting a predetermined application.

The drawing interface is configured by combining, for example, the mouse 113 and the display 111, and includes a digital canvas, a palette, and a pen or a brush. On the digital canvas, inks having various attributes and activities such as texture and animation can be used as well as inks which are simply defined in the RGB color space.

Figure 2:
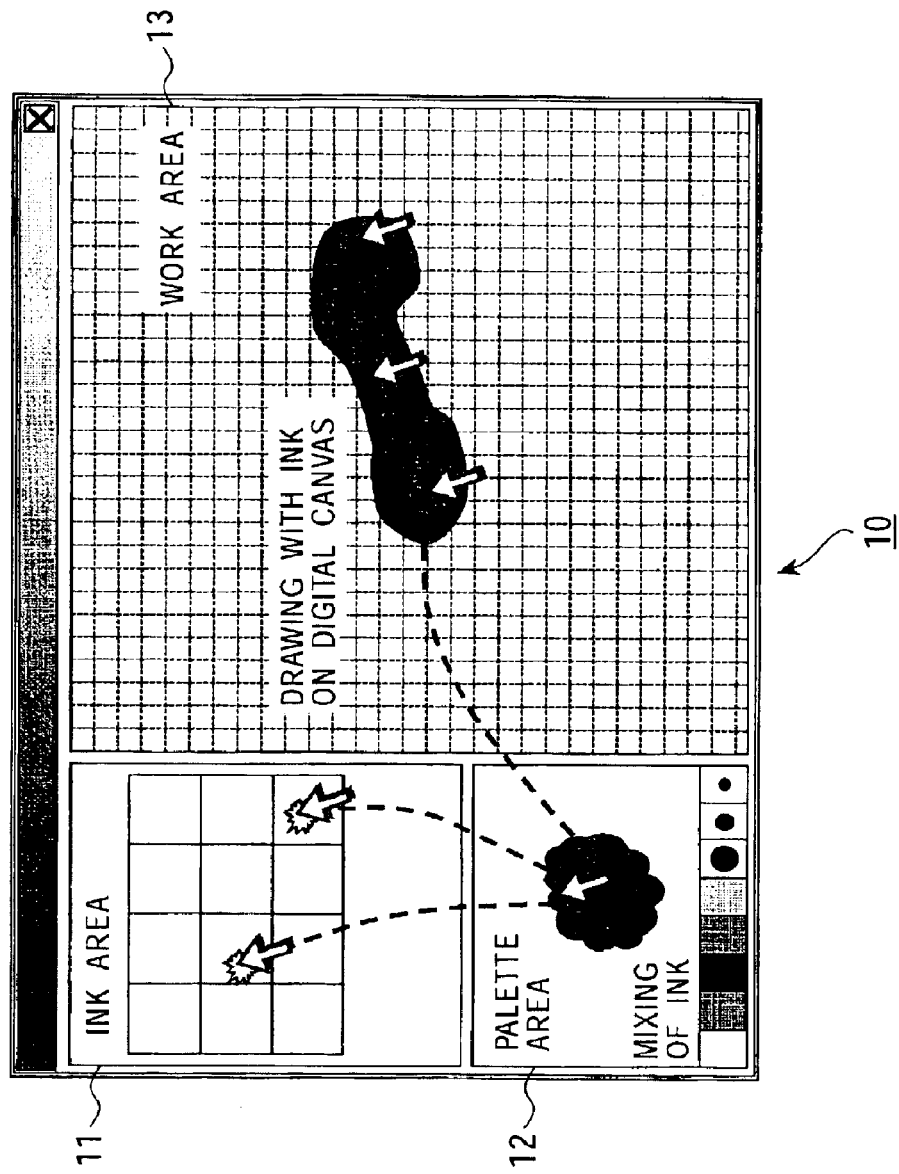
FIG. 2 is an example of the configuration of a drawing interface displayed on a display.

FIG. 2 is an example of the configuration of a drawing interface 10 on the display 111. In this case, a bit-map display and a GUI environment are provided.

As shown in FIG. 2, the drawing interface 10 includes an ink area 11 which is a GUI for specifying the ink or color to be used; a palette area 12 which is a GUI for mixing a plurality of colors, adjusting tones, adjusting the thickness of ink, and changing the line thickness; and a work area 13 corresponding to a drawing area, that is, a canvas used for painting with a brush.

The ink area 11 has a menu including color inks and textures defined in the RGB color space, natural-phenomenon ink (active ink) for depicting a natural phenomenon (or ever-changing dynamic phenomenon), and textured ink for depicting the texture of objects. The user can specify an ink by clicking a desired color in the ink area 11.

The natural-phenomenon or active ink is used for depicting an ever-changing dynamic phenomenon, such as a natural phenomenon including water, cloud, snow, flame, and smoke.

A motion (animation) depicting a natural phenomenon using the active ink can be created by using such method as a cellular automaton or a particle system. The animation function using these methods can be realized by dividing a drawing object into a mesh formed by many minute drawing units (cells) and by performing management of drawing information and calculation of the animation for each drawing unit (described later).

The textured ink is used for depicting the texture of clothes, rubber, metal, glass, ground, or a pattern. Each type of textured ink has one or more parameters for specifying attributes. Thus, for example, a plurality of types of water ink exist.

Hereinafter, the natural-phenomenon ink (active ink) and the textured ink are called attribute inks.

In addition, the ink area 11 has technical ink. The technical ink is used for changing the animation function which depends on the attribute parameters of the attribute ink. With this technical ink, the thickness of the attribute ink or the fineness of the mesh can be adjusted.

Also, rubber ink for deforming an object may be provided as technical ink. For example, by applying the rubber ink to the portion of a drawing object to be deformed, that portion can be arbitrarily extended or contracted. Generally, an operation for deforming a three-dimensional object must be performed with respect to the top of a polygon forming the model. In the drawing interface 10 according to the embodiment, such an operation can be entrusted to the internal processing of the system, and the user can deform the three-dimensional object by performing an intuitive mouse operation, that is, by selecting a type of attribute ink for deforming the object and then applying the selected ink to a predetermined portion and freely dragging that portion.

Such a technical ink can be mixed with the attribute ink in the palette area 12 so that the mixed ink can be used for drawing in the work area 13.

In the palette area 12, a plurality of inks which have been specified in the ink area 11 can be mixed, the tone can be adjusted, the thickness of ink can be adjusted, and the thickness of the line can be changed.

The work area 13 corresponds to a digital canvas on which ink is applied with a brush. By performing a drag-operation with the mouse 113 in the work area 13, that stroke generates a drawing-operation area, that is, an area painted with a selected ink. On the digital canvas, a three-dimensional object can be read into the canvas and ink can be applied thereto, as well as to a two-dimensional plane. In FIG. 2, a grid is provided on the work area 13 so that a hand-drawn operation by the mouse 113 can be easily performed. However, the grid is not an essential element of the present invention.

Basically, the user performs a GUI operation with the mouse 113 so as to select a color ink or an attribute ink in the ink area 11 and to mix the color ink and the attribute ink in the palette area 12. Then, the user paints a drawing object in the work area 13 by using the color ink and the attribute ink.

In the palette area 12 and the work area 13, ink is applied to a mesh, which is a drawing object divided into minute drawing units (cells). A cellular automaton or a particle system is applied to each drawing unit of the area to which an active ink, such as a natural-phenomenon ink, is applied, and calculations for an animation function are performed.

When the application is started, mesh information in the palette area 12 and the work area 13 is initialized. Then, the animation function for each frame is calculated and a scene is rendered based on the calculation result, these processes being performed as internal processing of the system. As a result, colors and patterns depicting a natural phenomenon are displayed in the form of an active animation on the display 111. That is, an animation function can be immediately realized simply by inputting a hand-drawn stroke in the palette area 12 or the work area 13. Thus, the user can check the animation while performing a drawing operation, without previewing the results. The animation function realized by the attribute ink will be described later.

Figure 3:
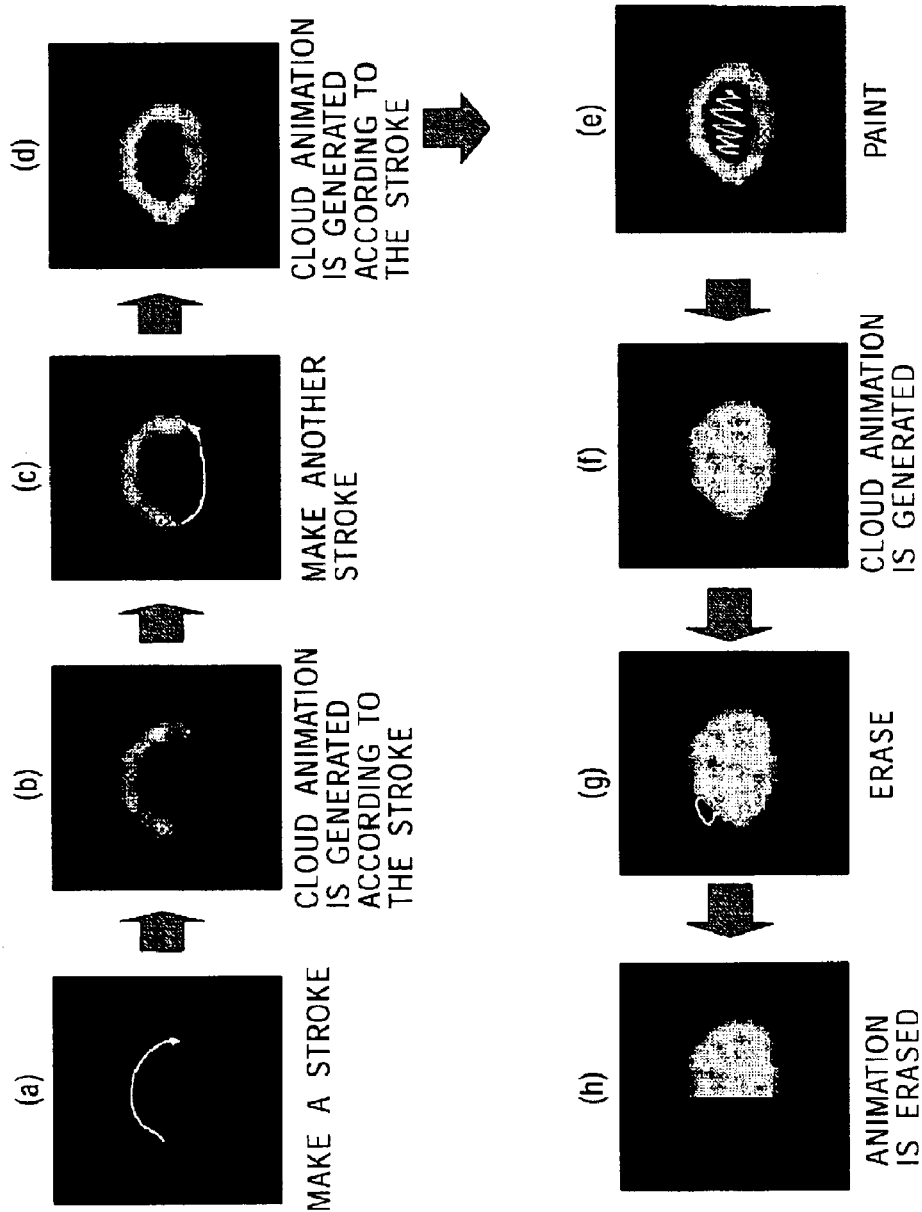
FIG. 3 shows a process of painting with a cloud ink as a natural-phenomenon ink in a work area.

FIG. 3 shows an example of a user operation in the drawing interface 10. In this example, the user paints with a cloud ink, which is a natural-phenomenon ink, in the work area 13.

First, the user selects the cloud ink in the ink area 11 and performs a drag operation by using a coordinate indicating device, such as the mouse 113, in the work area 13 so as to make a stroke ((a) in FIG. 3). Accordingly, a drawn area of the cloud ink is generated in accordance with the hand-drawn stroke (in accordance with a line of predetermined type and thickness). For example, an animation of a part of a cloud is generated by a first stroke ((b) in FIG. 3), and an animation of another part of the cloud is generated by another stroke ((c) and (d) in FIG. 3).

Next, by performing a mouse operation so as to fill the area inside the line drawn with the cloud ink ((e) in FIG. 3), that area is painted with a cloud animation so that a large cloud animation is generated ((f) in FIG. 3).

Of course, by specifying a tool such as an eraser ((g) in FIG. 3), the cloud animation can be erased by a mouse operation ((h) in FIG. 3).

Figure 4:
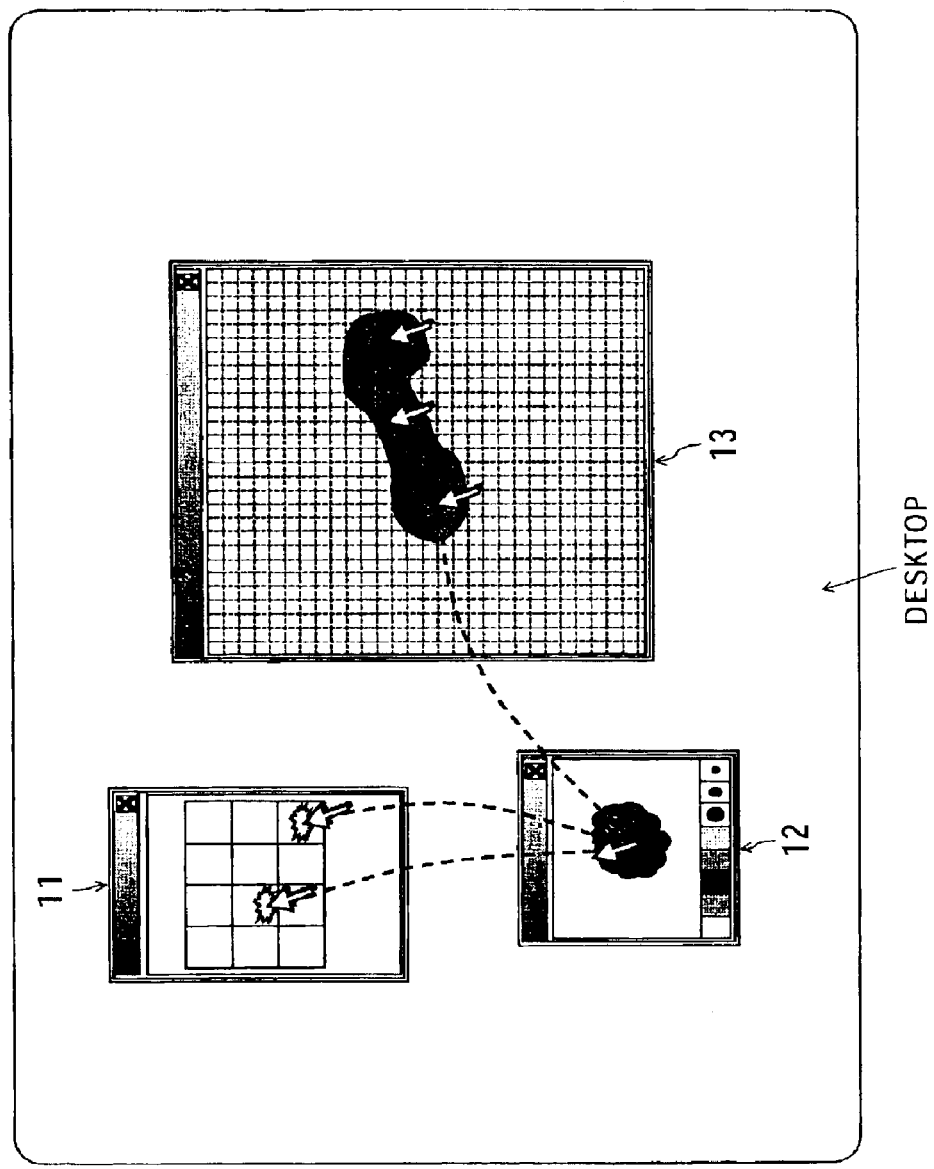
FIG. 4 shows a modification of the drawing interface.

In FIG. 2, the drawing interface 10 includes a single window formed by integrating the ink area 11, the palette area 12, and the work area 13. However, the present invention is not limited to such a configuration. For example, as shown in FIG. 4, each of the areas 11 to 13 may serve as an independent window, which is placed at an arbitrary position on the desktop. In this case, the user can move each window of the areas 11 to 13 to a desired position by a drag operation so that he or she can use the drawing interface 10 comfortably.

Figure 5:
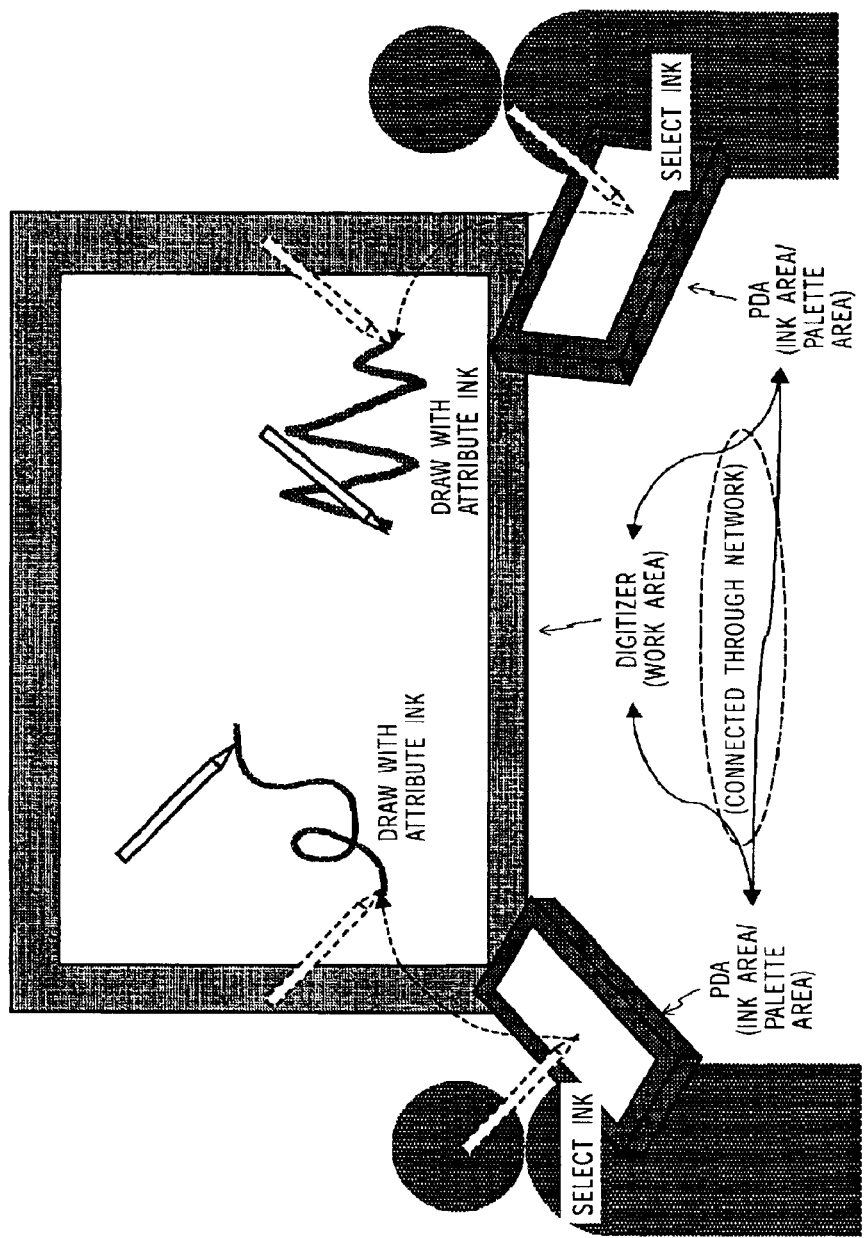
FIG. 5 shows another modification of the drawing interface.

FIG. 5 shows a modification of the drawing interface 10. Two or more host terminals connected through a network (for example, a wireless communication network such as IEEE 802.11 or short-range wireless data communication such as Bluetooth) in a transparent state can cooperate with each other so as to provide a drawing interface and to support painting performed on a digital canvas.

In the example shown in FIG. 5, a host terminal having a relatively large display provides a large work area 11 to which two or more users can input a stroke at the same time. Another host terminal is formed by a compact palm-top information processing terminal operated by a user, such as a personal digital assistant (PDA), and provides the ink area 11 and the palette area 12 for selecting ink and adjusting the tone. These host terminals are mutually connected through a wired or wireless local area network.

Preferably, the display of each host terminal is a digitizer/tablet combination display which includes a pen-input function. With this configuration, the user can select ink by performing a pen-operation on his or her host terminal and then perform painting by inputting strokes with the pen in the work area 13 of the large display.

Likewise, another user can also select ink by performing a pen-operation on his or her host terminal and then perform painting by inputting strokes with the pen in the work area 13 of the large display. In this case, information of the attribute ink selected by the user in the ink area or the palette area of the PDA is transferred to the host terminal which provides the work area through a network, and thus an animation function in accordance with the above-described hand-drawn strokes can be realized. In other words, collaboration by a plurality of users is possible by using the drawing interface shown in FIG. 5.

Now, features of the drawing interface 10 according to the embodiment are described.

(1) Mixing of Attribute Inks on the Palette

In the embodiment, painting can be performed on the digital canvas with attribute inks, such as a natural-phenomenon ink for dynamically depicting a natural phenomenon and a textured ink for depicting the texture of clothes, rubber, metal, glass, ground, and a pattern, by using the computing function and various drawing functions of a computer.

Further, a plurality of types of attribute ink can be mixed on the palette 12 so as to paint on the digital canvas. For example, a water ink and a flame ink can be mixed. Although the mixture of water and flame is impossible in the natural world or the real world, a virtual phenomenon can be created based on the attribute parameters of each ink in a virtual world.

Also, inks can be diluted and then mixed. By using this method, a slightly watery texture can be realized.

Further, a normal color ink defined in the RGB color space can be mixed with an attribute ink. For example, a green ink can be mixed with a flame ink, or a red ink can be mixed with a cloud ink in the palette area 12. Accordingly, a green flame or a red cloud can be created on the digital canvas.

The function of mixing of attribute inks can be dynamically realized by obtaining the average (or weighted average) of attribute parameters of the attribute inks to be mixed.

Alternatively, combinations of attribute inks may be defined in advance based on phenomena associated with a natural phenomenon depicted with each attribute ink (for example, what happens if water is thrown on flame) so as to establish a rule base. When mixing of attribute inks is instructed in the palette area 12, an attribute ink selected from the rule base can be used.

Figure 6:
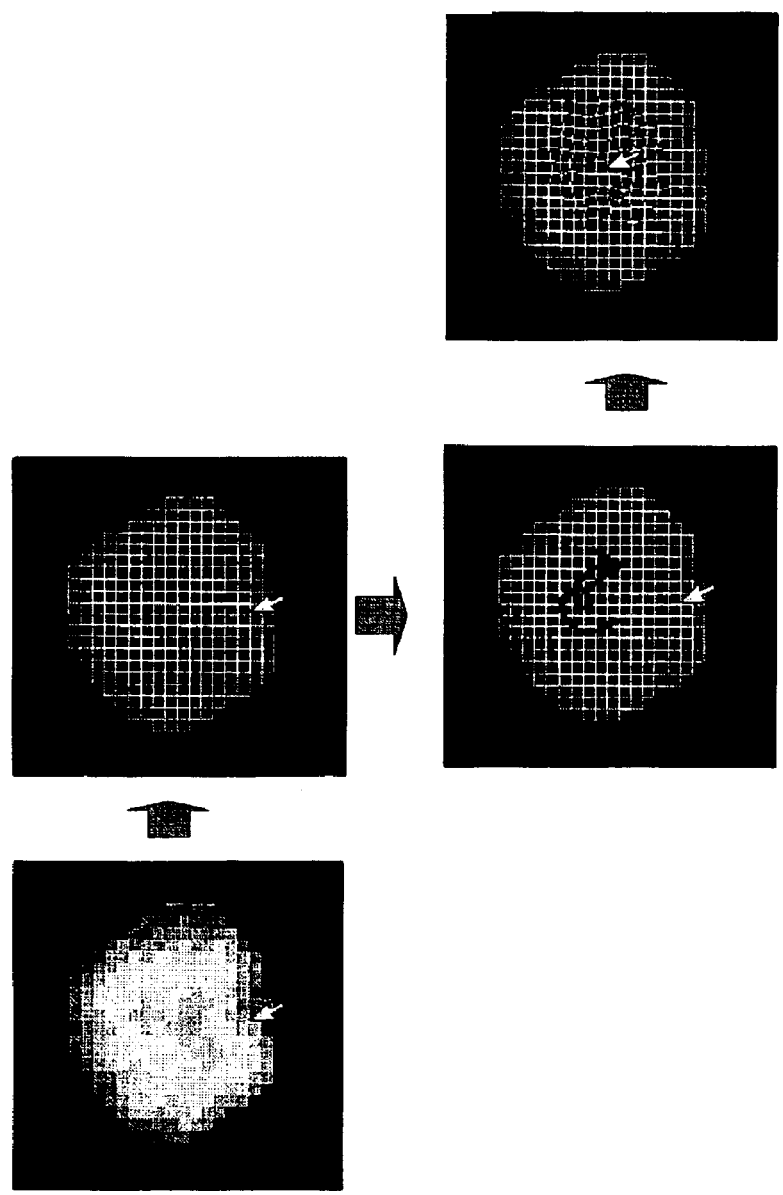
FIG. 6 shows a process of mixing a water ink with a cloud ink in a palette area.

FIG. 6 shows a state where a water ink is mixed with a cloud ink in the palette area 12. When the natural-phenomenon ink such as the cloud ink is applied in the palette area 12, an animation function is activated. The area to which such a natural phenomenon ink is applied is managed as a mesh, which is formed by many minute rectangular (or polygonal) drawing units (cells).

When a water ink is specified and a drag operation with the mouse is performed in the area painted with a cloud ink, the two attribute inks are mixed in the cells (drawing units) which have been crossed by a stroke. Mixing of the attribute inks is performed by obtaining the average of the attribute parameters of each attribute ink, or in accordance with a rule defined based on the natural phenomenon depicted by each attribute ink.

(2) Application of Ink to Object or Scene

Figure 7:
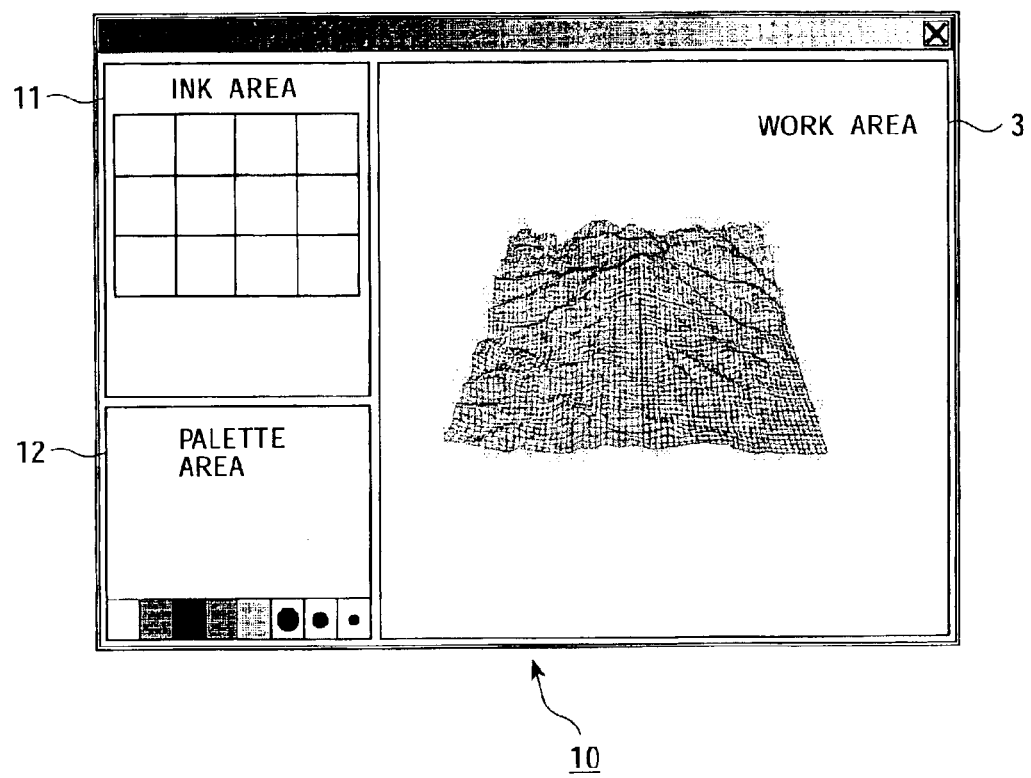
FIG. 7 shows a state where an object or a scene is read into the work area in the drawing interface.

For example, an existing object or scene can be taken into the work area 13 so that an attribute ink can be applied thereto. FIG. 7 shows a state where an object or a scene is taken into the work area 13 of the drawing interface 10.

A mesh formed by minute drawing units (cells) is formed in advance in the object or scene. Alternatively, the mesh may be dynamically generated when the object or scene is taken into the work area 13. The user specifies an attribute ink to be used in the ink area 11 or the palette area 12 and then performs a drag operation on the object or the scene. Accordingly, the drawing units (cells) that the stroke crosses are painted with the attribute ink. In the corresponding drawing units, animation of the attribute ink is generated by using a cellular automaton or a particle system (described later).

When no object exists in the work area 13, a virtual canvas in a three-dimensional scene can be set in the work area 13 and an attribute ink can be applied to the canvas with hand-drawn strokes.

Japanese Patent Application No. 2000-209731, which has been assigned to the applicant of the present application, discloses an image editing system for forming a three-dimensional image based on an image drawn by hand on a virtual canvas. According to this image editing system, a three-dimensional space with only the horizon appears on the display screen. Then, when a line is drawn by a stroke in the space, a wall whose bottom edge is formed by this line is set as a canvas. Since a drawing done by the user through the screen is mapped onto the canvas, a three-dimensional drawing can be created. By repeating canvas setting and drawing operations, a desired scene can be created. Also, a desired three-dimensional scene can be obtained by rotating the canvas or changing the view point.

Figure 8:
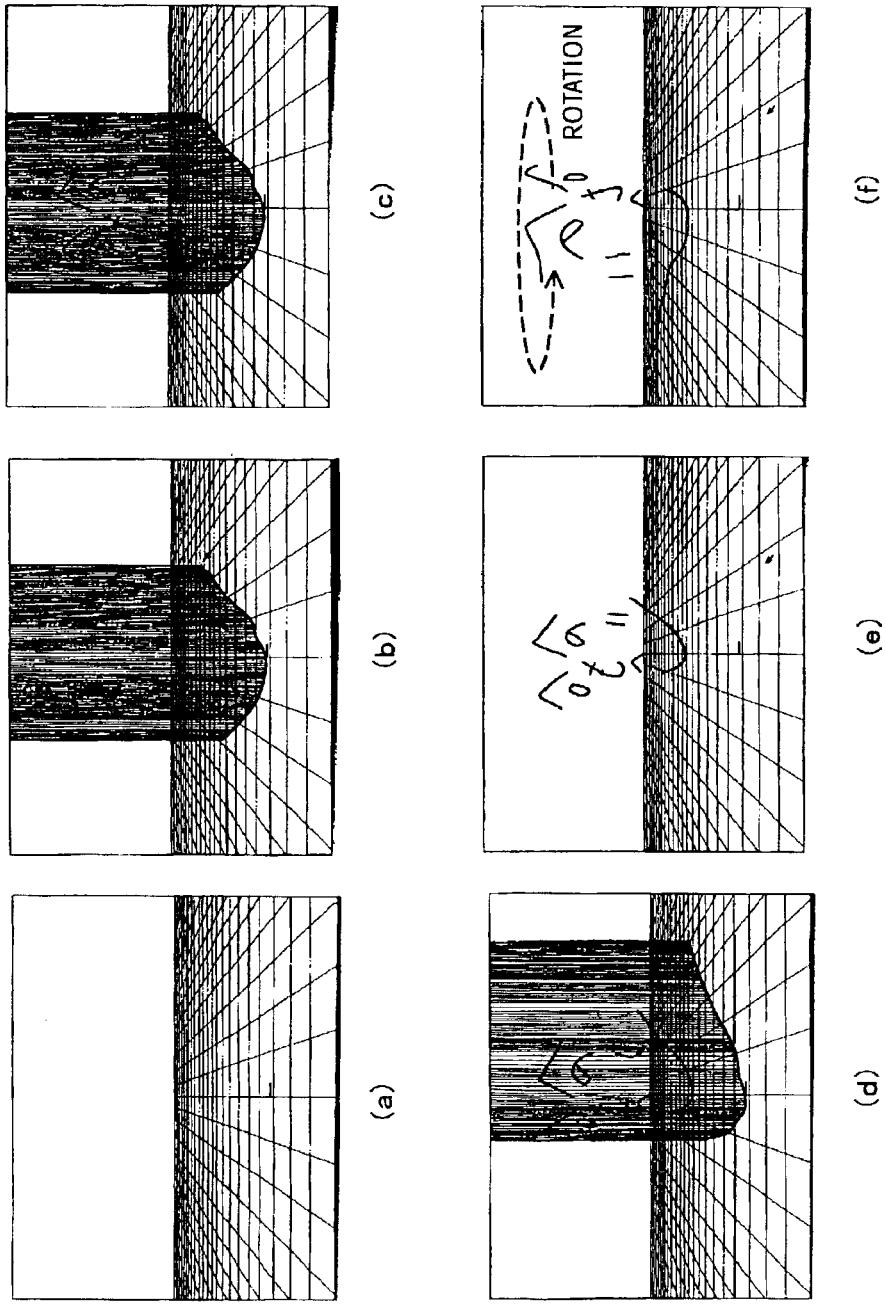
FIG. 8 shows a state where drawing is done on a three-dimensional canvas generated according to a stroke made by the user and a state where a desired three-dimensional scene is generated by rotating the canvas.

FIG. 8 shows a state where a three-dimensional canvas is generated along a stroke drawn by the user, a state where a drawing is made on the generated three-dimensional canvas, and a state where a desired three-dimensional scene is generated by rotating the canvas.

(3) Addition of Drawing Effects

In the work area 13, an effect can be added to a drawing object which is painted with an attribute ink by a hand-drawn stroke.

As described above, a drawing object painted with an attribute ink is created by specifying an attribute ink in the ink area 11 or by specifying a mixed attribute ink in the palette area 12, and then by inputting hand-drawn strokes in the work area 13 by a drag operation. The attribute ink, such as a natural-phenomenon or active ink, has an animation function in which the drawing processing changes continuously in accordance with set attribute parameters. An animation such as cloud, water, or flame is applied to a drawing area generated by a hand-drawn stroke.

Default values are applied to attribute parameters which define the animation function of an attribute ink. The default values can be intentionally reflected by an interaction using the mouse 113. The procedure for changing the attribute parameters by mouse interaction will be described later.

Also, a function used in general document-editing processing, such as copy and paste, can be performed by a GUI operation in the work area 13. For example, by selecting the range of a drawing object which is displayed on the work area 13 and then by dragging and dropping the selected range to another position, that object can be copied. When the drawing object is painted or pasted with an attribute ink, the attribute parameters of the original object are also copied. For example, a plurality of copies of a drawing object drawn with a flame ink can be generated.

C. Painting by Hand-Drawn Strokes with Attribute Ink

Now, a process for realizing painting by hand-drawn strokes with an attribute ink by using the drawing interface 10 will be described. The drawing process based on hand-drawn strokes according to the embodiment includes the following three phases.

(1) The user selects an ink and paint.
(2) The painted area is divided into many drawing units (cells) so that a mesh is generated, and ink information is stored for each drawing unit.

(3) Calculation is performed based on mesh information and drawing is performed.

C-1. Drawing Process Using Drawing Interface

Figure 9:
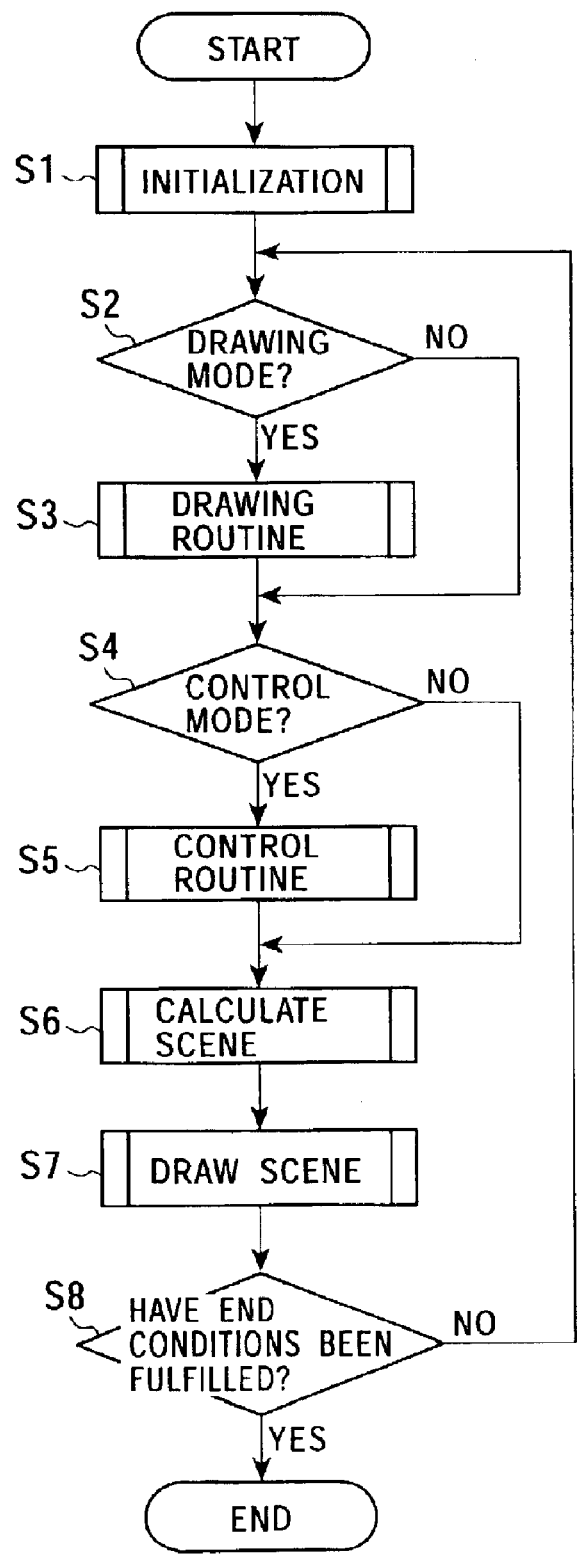
FIG. 9 is a flowchart of the entire process for realizing painting by hand-drawn strokes with an attribute ink in the drawing interface.

FIG. 9 is a flowchart illustrating a rough flow of the entire image editing process for realizing painting by hand-drawn strokes with an attribute ink in the drawing interface 10. The process is realized when the CPU 101 executes predetermined program code.

When the image editing application is started, the drawing interface 10 is initialized (step S1). The initialization step will be described later.

Then, the current operation mode is checked (step S2). If the mode is a drawing mode, a predetermined drawing routine is performed (step S3). In the drawing routine, an attribute ink is specified and then a drawing object is created based on hand-drawn strokes in the drawing interface 10. The drawing object is managed as a mesh formed by many minute drawing units. This process will be described later.

If the mode is not the drawing mode, it is checked whether or not the mode is a control mode (step S4). If the mode is a control mode, a predetermined control routine is performed (step S5). In the control routine, the attribute parameters of the attribute ink which is painted or pasted to the drawing object are controlled. The attribute parameters can be changed by using mouse interaction or the like. This will be described later.

Then, a predetermined calculation routine of a scene is performed (step S6). Calculation of a scene is performed for each drawing unit (cell) of mesh information forming the drawing object. The process will be described later.

Then, a predetermined drawing routine of a scene is performed (step S7). The scene is drawn based on the calculation result of each drawing unit (cell) of mesh information forming the drawing object. The routine of the process will be described later.

In step S8, it is determined whether or not the system has fulfilled end conditions.

If the system has not fulfilled the end conditions, the process returns to step S2 so that the above-described drawing routine, control routine, calculation of the scene, and drawing of the scene are performed repeatedly. Calculation of the scene is repeatedly performed for each frame and drawing of the object to which an active ink, such as a flame ink, water ink, cloud ink, or smoke ink, is painted or pasted is sequentially updated. As a result, an ever-changing animation can be created.

When the system has fulfilled the end conditions, the entire process routine is completed. Since the end conditions do not directly relate to the scope of the present invention, the conditions are not described here.

Mode setting or mode switching for the drawing mode and the control mode is performed by, for example, a mouse operation. For example, the drawing mode can be set by pressing the left button of the mouse. The trail of dragging is input as a hand-drawn stroke. On the other hand, the control mode can be set by pressing the right button of the mouse. When mouse interaction (described above) is performed, the trail of dragging is input as the attribute parameters of an attribute ink.

C-2. Initialization

Figure 10:
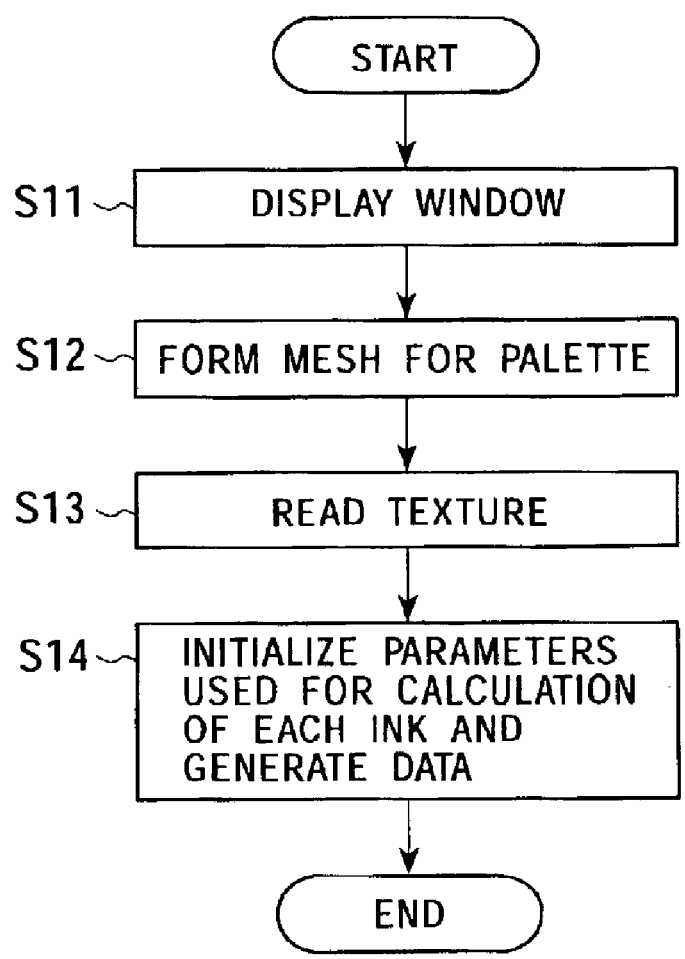
FIG. 10 is a flowchart of an initialization process performed in step S1 of the flowchart shown in FIG. 9.

FIG. 10 shows a process of initialization performed in step S1 in the flowchart shown in FIG. 9.

First, a window frame (see FIG. 2 or 3) including the ink area 11, the palette area 12, and the drawing interface 10 (see FIG. 2) is prepared on the display 111 (step S11).

The palette area 12 is an area in which a plurality of inks are mixed, the tone is adjusted, or the thickness of ink is adjusted. An attribute ink should be painted in accordance with a hand-drawn stroke made by a mouse operation (see FIG. 6). Therefore, a mesh for painting with an attribute ink is formed in advance in the palette area 12 (step S12).

Then, drawing data such as the texture of color inks or attribute inks prepared in the ink area 11 is read from an external storage device, such as the HDD 114 (step S13). Texture which is frequently used may be cached in advance.

Then, the parameters used for calculation of each ink are initialized and data is generated (step S14). For example, color variation sequence for attribute inks is prepared in step S14.

C-3. Drawing Routine

Figure 11:
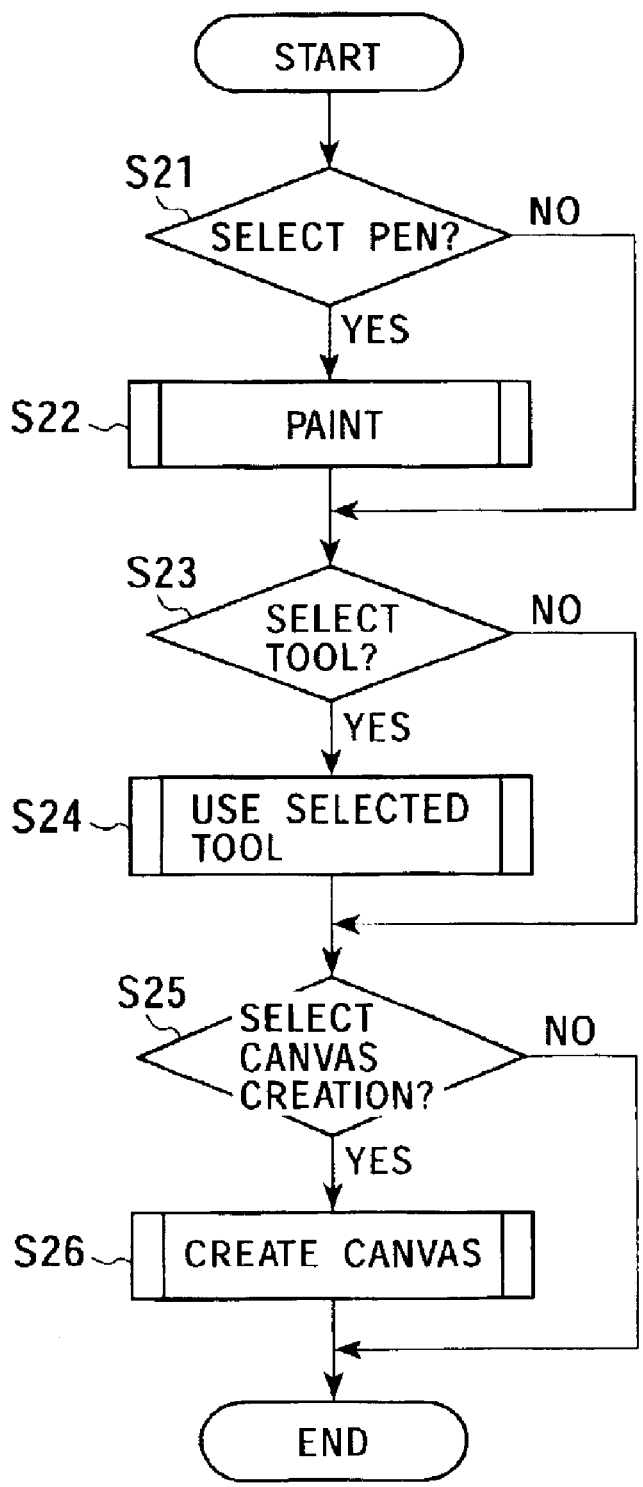
FIG. 11 is a flowchart of a drawing routine corresponding to step S3 of the flowchart shown in FIG. 9.

FIG. 11 shows a process of the drawing routine, which corresponds to step S3 in the flowchart shown in FIG. 9.

First, the user selects a pen having a desired type of line in a pen-selecting area provided in the palette area 12 (step S21). Then, a painting process is performed by using the selected pen (step S22). The painting process is performed in accordance with a predetermined process routine, which will be described later.

When the user selects a tool (step S23), a drawing process is performed by using the selected tool (step S24).

The selected tool is, for example, copy and paste. In this case, the range of a drawing object displayed in the work area 13 is selected and is then dragged and dropped to another place. As a result, the object is copied. When the drawing object is painted or pasted with an attribute ink, the attribute parameters of the original object are also copied. For example, a plurality of copies of a drawing object drawn with a flame ink can be generated.

When creation of a canvas is selected (step S25), a predetermined canvas creating process is performed (step S26).

In step S26, a virtual canvas in a three-dimensional scene may be set in the work area 13 and an attribute ink may be painted on the canvas by hand-drawn strokes. For example, drawing can be made by using an attribute ink on the three-dimensional canvas, which has been created based on the stroke made by the user. Also, a desired three-dimensional scene can be created by moving the view point or rotating the three-dimensional canvas (see FIG. 8).

As described above, in the drawing interface 10 according to the embodiment, a drawing object in the work area 13 or the palette area 12 is managed as a mesh formed by minute rectangular (or polygonal) drawing units (cells).

When the user selects an ink and performs painting, the painted area (object or scene) is divided into many drawing units (cells) so that ink information is stored for each drawing unit. Then, calculation is performed based on the mesh information so as to draw the object or scene.

A mesh formed by minute drawing units (cells) is formed in the object or scene in advance. If the mesh does not exist, it can be dynamically generated when the object or scene is read. FIG. 12 shows a process of dynamically generating a mesh in the painted area in the work area 13.

The user specifies an attribute ink in the ink area 11 or the palette area 12 and performs a drag operation over the object or scene. Accordingly, the cells (drawing units) that the stroke crosses are painted with the attribute ink.

Then, a labeling value and a vector (U and V information) in the operating direction by mouse interaction are allocated to the drawing object drawn by the same attribute ink.

Further, a mesh formed by minute drawing units is interpolated into the drawing object to which a labeling value is allocated. Each drawing unit is further divided if necessary. Also, a mesh information block is generated in order to manage the drawing information of each drawing object.

FIG. 13 shows the data structure of the mesh information block. As shown in FIG. 13, the mesh information block includes the allocated labeling value, a list of the operating direction vector (U and V information) constituting mouse interaction, that is, a hand-drawn stroke crossed over the drawing object, and a list of each drawing unit (mesh_data) forming a mesh.

FIG. 14 shows the data structure of a data block mesh_data for managing the drawing information of a drawing unit, which forms a drawing object, that is, a mesh. As described above, by applying a cellular automaton or a particle system to each drawing unit (cell), an animation function of a natural phenomenon depicted by an attribute ink can be realized. As shown in FIG. 14, the data block mesh_data includes a list of attribute inks which are painted on corresponding drawing units, and parameters used for applying a cellular automaton or a particle system to the drawing units (color information, position information, texture information, and so on).

In the embodiment, a data block is provided for each attribute ink in order to manage the attribute inks prepared in the ink area 11 in advance and attribute inks prepared by mixing or adjusting two or more inks in the palette area 12.

FIG. 15 shows the data structure of a data block for managing information of the attribute inks which are registered in the mesh_data. The data block includes a list of the ID of each original ink (Ink ID) for forming a corresponding ink and a count value (Technical_count) indicating the thickness of the ink specified by applying a technical ink. The count value of the technical ink has two types: a count value Technical_count [0] indicating the thickness of an attribute ink and a count value Technical_count [1] indicating the fineness (particle size) of an attribute ink.

C-3-1. Painting Process

Figure 16:
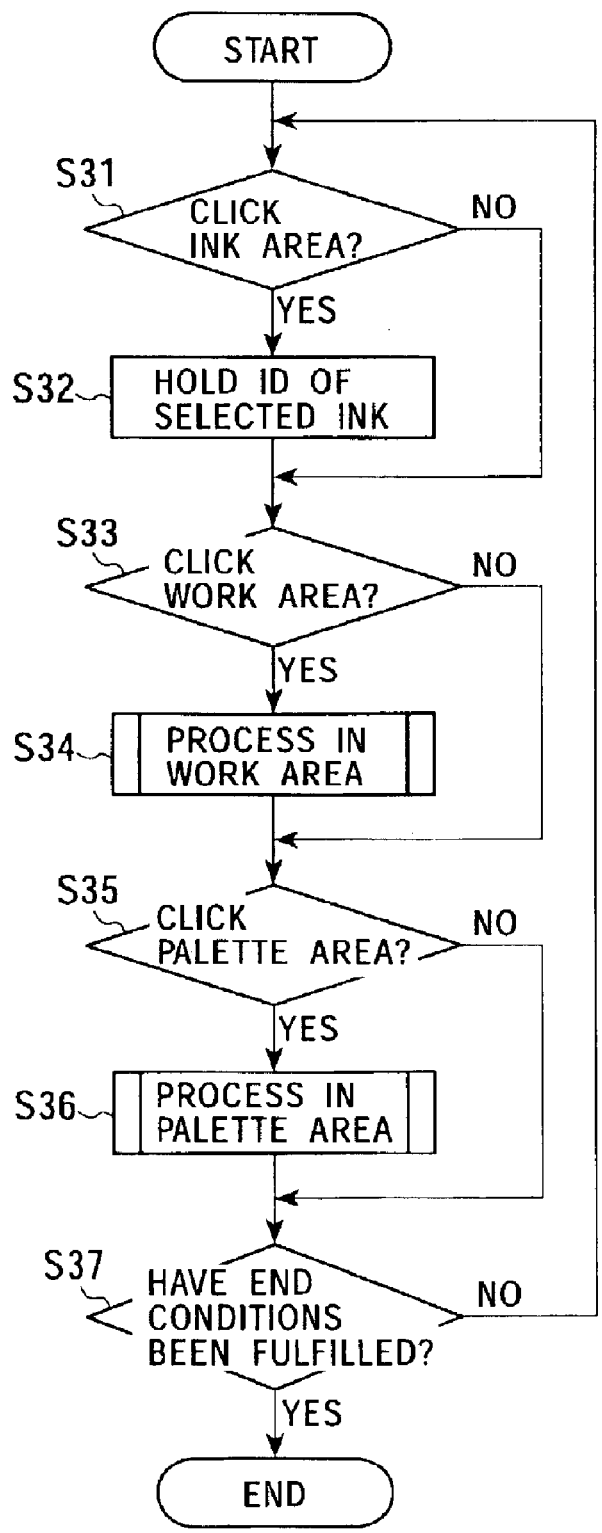
FIG. 16 is a flowchart of a painting process corresponding to step S22 of the drawing routine shown in FIG. 11.

FIG. 16 is a flowchart showing a painting process performed in step S22 of the drawing routine shown in FIG. 11.

The user can select a desired ink by clicking the ink with the mouse 113 in the ink area 11 (step S31). At this time, the ID of the selected ink is temporarily held (step S32).

By clicking the work area 13 (step S33), a drawing process can be performed in the work area 13 (step S34). The process routine in the work area 13 is predetermined, which will be described later.

By clicking the palette area 12 (step S35), a process for mixing a plurality of attribute inks, adjusting the tone, or adjusting the thickness of ink can be performed in the palette area 12 (step S36). The process routine in the palette area 12 is predetermined, which will be described later.

In step S37, it is determined whether or not the system has fulfilled end conditions.

If the system has not fulfilled the end conditions, the process returns to step S31 so that the drawing process is repeated by using the drawing interface 10 including the ink area 11, the work area 13, and the palette area 12.

If the system has fulfilled the end conditions, the entire process routine is completed. The end conditions do not directly relate to the scope of the present invention, and thus are not described here.

C-3-2. Process in Work Area

Figure 17:
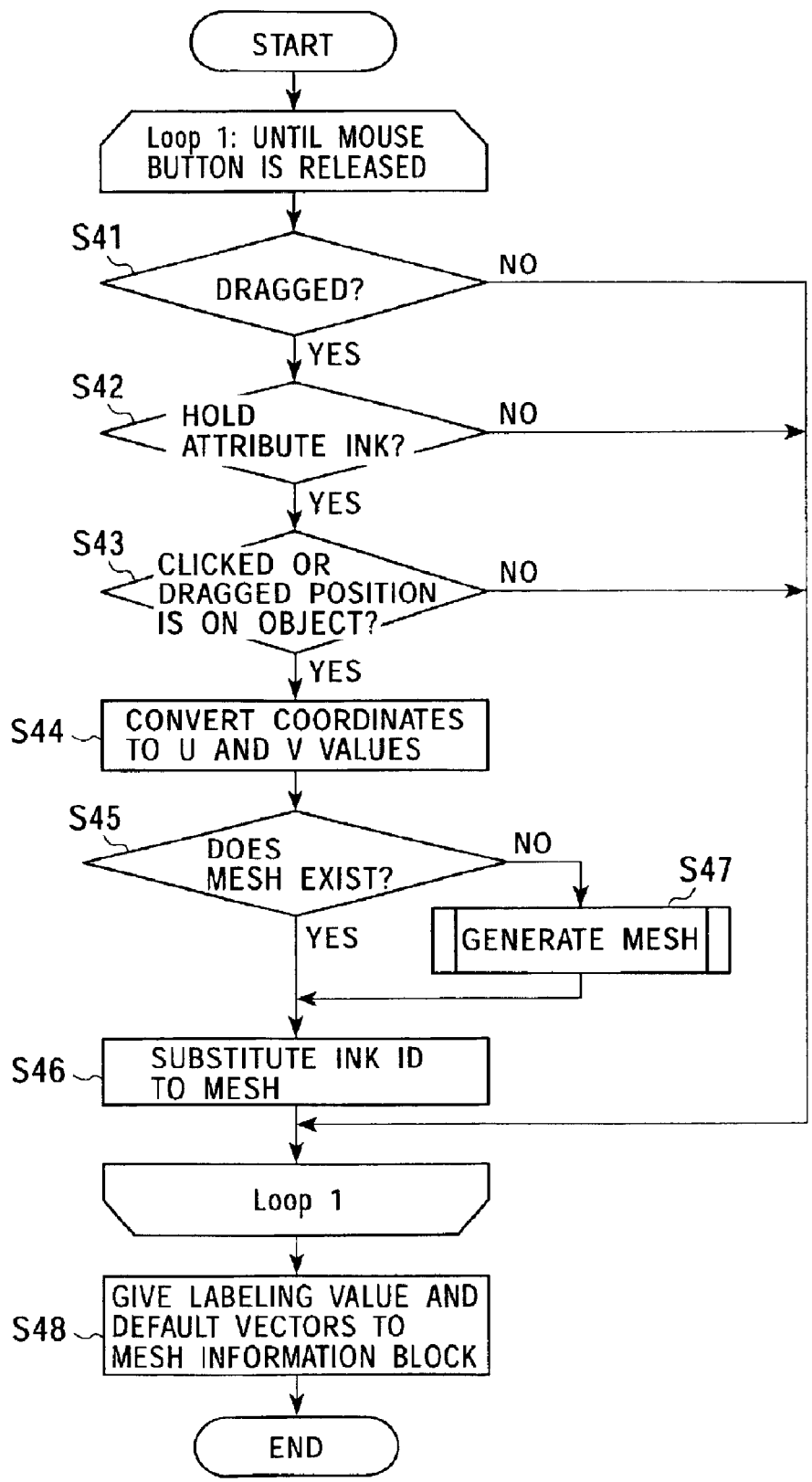
FIG. 17 is a flowchart of a process of drawing by using the work area, the process corresponding to step S34 of the painting process shown in FIG. 16.

FIG. 17 is a flowchart showing a process of drawing by using the work area 13, the process corresponding to step S34 of the painting process shown in FIG. 16. The work area 13 is an example in which a digital canvas is realized in the real world. The user can paint with a selected ink by making strokes, that is, by performing a drag operation by using a mouse in the work area 13. Hereinafter, a drawing process performed in the work area 13 will be described with reference to FIG. 17.

The drawing process in the work area 13 continues until the user releases the left button of the mouse 113 (Loop 1).

When a drag operation is performed by using the mouse 113 in the work area 13 (step S41), it is checked whether or not an attribute ink is held (whether or not an ink has been specified in the ink area 11) in step S42.

If an attribute ink is held, it is checked whether or not the position where the mouse 113 is clicked or dragged is on the drawing object (step S43).

If a click or drag operation is performed on the drawing object, the coordinates indicated by the mouse 113 is converted to U and V values (step S44). Then, it is determined whether or not a mesh exists at the U and V coordinate values (step S45).

If a mesh does not exist, a mesh is generated (step S47). The mesh is generated according to a predetermined process routine, which will be described later.

As described above, a mesh generated for a drawing object is managed by a mesh information block (see FIG. 13). The mesh is formed by many minute drawing units (cells) and each drawing unit is managed by the data block mesh_data (see FIG. 14). In step S46, the specified attribute ink is added to the ink list of mesh_data of each drawing unit which has clicked or dragged by the mouse 113. When an ink is applied to the mesh whose mesh_data already has an ink ID, the value of the ink ID is added to the ink list.

When the left button of the mouse 113 is released, the process goes through the Loop 1. Then, in step S48, the labeling value and the default vectors U and V are given to the mesh information block of the drawing object so that the entire process routine is completed. The vectors U and V are used for performing animation processing of an attribute ink by using a cellular automaton or a particle system. The default values given in step S48 can be changed by mouse interaction (described above).

Figure 18:
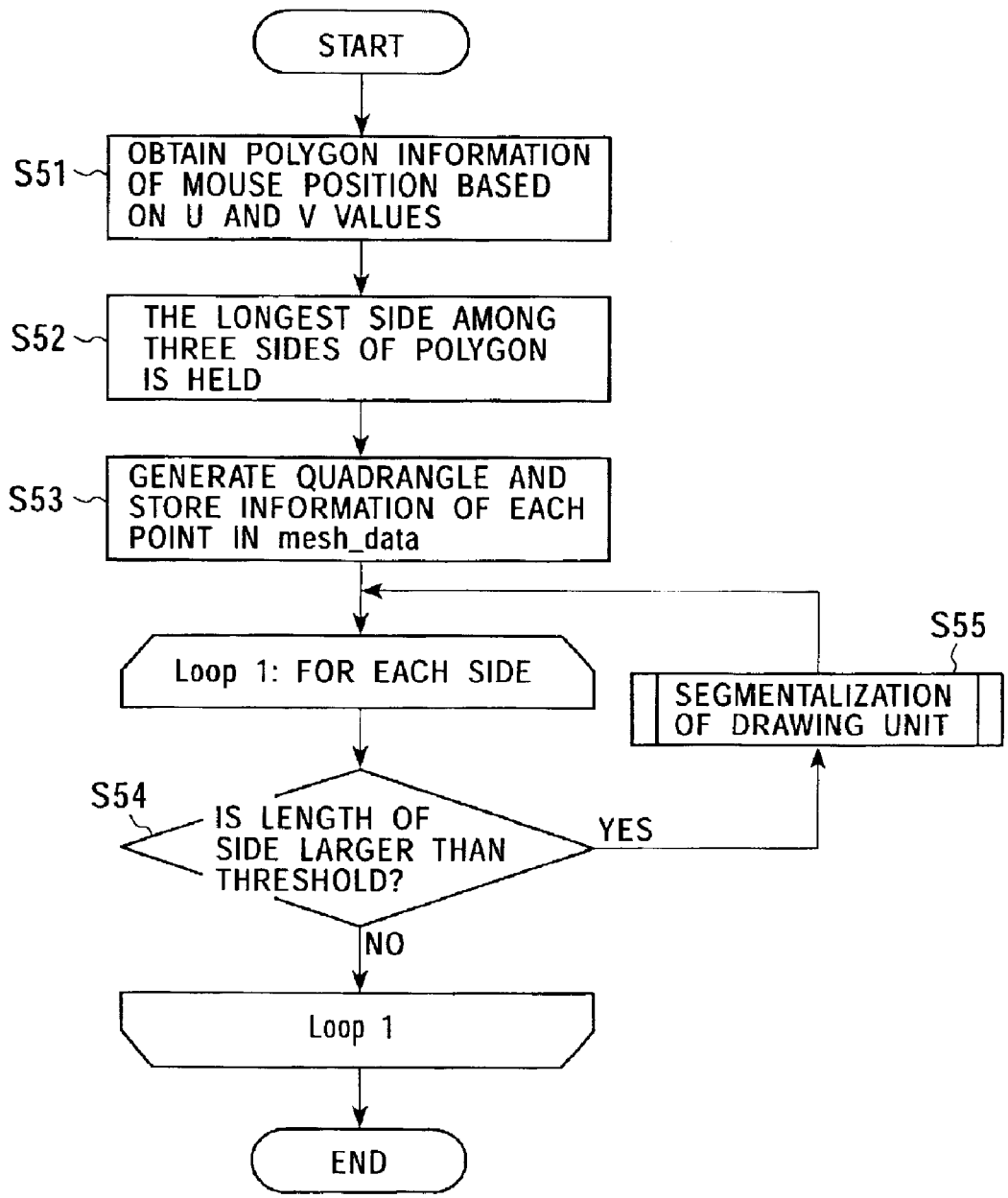
FIG. 18 is a flowchart of a process of generating a mesh, the process corresponding to step S47 of the process in the work area shown in FIG. 17.

FIG. 18 is a flowchart of a process for generating a mesh, performed in step S47 of a process in the work area 13 shown in FIG. 17.

First, polygon information of the position at which the mouse 113 is clicked or dragged is obtained based on the U and V values (step S51). Herein, the polygon is a triangle.

Then, the longest side among the three sides of the polygon is held (step S52). The longest side is combined with another polygon which has long sides so that a quadrangle is generated. The quadrangle is a drawing unit for forming a mesh, and information of each point is stored in mesh_data which manages this drawing unit (step S53).

In this way, a mesh formed by minute quadrangle drawing units is generated based on the drawing object. Then, it is checked whether or not the length of sides of each drawing unit forming the mesh is larger than a threshold (step S54). The drawing unit having a side which is longer than the threshold is further divided (step S55).

Figure 19:
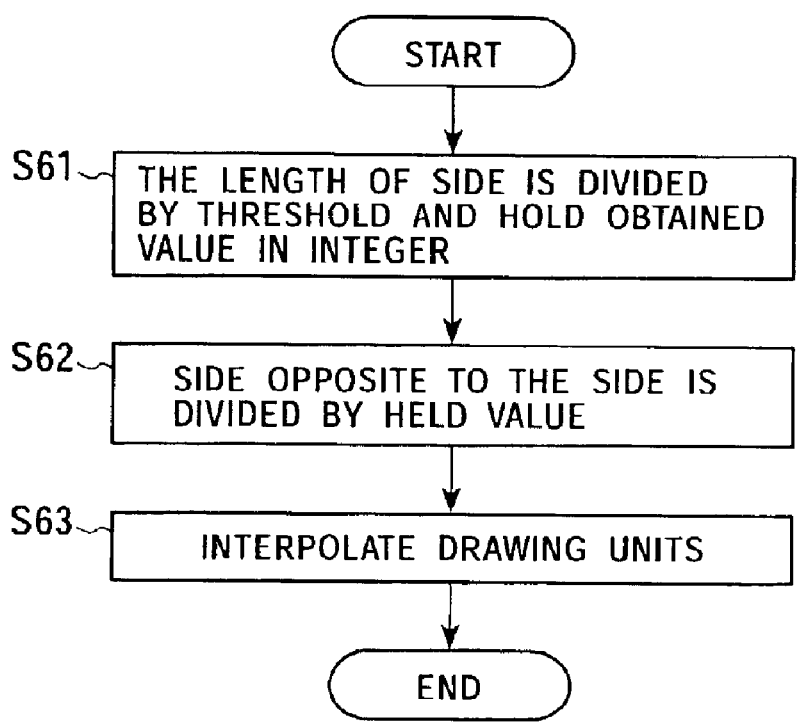
FIG. 19 is a flowchart of a mesh dividing process routine in step S55 of the flowchart shown in FIG. 18.

The process routine of division of a drawing unit performed in step S55 is predetermined. FIG. 19 is a flowchart of the process routine of dividing a drawing unit.

First, the length of the side is divided by the predetermined threshold and the obtained value is held in integer (step S61).

Then, the side opposite to the side is divided by the held value (step S62).

Then, drawing units, whose number is the number of division, is interpolated to the mesh and mesh_data corresponding to the mesh information block is added (step S63).

C-3-3. Process in Palette Area

Figure 20:
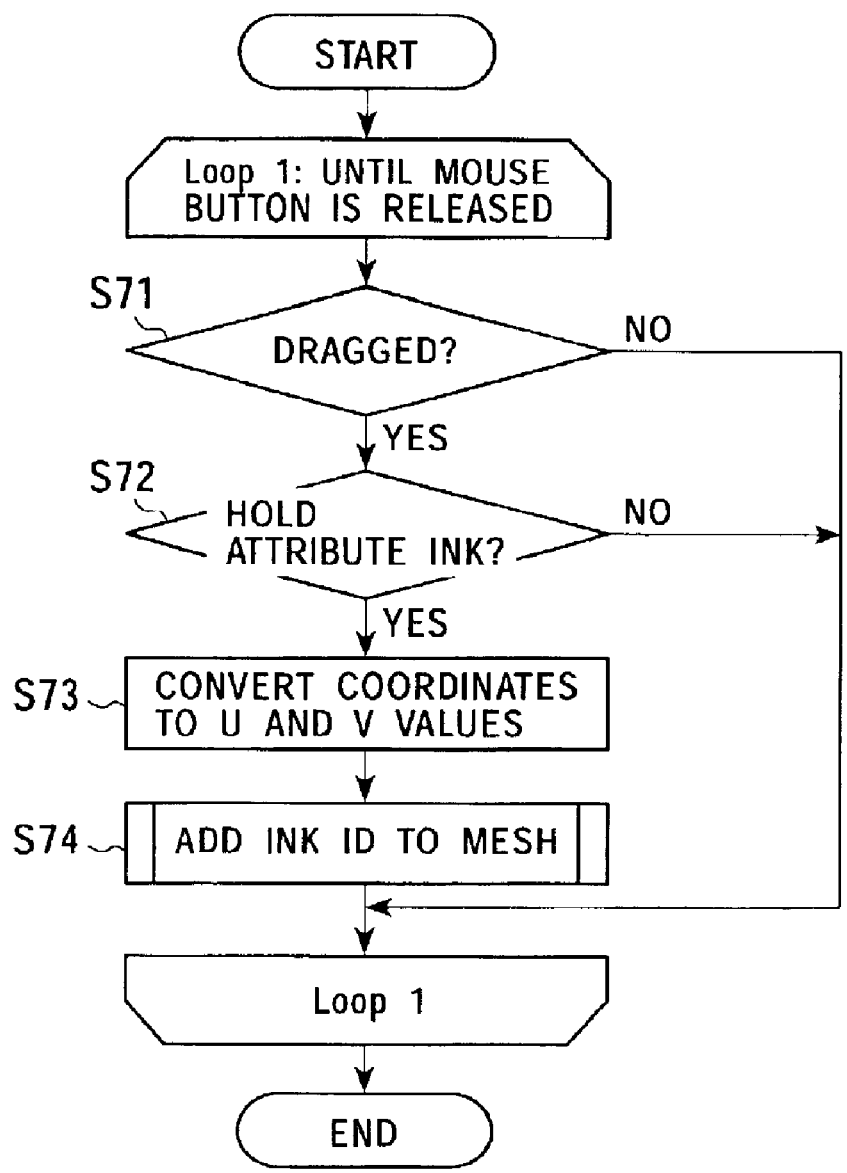
FIG. 20 is a flowchart of a process of mixing attribute inks in the palette area, the process corresponding to step S36 of the painting process shown in FIG. 16.

FIG. 20 is a flowchart of a process of mixing attribute inks in the palette area 12, that is, step S36 of the painting process shown in FIG. 16. Hereinafter, the process performed in the palette area 12 will be described with reference to FIG. 20.

The drawing process in the palette area 12 continues until the user releases the left button of the mouse 113 (Loop 1).

When a drag operation is performed with the mouse 113 in the work area 13 (step S71), it is checked whether or not an attribute ink is held (whether or not an ink has been specified in the ink area 11) in step S72.

When a click or drag operation is performed in the palette area 12, the coordinates indicated by the mouse 113 is converted to U and V values (step S73). Then, the ink ID is added to the mesh_data of the corresponding drawing unit in the mesh generated in the palette area 12 (step S74).

Figure 21:
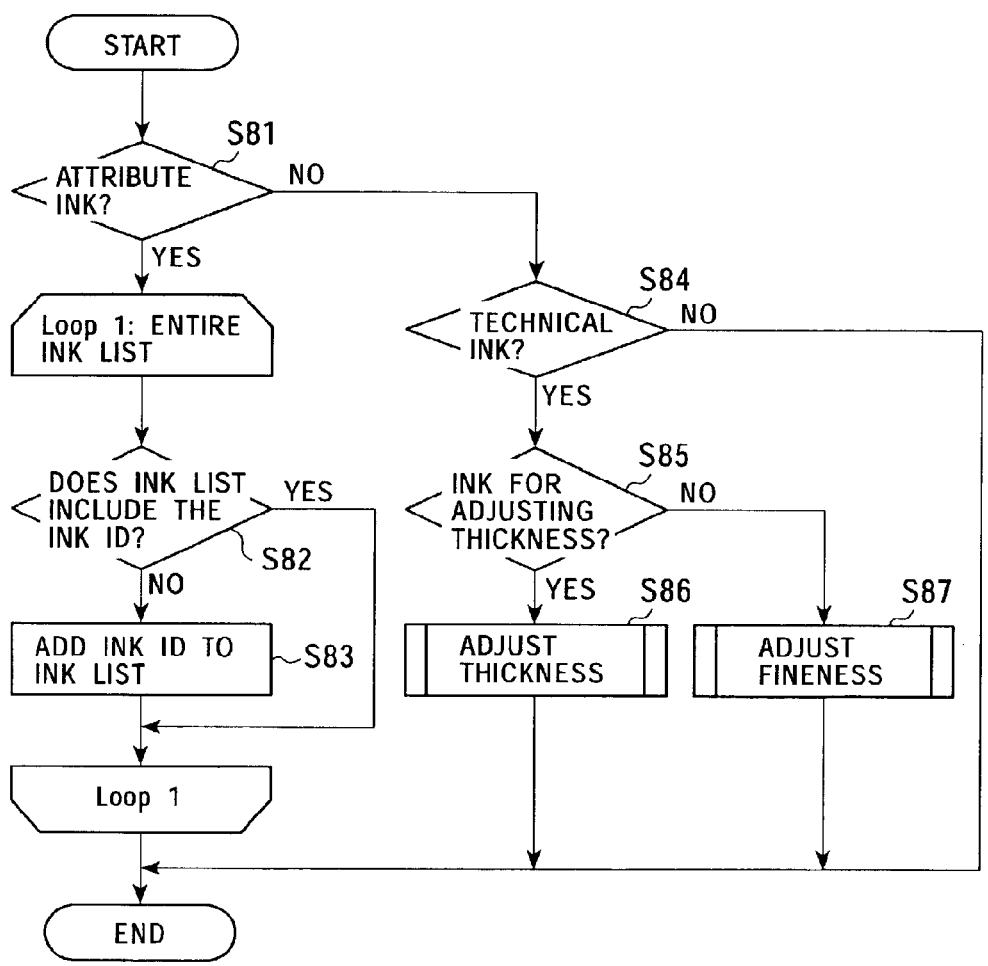
FIG. 21 is a flowchart of a process of adding an ink ID to mesh_data.

The process of adding the ink ID to the mesh_data of the drawing unit forming the mesh is performed in accordance with a predetermined process routine. FIG. 21 is a flowchart of a process for adding an ink ID to mesh_data.

First, it is checked whether or not the ink to be added is an attribute ink (step S81).

If the ink is an attribute ink, the ink list of mesh_data is searched so as to check whether or not the same ink ID is already held (step S82).

If the same ink ID is not held, the attribute ink is added to the list (step S83).

On the other hand, if the ink to be added is not an attribute ink, it is checked whether or not the ink is a technical ink (step S84).

The technical ink is used for changing the attribute value of an attribute ink. In the embodiment, the thickness of an ink can be adjusted or a mesh can be made to be rough or fine by using the technical ink (described above).

If the ink to be added is a technical ink, it is further checked whether the technical ink is used for adjusting either of the thickness or fineness of an ink (step S85).

If the technical ink is for adjusting the thickness of an ink, a process of adjusting the thickness is performed (step S86). If the technical ink is for adjusting the fineness of an ink, a process of adjusting the fineness is performed (step S87).

The process with the technical ink in step S86 and S87 is performed in accordance with a predetermined process routine, which will be described later.

Now, the function of the technical ink is described. The technical ink itself does not have behavior/animation such as a color, pattern, or natural phenomenon. By mixing with an attribute ink, the technical ink has the following effects on the attribute ink.

(1) Adjust Thickness

By adjusting the thickness of a natural-phenomenon ink, such as a flame ink or a smoke ink, the motion speed of the animation can be increased or decreased. For example, in order to depict a natural phenomenon by emitting particles, the thickness of the ink can be represented by changing the emission speed or the emission cycle.

(2) Adjust Fineness

By adjusting the fineness of the mesh forming a drawing object, the texture of the drawing object can be changed. When an animation function is realized by using a cellular automaton or a particle system, the texture can be changed by adjusting the fineness of the mesh.

For example, in a cellular automaton, an animation function is generated by interaction between adjoining drawing units, such as an attractive force and a repulsive force. Thus, the interaction changes depending on the fineness of a mesh. Also, in a particle system, an emitter for particles is provided in each drawing unit. Thus, the fineness of a mesh affects the texture.

(3) Partial Change

The attributes, such as speed and behavior, of a portion to which a technical ink is applied can be changed. For example, only a part of a drawing object painted with an attribute ink is dragged by the mouse 113 with a technical ink. Accordingly, the function of the technical ink acts on the drawing units that the stroke crosses (the thickness of ink or the fineness of mesh is adjusted).

Figure 22:
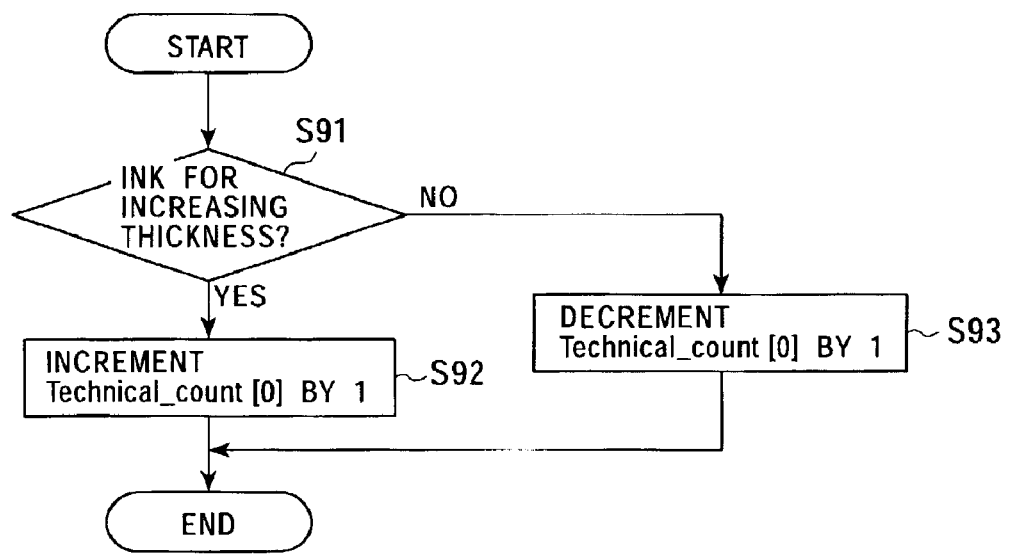
FIG. 22 is a flowchart of a process of increasing or decreasing the thickness of an attribute ink by using a technical ink.

FIG. 22 is a flowchart of a process of adjusting the thickness of an attribute ink with a technical ink, that is, step S86 of the process routine for adding ink ID to a mesh shown in FIG. 21.

First, it is checked whether or not the specified technical ink is for increasing the thickness of an attribute ink (step S91).

If the technical ink is for increasing the thickness, the count value Technical_count [0], which indicates the thickness of the attribute ink registered in mesh_data of the corresponding drawing units (drawing units that are clicked or dragged by the mouse 113), is incremented by one (step S92).

On the other hand, if the technical ink is for decreasing the thickness, the count value Technical_count [0], which indicates the thickness of the attribute ink registered in mesh_data of the corresponding drawing units, is decremented by one (step S93).

Figure 23:
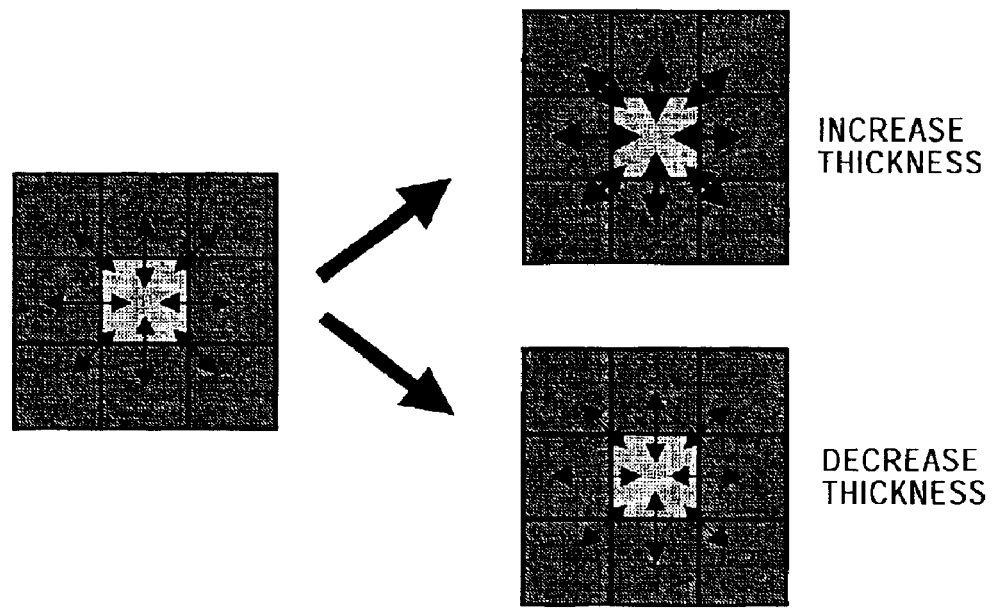
FIG. 23 shows an example of the function of the count value Technical_count [0] of the technical ink indicating the thickness of the attribute ink.

FIG. 23 shows an example of a function of the count value Technical_count [0] indicating the thickness of an attribute ink.

As described above, in the embodiment, an animation function of a natural phenomenon depicted with an attribute ink can be generated by applying such method as a cellular automaton or a particle system to each drawing unit (cell). Among the two methods, the cellular automaton generates an animation function by an interaction between adjoining drawing units, such as an attractive force and a repulsive force.

In the example shown in FIG. 23, when the count value Technical_count [0] of the technical ink, which indicates the thickness of an attribute ink, is incremented, that is, when the thickness of the attribute ink is increased, the attractive force between adjoining drawing units is strengthened (or the repulsive force is weakened) so as to increase the effect of adjoining drawing units on the attribute parameters. Accordingly, thickness can be represented. On the other hand, when the count value Technical_count [0] of the technical ink, which indicates the thickness of an attribute ink, is decremented, that is, when the thickness of the attribute ink is decreased, the attractive force between adjoining drawing units is weakened (or the repulsive force is strengthened) so as to decrease the effect of adjoining drawing units on the attribute parameters. Accordingly, thinness can be represented.

Figure 24:
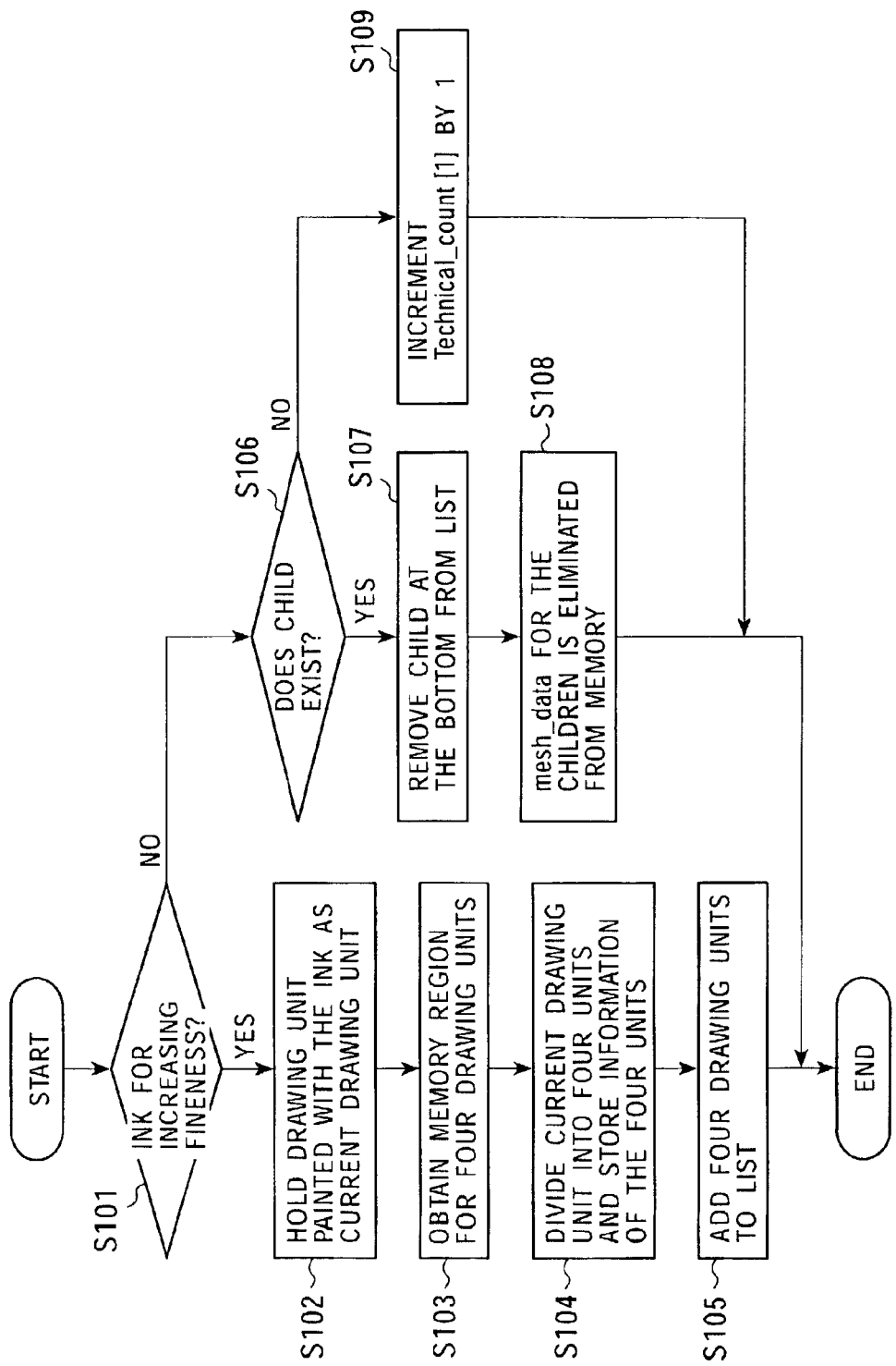
FIG. 24 is a flowchart of a process of increasing or decreasing the fineness of the attribute ink by using the technical ink.

FIG. 24 is a flowchart of a process of adjusting the fineness of an attribute ink with a technical ink, that is, step S87 of the process routine for adding an ink ID to a mesh shown in FIG. 21.

First, it is checked whether or not the specified technical ink is for increasing the fineness (step S101).

If the technical ink is for increasing the fineness, the mesh_data of the corresponding drawing unit (that is, the drawing unit which is clicked or dragged by the mouse 113) is held as the mesh_data to be processed (step S102).

Then, a memory region for storing the mesh_data of four drawing units is obtained (step S103), the held drawing unit is divided into four units, and the information of the four drawing units is stored in the newly generated mesh_data (step S104).

Each of the four units of the drawing unit is regarded as a child of the current drawing unit, and is added to the list of mesh_data as a child drawing unit (pixel child [4]) in step S105.

On the other hand, if the specified technical ink is not for increasing the fineness, it is checked whether or not the corresponding drawing unit (the drawing unit which is clicked or dragged by the mouse 113) has a child (pixel child [4]) in step S106.

If the corresponding drawing unit already has children, a child at the bottom layer is removed from the list (step S107). As a result, the four-divided drawing unit having a small particle size is lost, and the drawing unit becomes larger accordingly. Also, since the mesh_data used for the children is unnecessary, it is eliminated from the memory (step S108).

When it is determined that a child does not exist in step S106, the count value Technical_count [1] of the technical ink, which indicates the fineness of an attribute ink, is incremented by one (step S109).

Figure 25:
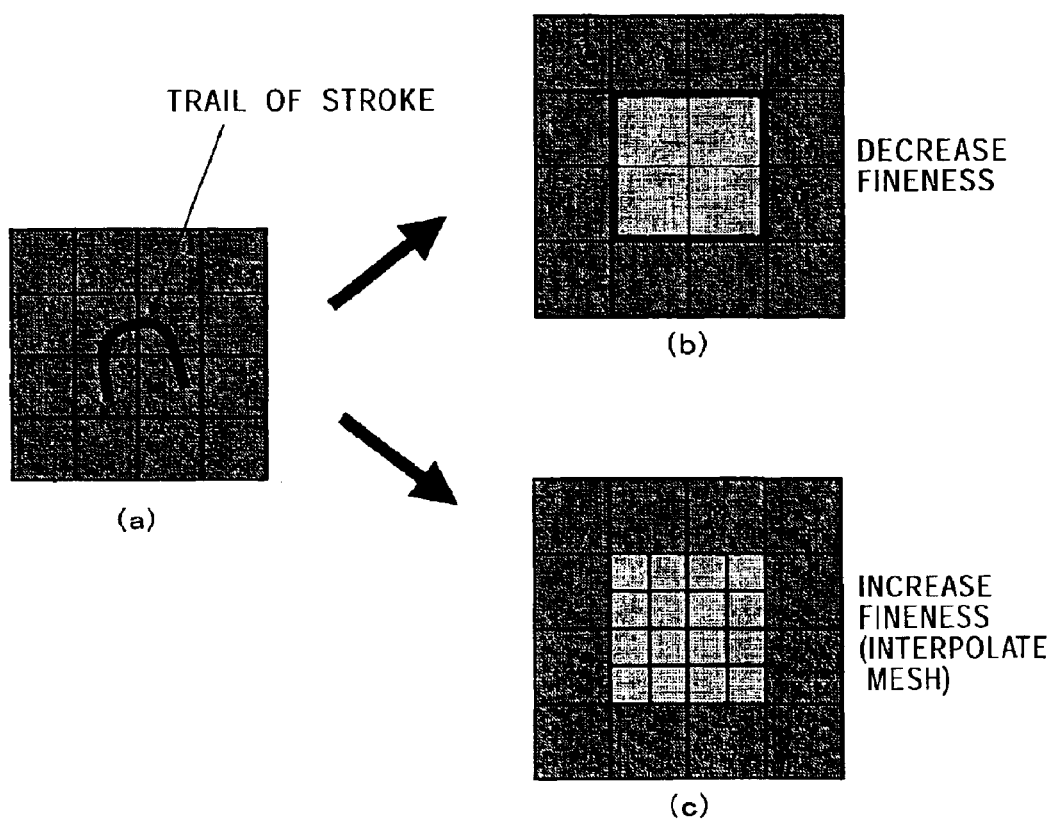
FIG. 25 shows a state where the technical ink for adjusting the fineness of the attribute ink is applied to a drawing object.

FIG. 25 shows a state where the technical ink for adjusting the fineness of an attribute ink is applied to a drawing object.

In the palette area 12, a mesh is generated at initialization (see FIG. 10). The mesh is formed by quadrangular minute drawing units (cells).

First, a technical ink for adjusting the fineness of an attribute ink is specified in the ink area 11. Then, a drag operation is performed with the mouse 113 in the area painted with an attribute ink in the palette area 12.

An example of the trail of the drag operation or a hand-drawn stroke is shown in (a) of FIG. 25. In this case, the technical ink is applied to drawing units that the hand-drawn stroke has crossed.

When the technical ink is for decreasing the fineness, the size of each of the drawing units crossed by the hand-drawn stroke is increased in accordance with the process shown in FIG. 24.

When the technical ink is for increasing the fineness, each of the drawing units crossed by the hand-drawn stroke is divided in accordance with the process shown in FIG. 24. That is, each drawing unit is divided into four units and their information is stored in newly generated mesh_data. Also, the four units of the drawing unit are added to the list of mesh_data of the original drawing unit as children drawing units.

FIG. 26 is an example of the function of the count value Technical_count [1] of the technical ink, which indicates the fineness of an attribute ink.

As described above, in the embodiment, an animation function of a natural phenomenon depicted with an attribute ink can be generated by applying such method as a cellular automaton or a particle system to each drawing unit (cell). Among the two methods, the cellular automaton generates an animation function by an interaction between adjoining drawing units, such as an attractive force and a repulsive force.

When the technical ink for decreasing the fineness is used, the fineness of the mesh is decreased, as shown in (b) of FIG. 25. In FIG. 26, (a) shows a normal state. On the other hand, (b) shows the case where the size of a drawing unit is increased. In this case, a plurality of drawing units are combined into one unit. Thus, an interaction, such as an attractive force and a repulsive force, between the original drawing units is eliminated. Roughness can be represented by omitting calculation by virtually increasing the size of the drawing unit.

On the other hand, when the technical ink for increasing the fineness is used, each drawing unit is divided into four units, as shown in (c) of FIG. 25. In this case, as shown in (c) of FIG. 26, child drawing units are inserted into each parent drawing unit so that an interaction, such as an attractive force and a repulsive force, between drawing units adjoining the child is generated. Accordingly, fineness can be represented.

C-3-4. Process of Animation Function

As described above, according to the drawing interface 10 of the embodiment, an attribute ink having an animation function for representing a natural phenomenon can be painted or pasted onto a digital canvas serving as the work area 13 on the display. Also, a plurality of attribute inks used in the work area 13 may be mixed, or an attribute ink and a technical ink may be mixed so that the thickness of the ink is adjusted in the palette area 12. Then, the prepared ink can be painted or pasted in the work area 13.

The animation function of an attribute ink used in the work area 13 or the palette area 12 may be realized by using such method as a cellular automaton or a particle system. Now, each of these methods is described.

(1) Cellular Automaton

In a cellular automaton, an object is regarded as a collection of many minute cells. An animation function can be generated by the interaction, such as an attractive force and a repulsive force, between adjoining cells. When drawing is done by using a cellular automaton, the attribute parameters of each cell may be set based on the attractive and repulsive forces.

Herein, the rule of a cellular automaton will be described assuming that each cell has only two types (black and white) of attribute parameters for clarity.

Figure 27A:
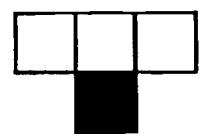
FIGS. 27A to 27E illustrate the rule of a cellular automaton.
Figure 27B:
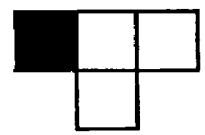
Figure 27C:
Figure 27D:
Figure 27E:

In the cellular automaton, the state of the middle cell in the lower layer is determined in accordance with the state of three sequential cells in the upper layer. Herein, white indicates death and black indicates life. For example, FIG. 27A shows a rule in which all the cells in the upper layer are dead and thus the middle cell in the lower layer is alive due to mutation. In FIG. 27B, only one cell in the upper layer is alive and thus the cell in the lower layer is dead. In FIGS. 27C and 27D, two cells in the upper layer are alive. In this case, life and death of the cell in the lower layer depends on the state of the middle cell in the upper layer. In FIG. 27E, all the three cells in the upper layer are alive, and thus the cell in the lower layer dies due to lack of food.

Figure 28:
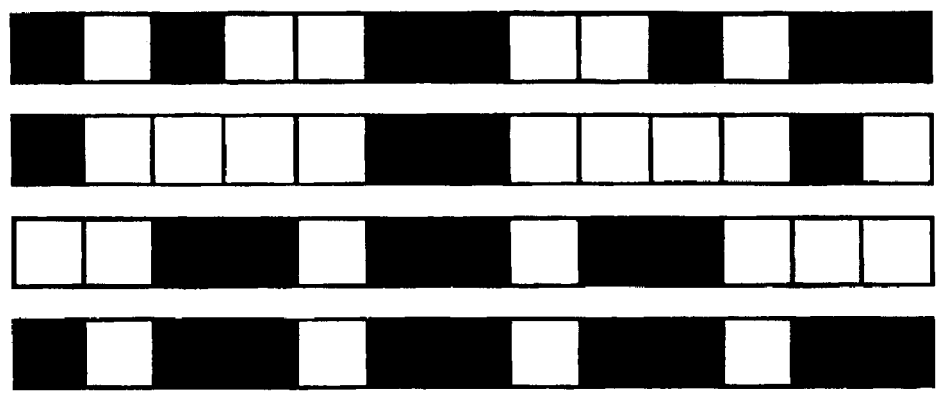
FIG. 28 illustrates the rule of a cellular automaton.

Referring to FIG. 28, the top sequence is an initial state (black, white, black, white, white, black, black, white, white, black, white, black, and black). In a fourth step (bottom sequence of FIG. 28), the order is as follows: black, white, black, black, white, black, black, white, black, black, white, black, and black.

Next, description of an animation function using a cellular automaton will be described with reference to FIGS. 29A and 29B.

Figure 29A:
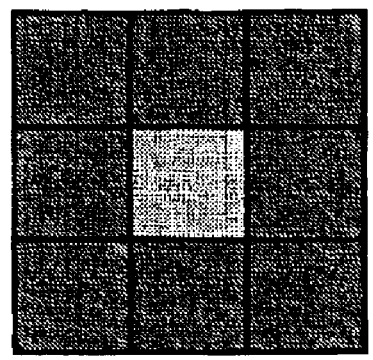
FIGS. 29A and 29B illustrate the animation function by using a cellular automaton.

As described above, in a cellular automaton, the subsequent state or attribute parameters of a cell is calculated based on the interaction between adjoining cells (see FIG. 29A).

Figure 29B:
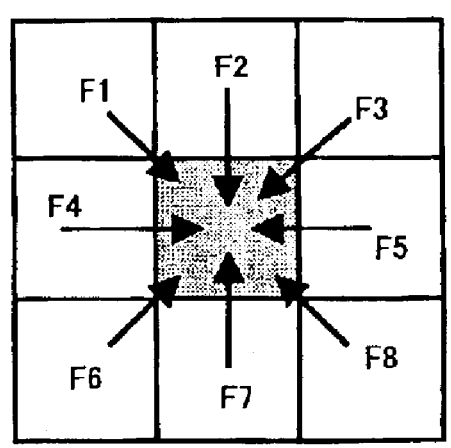

For example, eight-direction attractive forces (or repulsive forces) F1 to F8 are applied to a cell from the surrounding eight cells (see FIG. 29B). Therefore, a force of $F=(F1+F2+F3+F4+F5+F6+F7+F8)/8$ acts on the middle cell. By setting the position of the cell based on F, a function of motion can be given to the cell.

Next, the function of painting using a cellular automaton will be described with reference to FIG. 30.

When a drag operation is performed by using the mouse 113 so as to input a hand-drawn stroke in the work area 13, the trail of the stroke is regarded as a painted area. Also, a mesh formed by a plurality of minute drawing units (cells) is interpolated into the painted area, that is, into the drawing object.

Default values of U and V information are applied to each cell (described above). The U and V information in the default state can be changed by mouse interaction. The color and the change of position (motion) of a cell are calculated by using the U and V information.

(2) Particle System

In a particle system, a phenomenon caused by applying various forces to particles emitted from an emitter is utilized. By providing an emitter for each drawing unit, motion of a drawing object can be represented.

Figure 31:
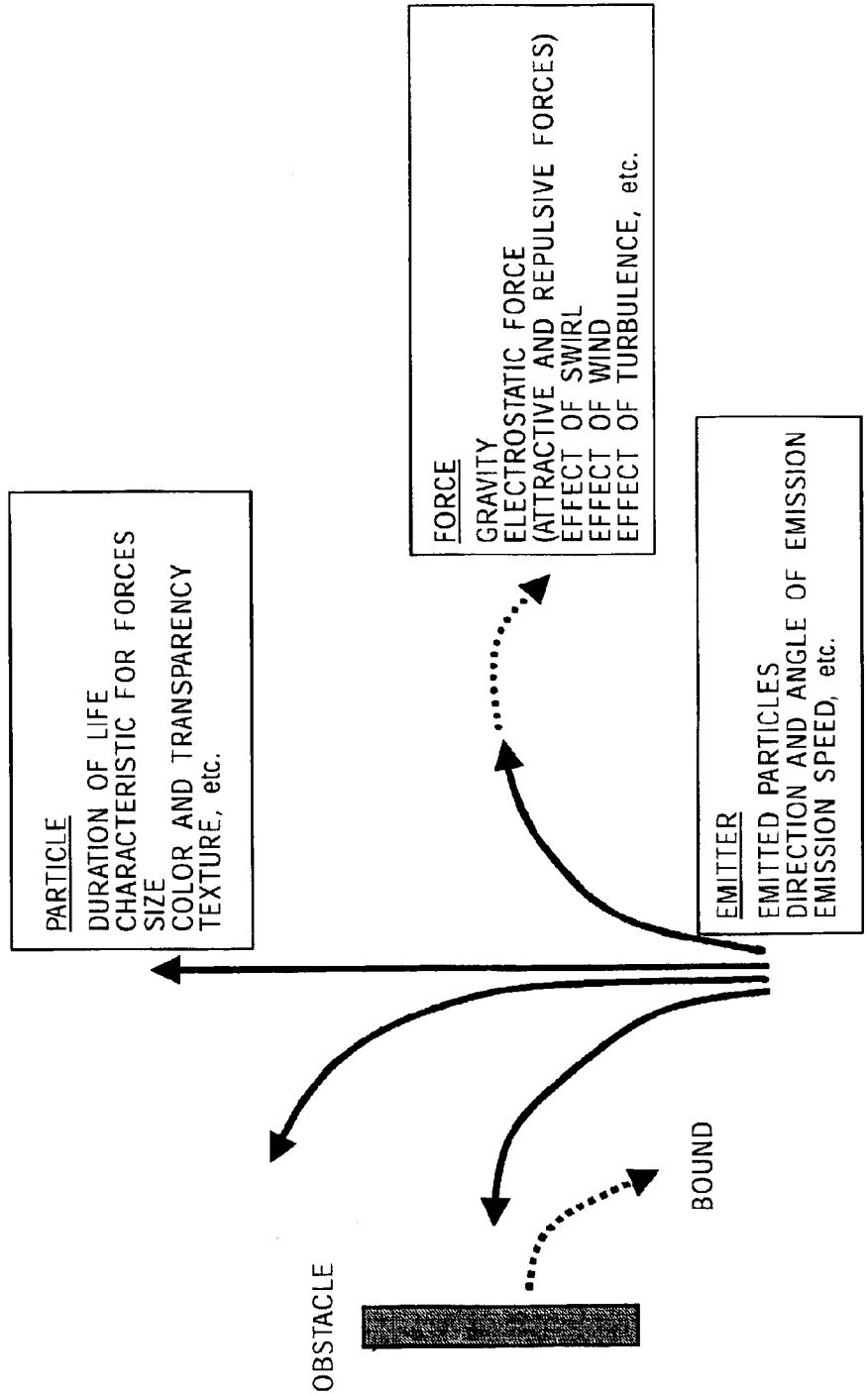
FIG. 31 shows the principle of a particle system.

FIG. 31 shows the principle of a particle system. As shown in FIG. 31, the particle system includes particles, an emitter for emitting the particles in a predetermined cycle, and forces which have various effects on the emitter.

The emitter has particles to be emitted and parameters such as the direction and angle of emission and the emission speed. The forces include gravity, an electrostatic force (attractive and repulsive forces), a swirl effect, a wind effect, and a turbulence effect, which are applied to particles. The forces have a non-contact or indirect effect on the particles. The particles have parameters such as duration, characteristics for forces, size, color, transparency, and texture. Further, an obstacle can be provided in the area where particles act. Bound of particles against the obstacle can be also used for representing motion.

Figure 32:
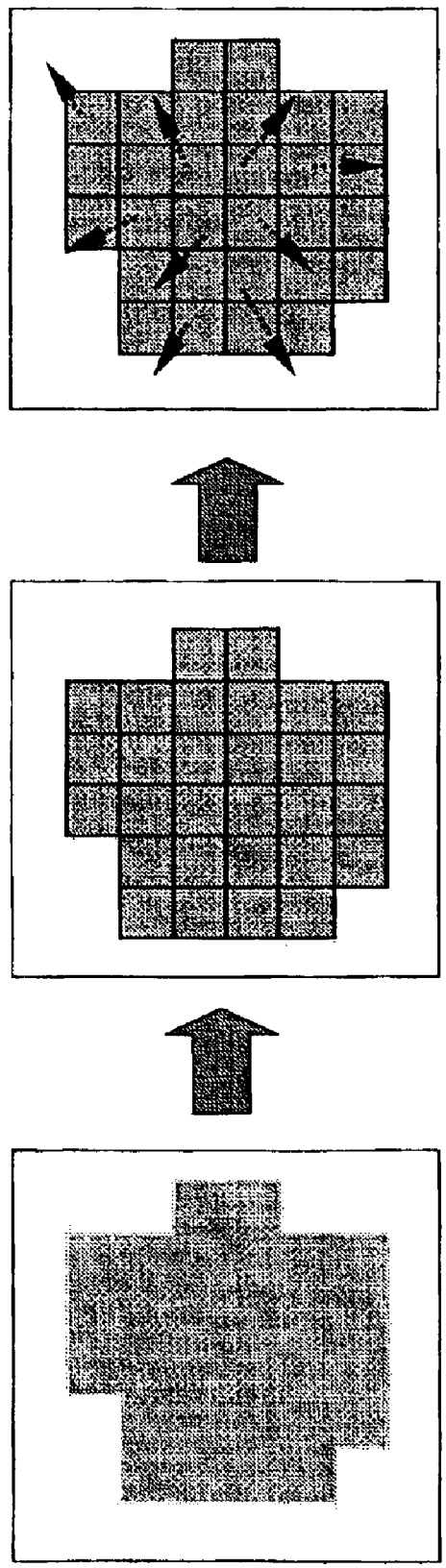
FIG. 32 illustrates a painting function using a particle system.

Next, the function of painting using a particle system will be described with reference to FIG. 32.

When a drag operation is performed by using the mouse 113 so that a hand-drawn stroke is input in the work area 13, the trail of the stroke is regarded as a painted area. A mesh formed by a plurality of minute drawing units (cells) is interpolated into the painted area (drawing object).

An emitter for emitting particles is provided in each drawing unit (for example, at the center of each drawing unit). The emitter emits particles generated based on the attribute parameters of an attribute ink. Each emitted particle forms a trail in accordance with emission speed, emission direction, and the effect of forces.

When the mesh is interpolated, default value is substituted to the attribute value of the particles, the emitter, and the forces. Then, the parameters can be changed by mouse interaction.

C-4. Calculation of Scene

In the above-described drawing routine, drawing information of the painted attribute ink is calculated for each drawing unit forming a mesh or a drawing object. The calculation result is stored in mesh_data of each drawing unit.

In step S6 of the process routine of the drawing process shown in FIG. 9, calculation of a scene is performed based on mesh_data of each drawing unit. Hereinafter, a process of calculating a scene will be described.

Figure 33:
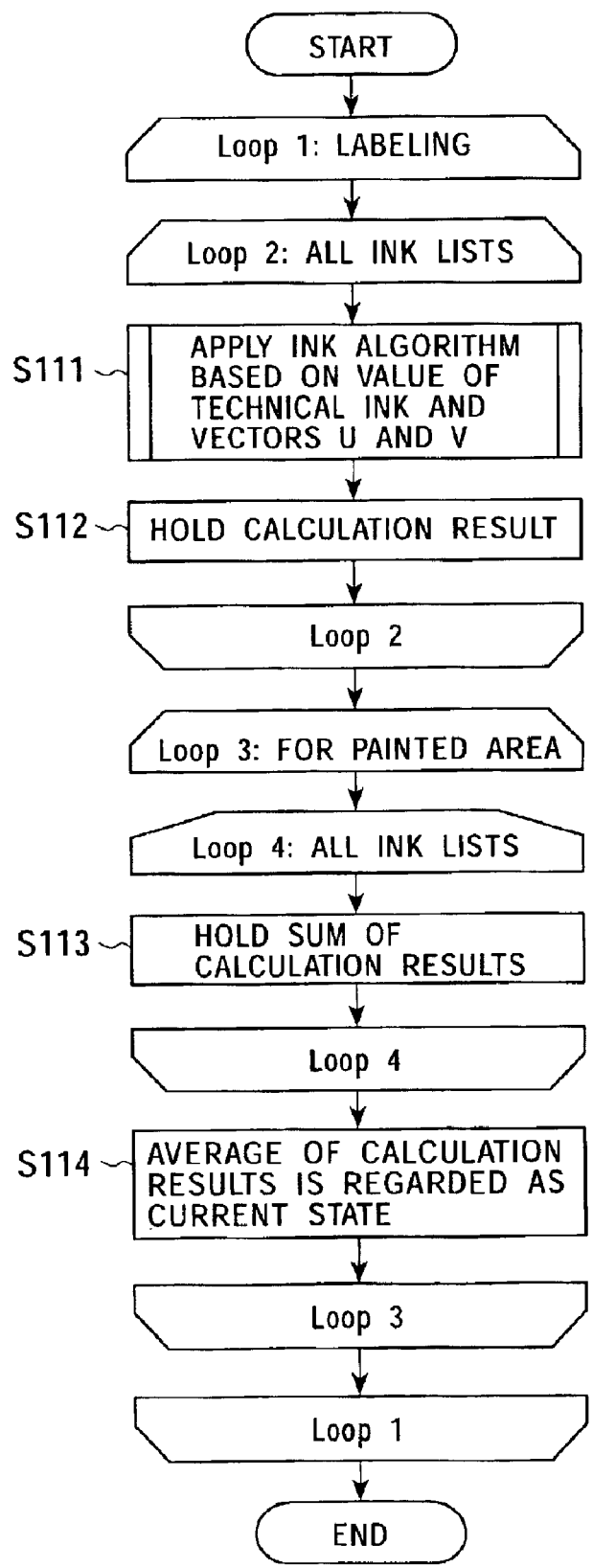
FIG. 33 is a flowchart of a process of calculating a scene.

FIG. 33 is a flowchart of a process of calculating a scene.

A drawing object generated based on a hand-drawn stroke input in the work area 13 is interpolated by a mesh formed by many minute drawing units. Also, a labeling value is allocated thereto. Calculation of a scene of the drawing object is performed for each drawing object to which a labeling value has been allocated (Loop 1).

One drawing object has an applied ink. In Loop 2, an ink algorithm is applied for each ink registered in the ink list (see FIG. 15) based on the value of a technical ink and vectors U and V (step S111), and the calculation result is held (step S112).

By using the ink algorithm, an animation function or motion based on the attribute parameters can be applied to a drawing object painted with an attribute ink. As described above, an attribute ink is used for depicting ever-changing dynamic phenomenon, such as a natural phenomenon. Each type of attribute ink, such as water ink, cloud ink, snow ink, flame ink, and smoke ink, is processed in a different way. Further, in one natural phenomenon, ink algorithm differs depending on a used method: a cellular automaton or a particle system. The details of a process of ink algorithm will be described later.

Then, in a closed-loop formed by Loop 3 and Loop 4, the sum of the calculation results of ink algorithm (step S111) is held for all the inks registered in the ink list with respect to the painted area of the drawing object to which a labeling value is allocated (step S113).

In step S114, the average of the calculation results is obtained and the average is regarded as the current state of the drawing object. By obtaining the average, a process for mixing two or more attribute inks can be realized.

C-4-1. First Example of Calculation of Ink Algorithm (Flame)

An attribute ink is used for depicting an ever-changing dynamic phenomenon, such as a natural phenomenon. Each type of attribute ink, such as water ink, cloud ink, snow ink, flame ink, and smoke ink, is processed in a different way. Further, in one natural phenomenon, ink algorithm differs depending on a used method: a cellular automaton or a particle system.

Hereinafter, an ink algorithm for processing an attribute ink for depicting flame, that is, a flame ink, will be described.

Figure 34:
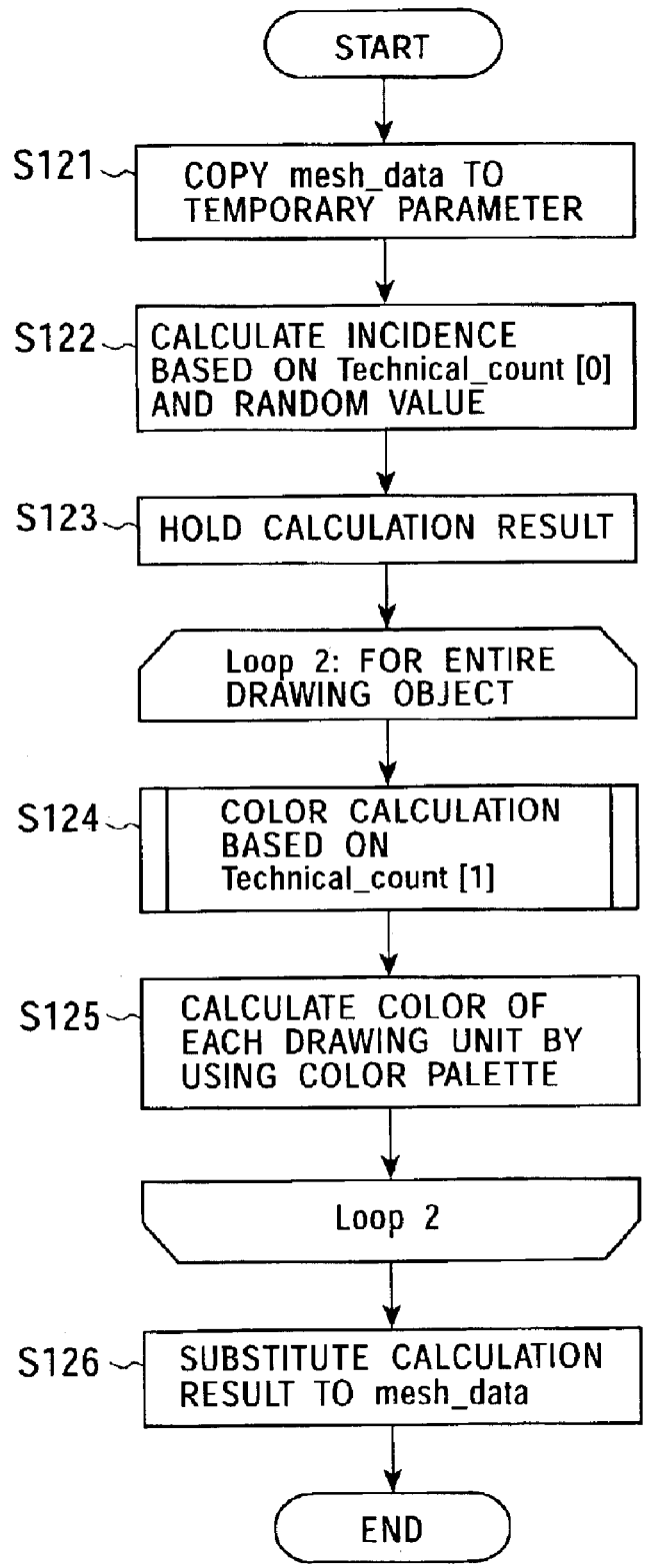
FIG. 34 is a flowchart of an ink algorithm for processing a flame ink.

FIG. 34 is a flowchart showing the ink algorithm for processing the flame ink. This algorithm complies with a cellular automaton.

First, mesh_data of each drawing unit forming a drawing object is copied to a temporary parameter (step S121).

Then, incidence is calculated based on the value of a technical ink Technical_count [0], which indicates the thickness of an attribute ink, and a random value (step S122), and the calculation result is held (step S123).

Then, color calculation is performed with respect to all drawing units forming the drawing object based on the value of technical ink Technical_count [1] indicating the fineness (step S124). The color calculation based on the Technical_count [1] is performed in accordance with a predetermined process routine, which will be described later.

Next, the color of each drawing unit is calculated by using a color palette (not shown) for defining the color of the flame (step S125).

After the colors of all drawing units forming the drawing object have been calculated, the calculation result is substituted to mesh_data (step S126).

A random value is used in step S122. For example, by randomly blinking the fire point, a flickering flame can be depicted in the drawing object.

Also, the color palette used in step S125 may be formed by a gradation of black, red, yellow, and white. By using such a gradation, a flame, in which the vicinity of the fire point is light yellow and redness increases toward the upper side, can be depicted.

Figure 35:
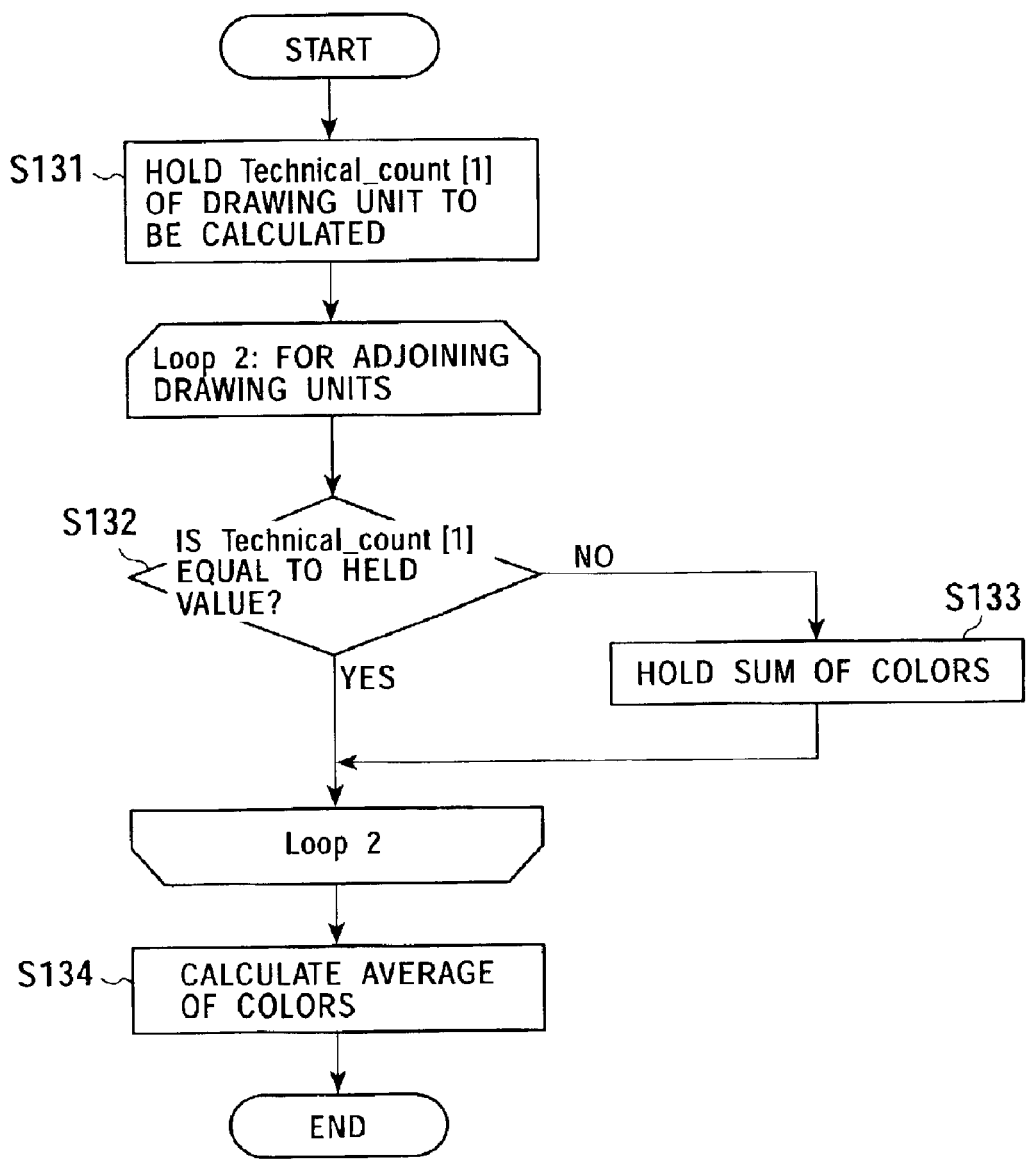
FIG. 35 is a flowchart of a process of calculating a color based on the value Technical_count [1] of the technical ink for indicating the fineness, the process corresponding to step S124 of FIG. 34.

FIG. 35 is a flowchart showing the process of calculating a color based on the value of technical ink Technical_count [1] indicating the fineness, that is, step S124 of FIG. 34.

First, the value of technical ink Technical_count [1] indicating the fineness is obtained from mesh_data of the drawing unit to be calculated, and the obtained value is held (step S131).

Then, the mesh_data of each of the adjoining eight drawing units (adjoining in vertical, horizontal, and slanting directions) is referred to so as to check whether or not the held value is equal to Technical_count [1] of each of the adjoining drawing units (step S132).

When the Technical_count [1] of the adjoining drawing units is not equal to the held value, the sum of these colors is held (step S133).

After Technical_count [1] of the drawing unit to be calculated has been compared with that of the adjoining drawing units, the average of the colors is calculated (step S134).

C-4-2. Second Example of Calculation of Ink Algorithm (Water)

Hereinafter, an ink algorithm for processing an attribute ink for depicting water, that is, a water ink, will be described.

Figure 36:
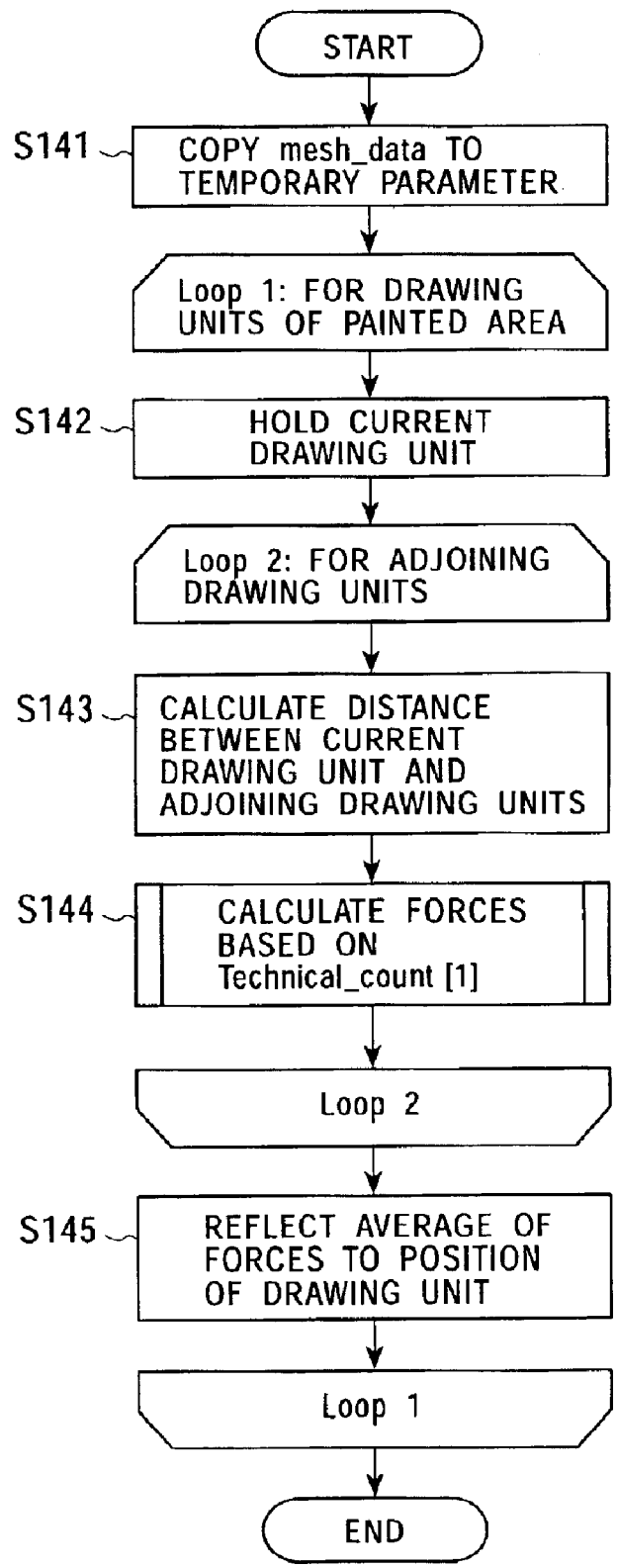
FIG. 36 is a flowchart of an ink algorithm for processing a water ink.

FIG. 36 is a flowchart showing the ink algorithm for processing the water ink. This algorithm complies with a cellular automaton.

First, mesh_data of each drawing unit forming a drawing object is copied to a temporary parameter (step S141).

Then, ink algorithm processing is performed to each drawing unit of the painted area (Loop 1).

First, a current drawing unit is held (step S142). Then, the distance between the current drawing unit and each of the eight adjoining drawing units (adjoining in vertical, horizontal, and slanting directions) (Loop 2) is calculated (step S143). The distance is calculated based on the vectors U and V.

Then, forces are calculated based on the value of a technical ink Technical_count [1] indicating the fineness of the current drawing unit (step S144). The forces are calculated based on Technical_count [1] in accordance with a predetermined processing routine, which will be described later.

After the forces applied from the adjoining drawing units to the current drawing unit have been calculated, the average of the forces is calculated and is reflected to the position of the drawing unit (step S145).

By applying this process to all the drawing units, the scene of the water ink can be calculated.

Figure 37:
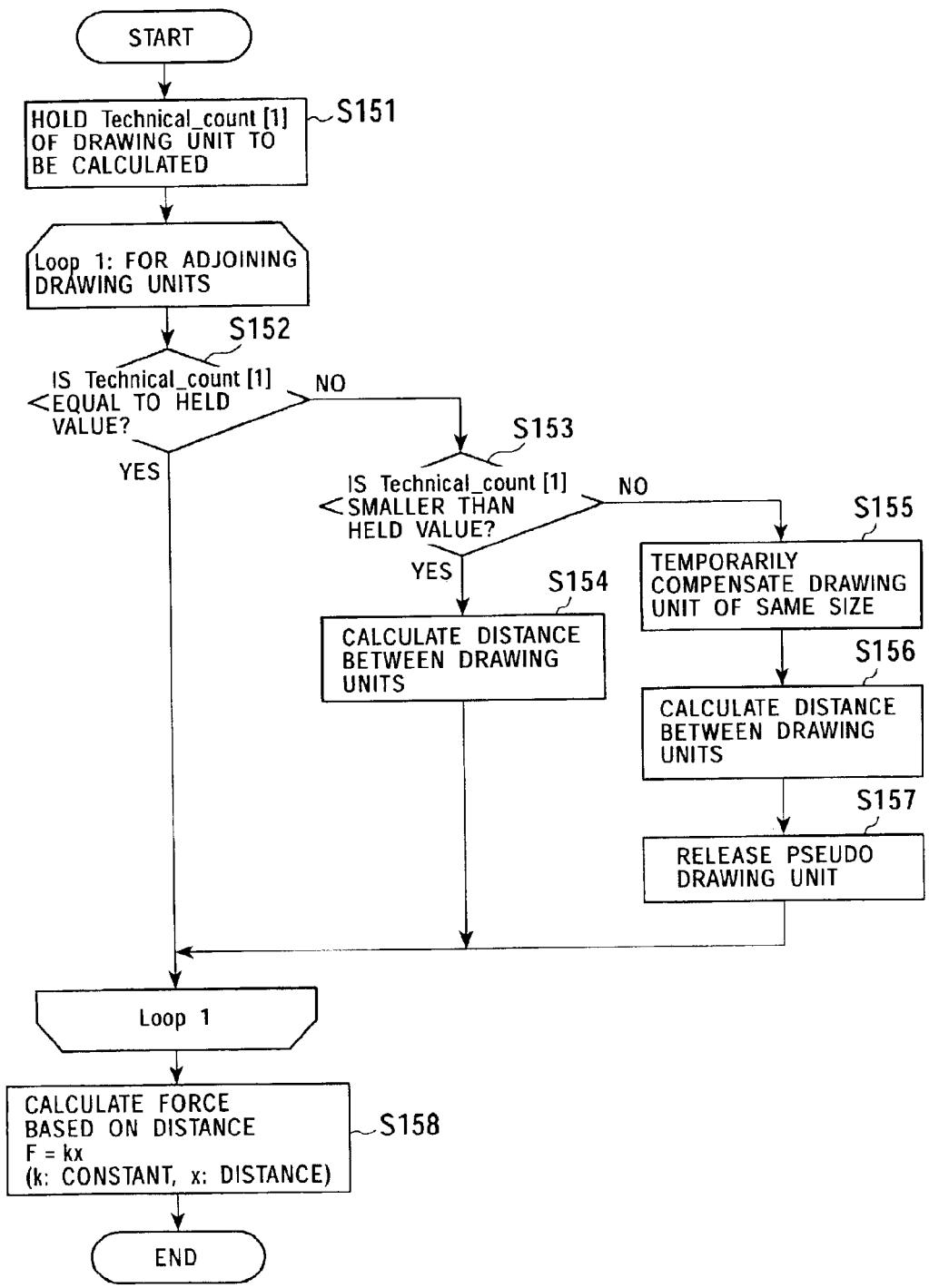
FIG. 37 is a flowchart of a process of calculating a force based on the value Technical_count [1] of the technical ink for indicating the fineness, the process corresponding to step S144 of FIG. 36.

FIG. 37 is a flowchart of a process of calculating forces based on the value of a technical ink Technical_count [1] indicating the fineness, that is, step S144 of FIG. 36.

First, the value of a technical ink Technical_count [1] indicating the fineness is obtained from mesh_data of the drawing unit to be calculated (step S151).

Then, the mesh_data of each of the eight adjoining drawing units (adjoining in vertical, horizontal, and slanting directions) is referred to so as to check whether or not the held value is equal to Technical_count [1] of each of the adjoining drawing units (step S152).

When the Technical_count [1] is not equal to the held value, it is further checked whether or not Technical_count [1] of the drawing unit to be calculated is smaller (step S153).

When the Technical_count [1] of the drawing unit to be calculated is smaller, the distance between the drawing units is calculated (step S154).

On the other hand, when the Technical_count [1] of the drawing unit to be calculated is larger, a drawing unit of the same size is temporarily compensated (step S155), the distance between the drawing unit and the pseudo drawing unit is calculated (step S156), and then the pseudo drawing unit is released to the original state (step S157).

By performing a distance calculation to all drawing units in the drawing object based on the value of a technical ink Technical_count [1] indicating the fineness, forces can be obtained based on the distance between the drawing units (step S158).

C-4-3. Third Example of Calculation of Ink Algorithm (When Particle System is Applied)

An attribute ink is used for depicting an ever-changing dynamic phenomenon, such as a natural phenomenon. Even in the same natural phenomenon, an ink algorithm differs depending on a used method, that is, a cellular automaton or a particle system.

Figure 38:
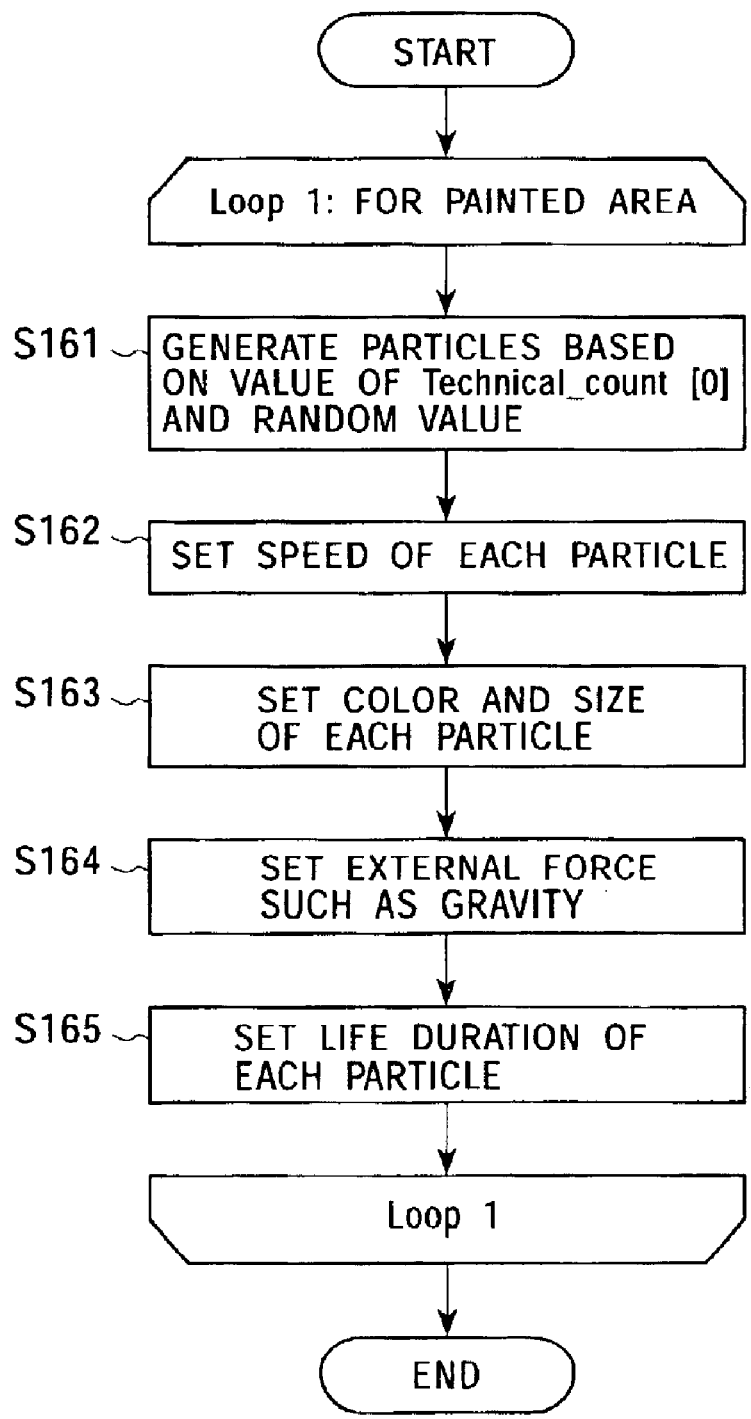
FIG. 38 is a flowchart of an ink algorithm when a particle system is applied.

FIG. 38 is a flowchart showing the ink algorithm when a particle system is applied., Hereinafter, the ink algorithm when a particle system is applied will be described.

In this case, particles are emitted from each drawing unit of a painted area or drawing object (Loop 1).

First, particles are generated based on the value of technical ink Technical_count [0] indicating the thickness of an attribute ink and on a random value (step S161).

Then, the emitting speed of each particle is set in the emitter (step S162).

Then, the color and size of each particle is set (step S163)

Then, an external force, such as gravity, which acts on the particle is set (step S164).

Then, the duration of each particle is set (step S165).

C-5. Drawing of Scene

In the above-described drawing routine, drawing information of painted attribute ink is calculated for each drawing unit forming a drawing object, and the calculation result is stored in mesh_data of each drawing unit. Further, in a process of calculating a scene, the scene is calculated based on the mesh_data of each drawing unit.

In step S7 of the drawing process routine shown in FIG. 9, a scene is drawn based on the calculation result of the scene. Hereinafter, process of drawing a scene will be described.

Figure 39:
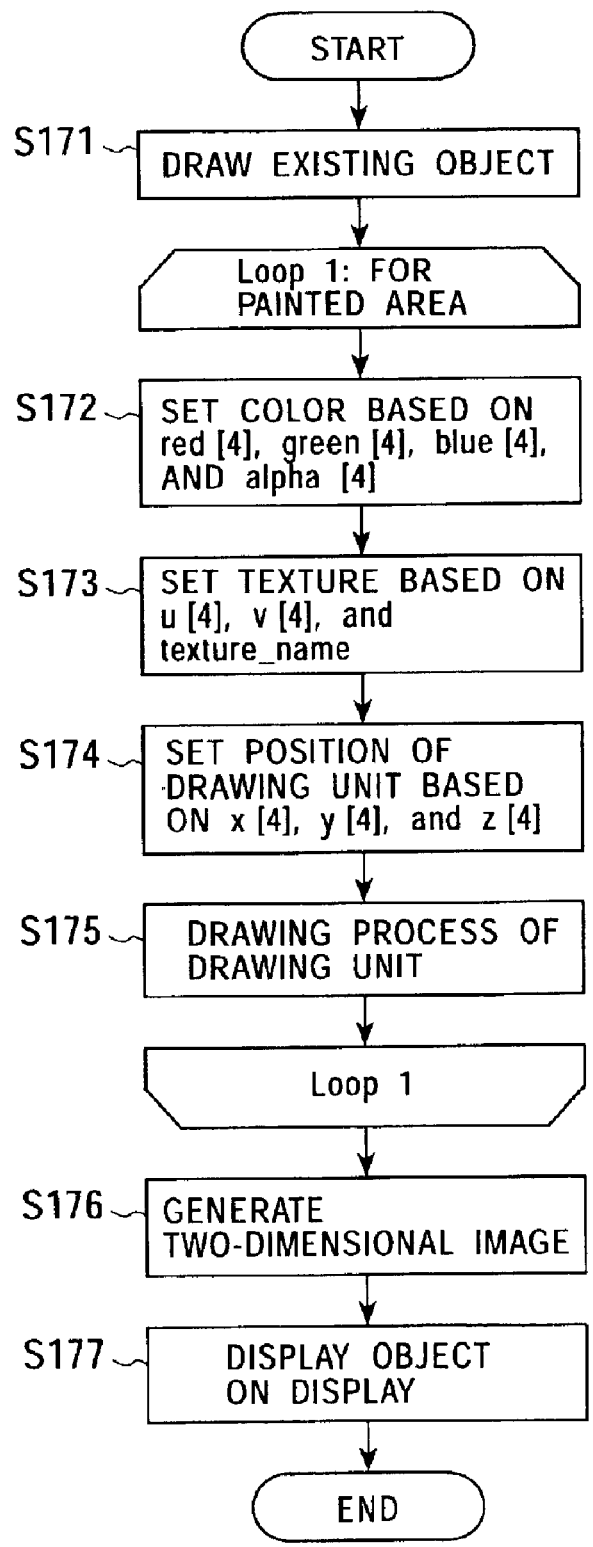
FIG. 39 is a flowchart of a process of drawing a scene.

FIG. 39 is a flowchart showing a process of drawing a scene.

First, en existing drawing object is drawn in the work area 13 in advance (step S171).

Then, a drawing process is performed to each drawing unit of the painted area, that is, the drawing object (Loop 1).

First, mesh_data for storing the drawing information of each drawing unit is referred to (see FIG. 14) so as to set a color based on parameters: red [4], green [4], blue [4], and alpha [4], of each top of the drawing unit (step S172).

Then, texture is set based on vectors u [4] and v [4] of each top of the drawing unit and on the texture name texture_name (step S173).

Next, the position of the drawing unit is set based on position information x [4], y [4], and z [4] of each top of the drawing unit (step S174).

Accordingly, a drawing process of the drawing unit is performed (step S175).

After a drawing process for each drawing unit forming the drawing object is completed, three-dimensional drawing information is coordinate-converted based on the position of a set camera, that is, a view point, so as to generate a two-dimensional image (step S176).

Then, the obtained two-dimensional image is displayed on the work area 13 of the display 111 (step S177).

Figure 40:
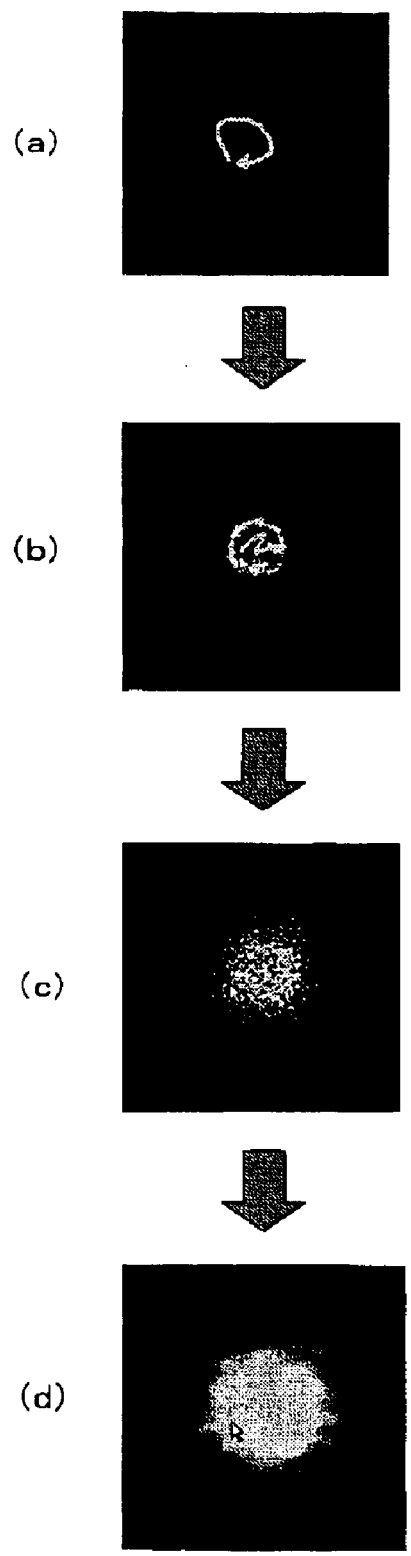
FIG. 40 shows a process of drawing with a cloud ink, which is a natural-phenomenon ink, by using a particle system.

FIG. 40 shows a process of drawing with a cloud ink, which is a natural-phenomenon ink, by applying a particle system.

The user first specifies the cloud ink in the ink area 11, and then performs a drag operation with the mouse 113 in the work are 13 so as to input a hand-drawn stroke (see (a) of FIG. 40). Then, the user fills the inside of the outline by a drag operation (see (b) of FIG. 40). The painted drawing object is divided into many minute drawing units so that a mesh is generated.

Next, a scene calculation is performed. In this case, an emitter is provided to each drawing unit. Further, particles emitted by the emitter, direction and angle of emission, emission speed, gravity and electrostatic force (attractive and repulsive forces) applied to each particle, a swirl effect, a wind effect, a turbulence effect, duration of particle, characteristics for forces, size, color, transparency, and texture are set based on the attribute parameters of the cloud ink, and the particles are emitted from each emitter (see (c) of FIG. 40).

The emitted particle has a duration and suspends in the space according to the effect of external forces until it disappears. Accordingly, an image of a moving cloud can be created (see (d) of FIG. 40).

FIG. 41 shows a process of drawing with a smoke ink, which is a natural-phenomenon ink, by applying a particle system.

The user first specifies the smoke ink in the ink area 11, and then performs a drag operation with the mouse 113 in the work are 13 so as to input a hand-drawn stroke for depicting a flowing direction of smoke (see (a) of FIG. 41).

Next, a scene calculation is performed. In this case, an emitter is provided to each drawing unit. Further, particles emitted by the emitter, direction and angle of emission, emission speed, gravity and electrostatic force (attractive and repulsive forces) applied to each particle, a swirl effect, a wind effect, a turbulence effect, duration of particle, characteristics for forces, size, color, transparency, and texture are set based on the attribute parameters of the smoke ink, and the particles are emitted from each emitter (see (b) of FIG. 41).

The emitted particle has a duration and suspends in the space according to the effect of external forces until it disappears. Accordingly, an image of a trailing smoke can be created (see (c) of FIG. 41).

Figure 42:
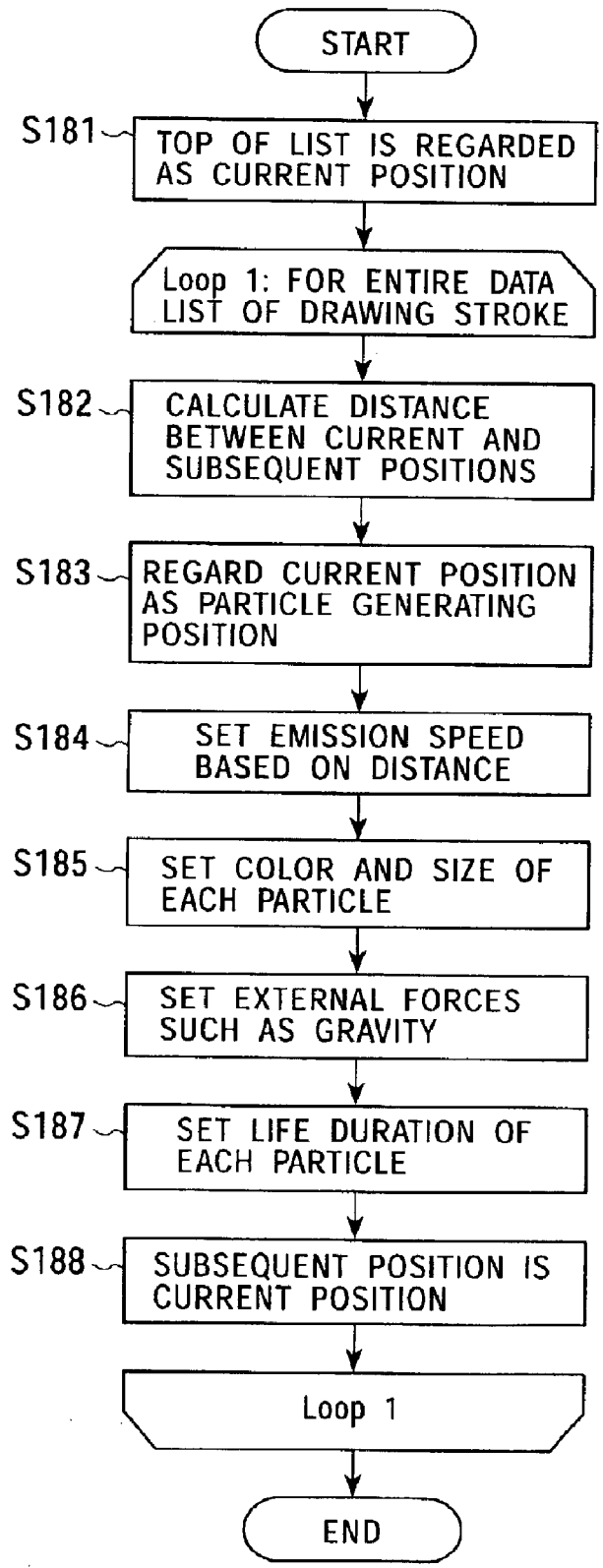
FIG. 42 is a flowchart of a process of generating animation based on stroke data.

By specifying an attribute ink and performing a drag operation with the mouse 113 in the work area 13, an animation depicted with the attribute ink can be created in real time based on the input hand-drawn stroke. FIG. 42 is a flowchart of a process for generating an animation based on stroke data.

First, the top of a list is regarded as a current position (step S181).

The hand-drawn stroke made by a drag operation in the work area 13, that is, a drawing object, is regarded as a collection of minute drawing units extending along the stroke direction. The drawing object is processed as a data list of mesh_data for storing the drawing information of each drawing unit (Loop 1).

First, the distance between the current position and the subsequent position of the drawing unit to be processed is calculated (step S182).

The current position is regarded as a particle generating position (step S183).

The emission speed of particles is set based on the obtained distance (step S184) and the color and size of each particle is also set (step S185).

Further, external forces such as gravity is set (step S186) and the duration of each particle is also set (step S187)

Then, the subsequent position becomes the current position (step S188), and the above-described drawing process of particles is repeatedly performed.

D. Drawing on Three-dimensional Canvas

The drawing interface 10 according to the embodiment realizes drawing made by a hand-drawn stroke with an attribute ink on a digital canvas. The drawing made on the digital canvas is displayed on the work area 13.

Although the work area 13 itself is a two-dimensional display plane, a drawing object drawn by a hand-drawn stroke can be layout on a three-dimensional plane by computer processing so that three-dimensional image editing processing, such as coordinate conversion and rotation, can be performed.

For example, the drawing interface 10 according to the embodiment can be applied to the above mentioned image editing system, which is disclosed in Japanese Patent Application No. 2000-209731 assigned to the applicant of the present application.

Figure 43:
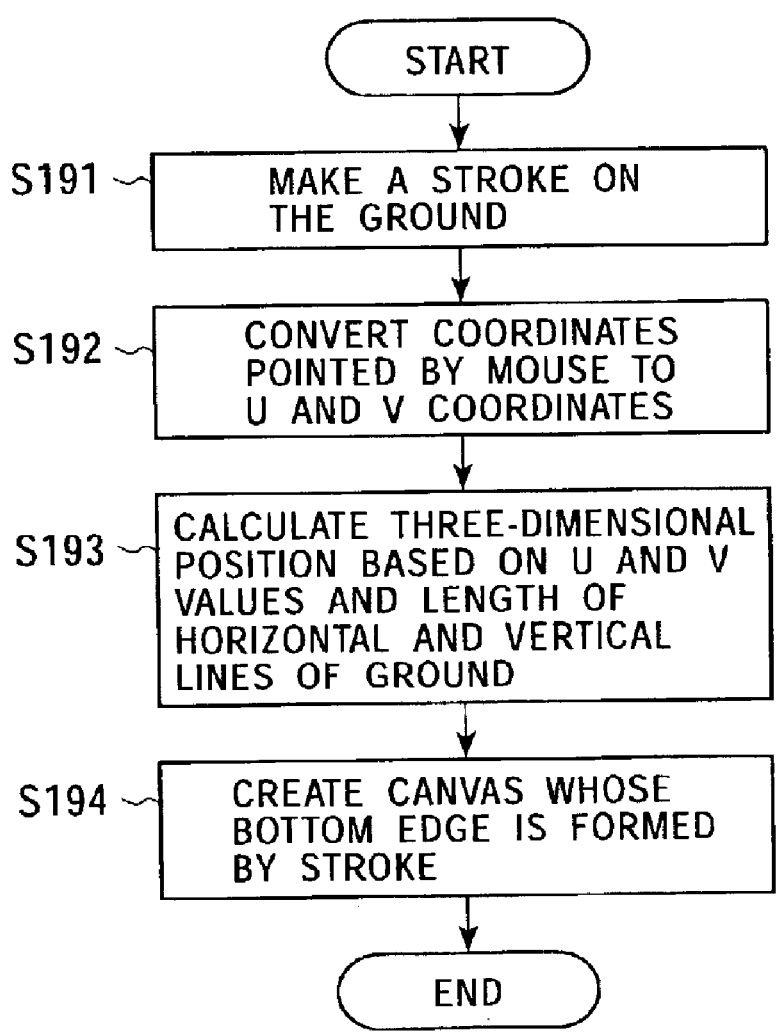
FIG. 43 is a flowchart of a process of setting a three-dimensional canvas.

FIG. 43 is a flowchart of a process for setting a three-dimensional canvas.

First, a three-dimensional space with only the horizon appears on the display screen. By making a stroke in the space (step S191), the coordinates indicated by the mouse 113 is converted to U and V coordinates of the ground (step S192).

A three-dimensional position is calculated based on the U and V values and the length of horizontal and vertical lines of the ground (step S193), and a three-dimensional canvas whose bottom edge is formed by this stroke is created (step S194).

When such a three-dimensional canvas is used, a drawing done by the user through the screen is mapped onto the canvas, and thus a three-dimensional drawing can be created. By repeating canvas setting and drawing operations, a desired scene can be created. Also, a desired three-dimensional scene can be obtained by rotating the canvas or changing the view point.

FIG. 8 shows a state where a three-dimensional canvas is generated along a stroke drawn by the user ((a) and (b)), a state where ink is painted or pasted by hand-drawn strokes on the generated three-dimensional canvas ((c) to (e)), and a state where a desired three-dimensional scene is generated by rotating the canvas (f).

An attribute ink such as a natural-phenomenon ink can be painted on the three-dimensional canvas. In this case, as described above, a drawing object is divided into drawing units so that drawing information is managed. Also, by applying such method as a cellular automaton or a particle system, an animation function for depicting an ever-changing phenomenon, such as flame or cloud, can be realized in a three-dimensional space.

Further, as shown in FIG. 44, a two dimensional drawing object can be created by hand-drawn strokes in the work area 13 (a), depth is given to the drawing object (b), and a three-dimensional drawing object can be created (c). In this case, too, three-dimensional image editing processing, such as coordinate conversion and rotation, can be performed to the drawing object. Accordingly, more realistic depiction of the drawing object can be realized.

Figure 45:
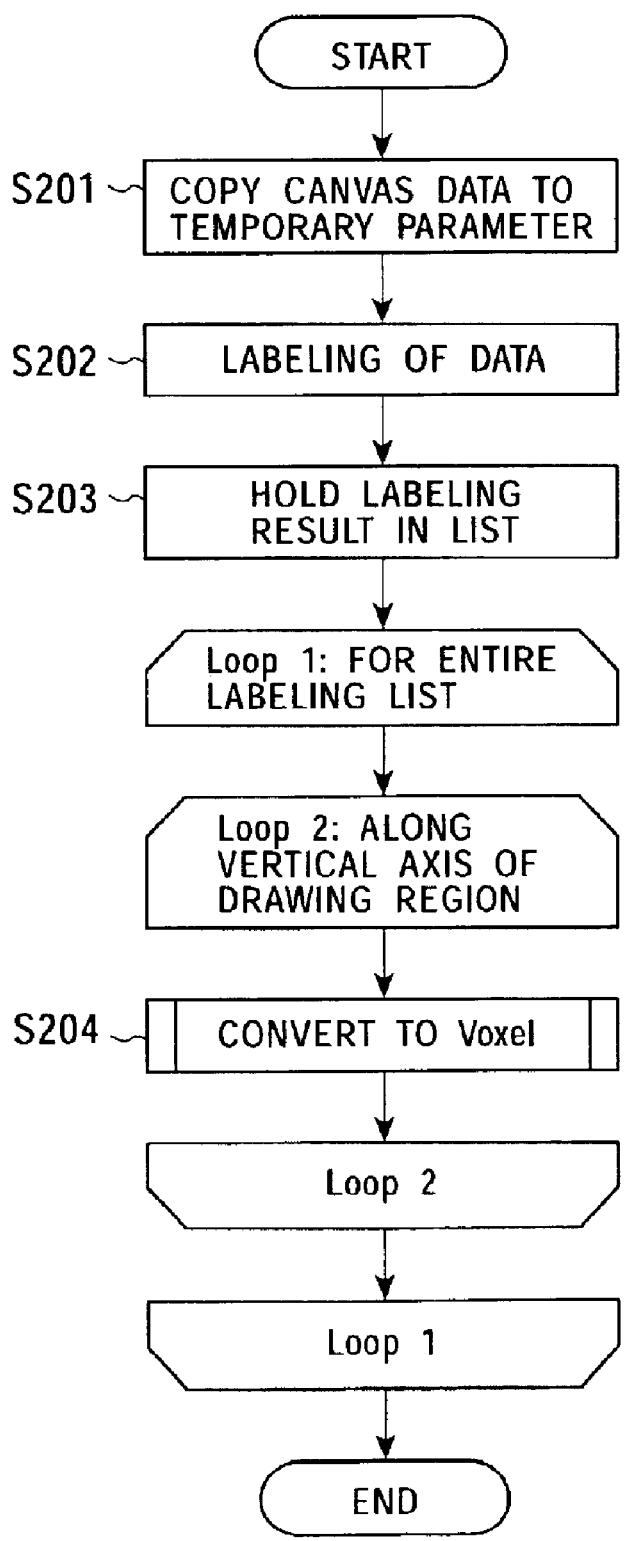
FIG. 45 is a flowchart of a process of transforming the two-dimensional drawing object created by hand-drawn strokes in the work area into the three-dimensional drawing object.

FIG. 45 is a flowchart of a process for creating a three-dimensional drawing object based on a two-dimensional object drawn by hand-drawn strokes in the work area 13. In this case, each drawing unit generated by dividing the drawing object is converted to a three-dimensional drawing unit called "Voxel".

First, data of an object drawn in the work area 13, that is, a digital canvas, is copied to a temporary parameter (step S201).

Then, the copied data is processed by labeling (step S202) and the labeling result is held in a list (step S203).

Then, a two-dimensional drawing unit is converted to a Voxel, which is a three-dimensional drawing unit, for the entire labeling list (Loop 1) along the vertical axis of the drawing region (Loop 2) (step S204).

Figure 46:
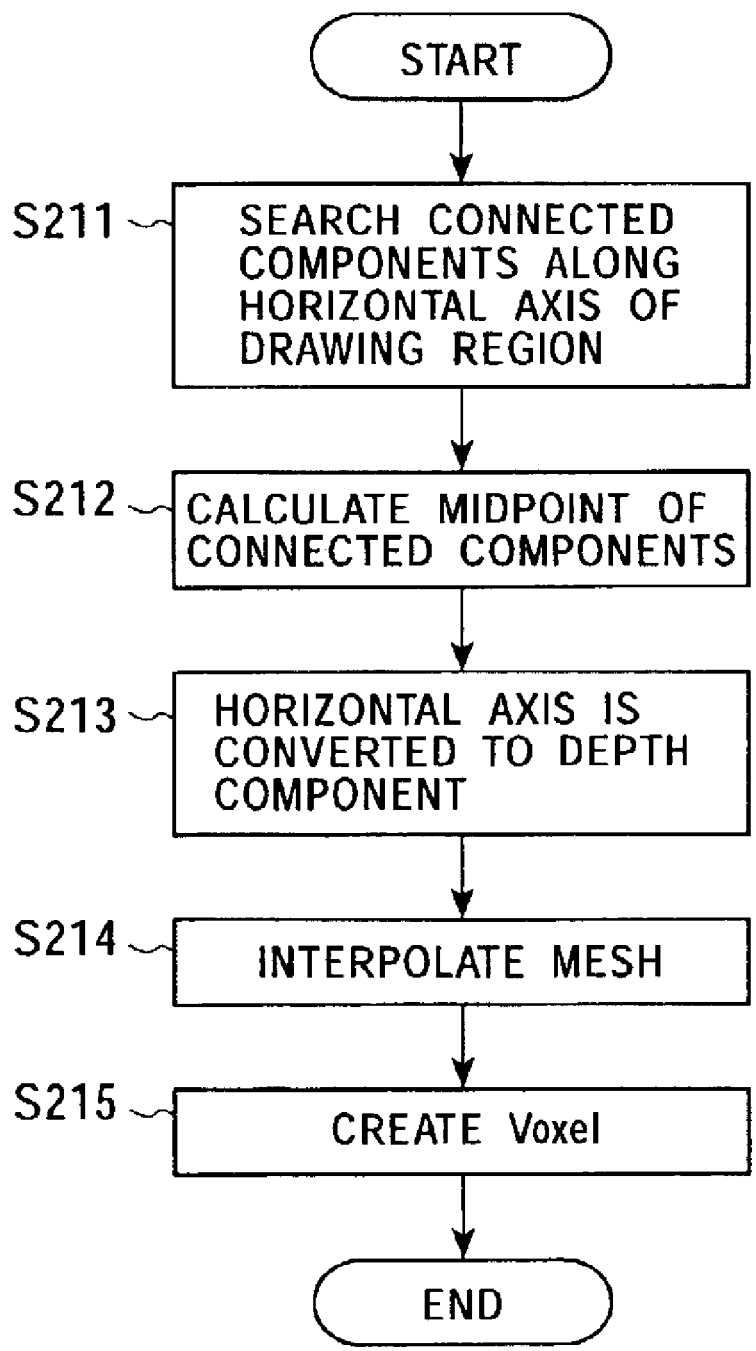
FIG. 46 is a flowchart of a process of converting each drawing unit forming a drawing object to a Voxel, which is a three-dimensional drawing unit.

FIG. 46 is a flowchart of a process for converting each drawing unit forming the drawing object to a three-dimensional drawing unit "Voxel", the process being performed in step S204 of FIG. 45.

Figure 47:
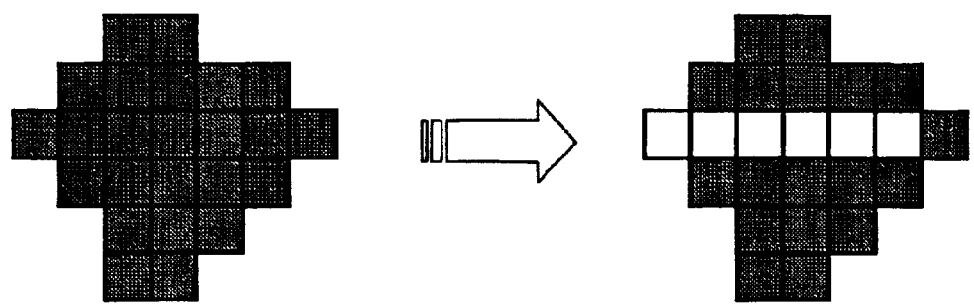
FIG. 47 shows a process of converting each drawing unit forming the drawing object into a Voxel, which is a three-dimensional drawing unit.

First, connected components are searched along the horizontal axis of the drawing region in step S211 (see FIG. 47).

Figure 48:
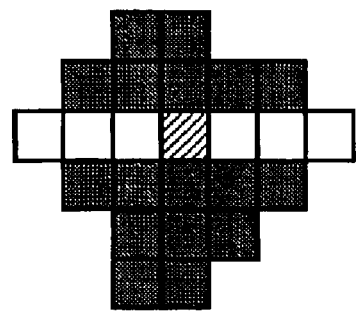
FIG. 48 shows a process of converting each drawing unit forming the drawing object into a Voxel, which is a three-dimensional drawing unit.

Then, the midpoint of the connected components is calculated in step S212 (see FIG. 48).

Figure 49:
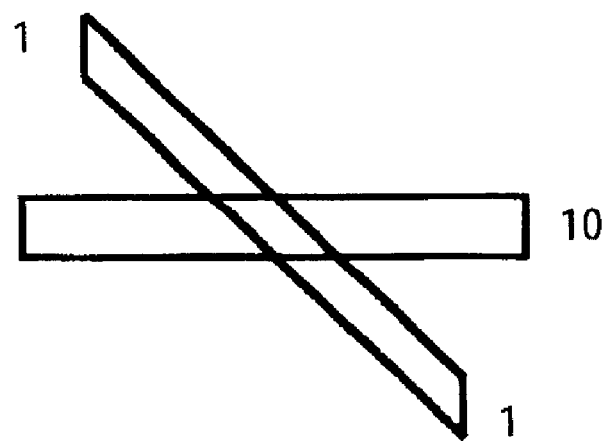
FIG. 49 shows a process of converting each drawing unit forming the drawing object into a Voxel, which is a three-dimensional drawing unit.

Then, the horizontal axis is converted to a depth component, with the midpoint being the axis (step S213). Further, drawing units are interpolated, with the midpoint being 10 and the depth point being 1 in step S214 (see FIG. 49).

Figure 50:
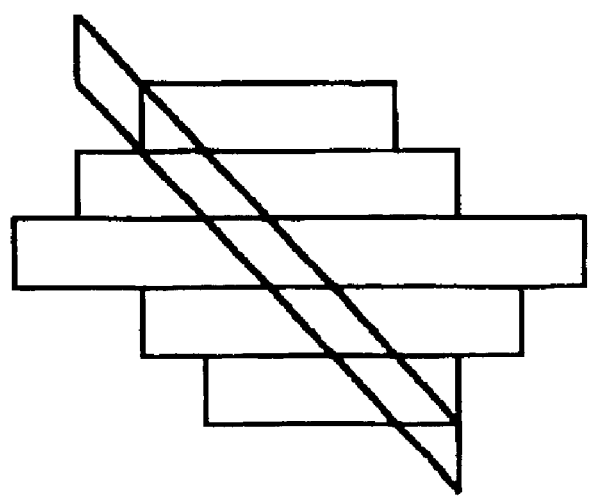
FIG. 50 shows a process of converting each drawing unit forming the drawing object into a Voxel, which is a three-dimensional drawing unit.

Also, a Voxel is created based on the relationship between the mesh and the vertical axis in step S215 (see FIG. 50).

When a drawing object is extended to a three-dimensional space, an attribute ink such as a natural-phenomenon ink can be applied to the drawing object. In this case, a Voxel is regarded as the smallest drawing unit and drawing information is managed. Also, by applying a cellular automaton or a particle system to each Voxel, an animation function for depicting an ever-changing phenomenon, such as flame or cloud, can be realized in a three-dimensional space.

E. Application of Tool

In the drawing interface 10 according to the embodiment, a function used in general document-editing processing, such as copy and paste, can be performed by a GUI operation in the work area 13 (described above).

Figure 51:
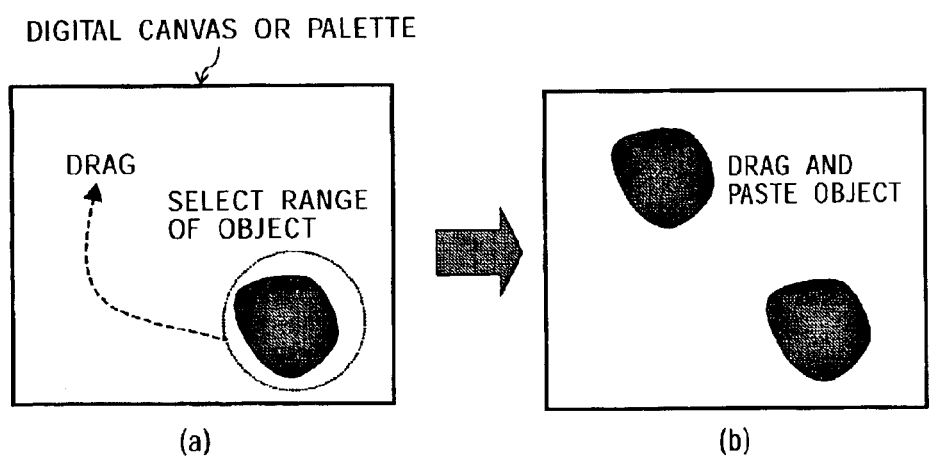
FIG. 51 shows a process of copying and pasting the drawing object in the drawing interface according to the embodiment.

For example, by selecting the range of a drawing object which is displayed on the work area 13 (see (a) of FIG. 51) and then by dragging and dropping the selected range to another position, that object can be copied (see (b) of FIG. 51).

When the drawing object is painted or pasted with an attribute ink, the attribute parameters of the original object are also copied. For example, a plurality of copies of a drawing object drawn with a flame ink can be generated.

Figure 52:
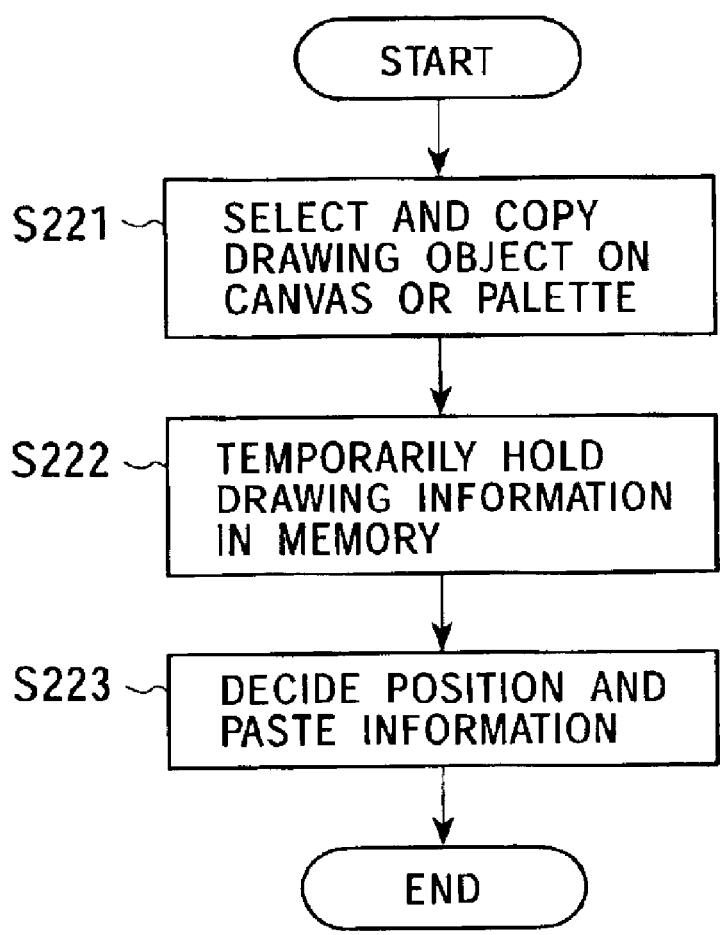
FIG. 52 is a flowchart of the process of copying and pasting the drawing object in the drawing interface according to the embodiment.

FIG. 52 is a flowchart of a process for copying and pasting a drawing object in the drawing interface 10 according to the embodiment.

First, a drawing object on the digital canvas (work area 13) or the palette area 12 is selected (or specified) so as to copy the object (step S221).

The drawing information of the selected area is temporarily held in a predetermined memory region (for example, a clipboard) in step S222.

Then, the selected drawing object is dragged and then is dropped at a desired position so as to decide the paste position. As a result, the drawing information held in the memory region is pasted in the position (step S232).

At this time, if the selected or specified drawing object is painted or pasted with an attribute ink, the attribute parameters of the original object are also copied.

F. Control Mode

In step S5 of the drawing process routine shown in FIG. 9, a control routine is performed. In the control routine, the attribute parameters of the attribute ink which is painted or pasted on a drawing object is controlled in the work area 13.

Figure 53:
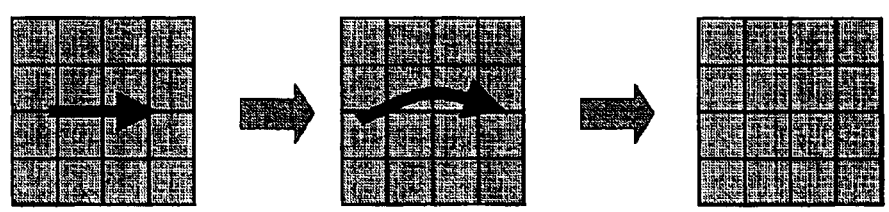
FIG. 53 shows a process of defining the direction of animation by mouse interaction.

The attribute parameters are changed by an easy GUI operation such as mouse interaction. For example, the control mode is set by pressing the right button of the mouse. By performing mouse interaction, the trail of dragging is input as the attribute parameters of the attribute ink. For example, the direction of animation can be determined in accordance with the drag direction obtained by mouse interaction (see FIG. 53).

Mode setting or mode switching for the drawing mode and the control mode is performed by, for example, a mouse operation. For example, the drawing mode can be set by pressing the left button of the mouse. The trail of dragging is input as a hand-drawn stroke. On the other hand, the control mode can be set by pressing the right button of the mouse. When mouse interaction (described above) is performed, the trail of dragging is input as the attribute parameters of the attribute ink.

Figure 54:
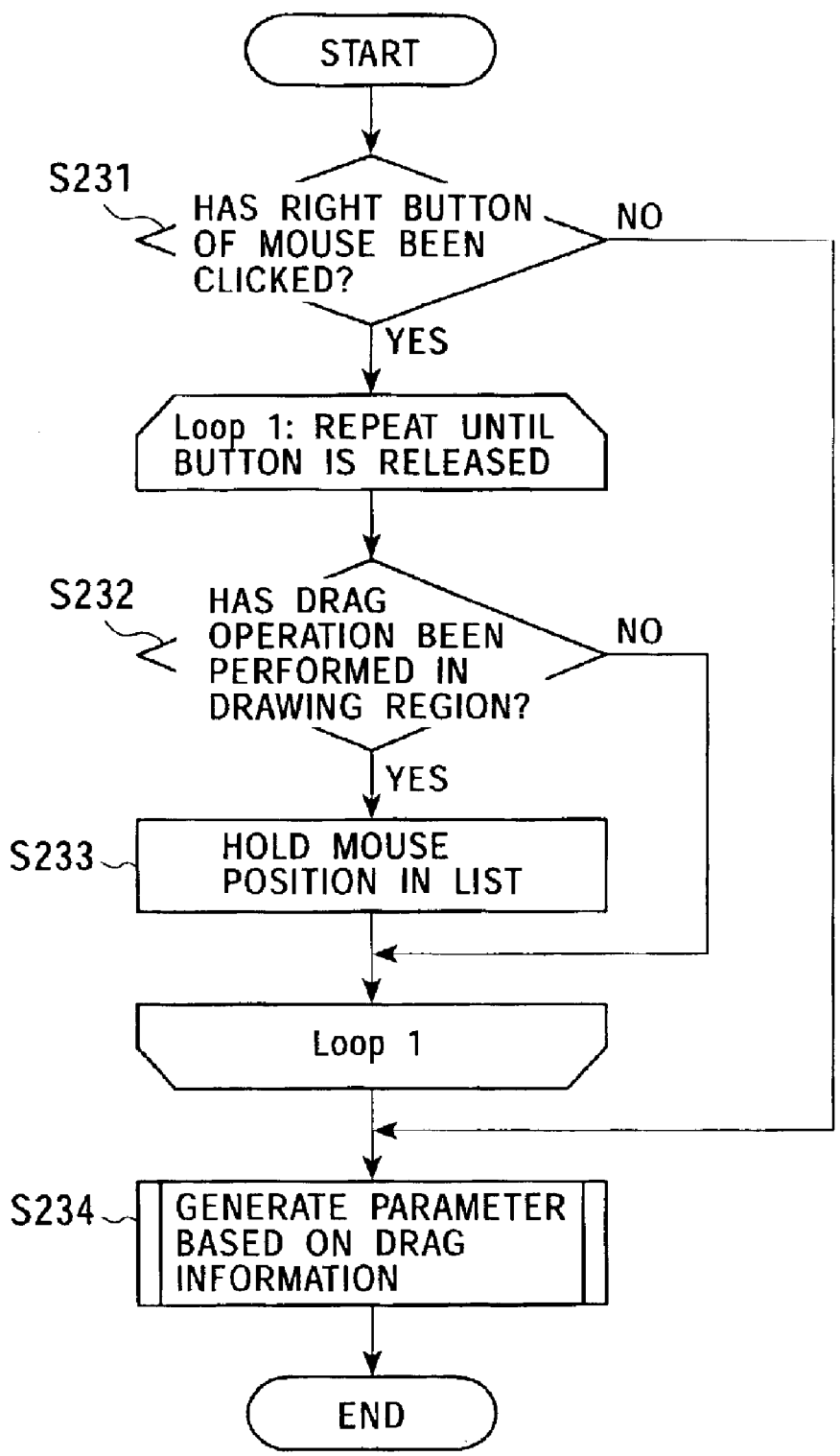
FIG. 54 is a flowchart of a process of generating attribute parameters of the attribute ink by mouse interaction under a control mode.

FIG. 54 is a flowchart of a process for generating the attribute parameters of an attribute ink by mouse interaction under the control mode.

When the right button of the mouse 113 is clicked (step S231), the system operates under the control mode until the right button is released.

When a drag operation with the mouse 113 is performed on a drawing object (step S232), the position of the mouse is sequentially held in a list (step S233).

Then, when the right button of the mouse 113 is released and the mode is changed from the control mode to the drawing mode, parameters are generated based on the obtained drag information of the mouse 113 (step 234).

Figure 55:
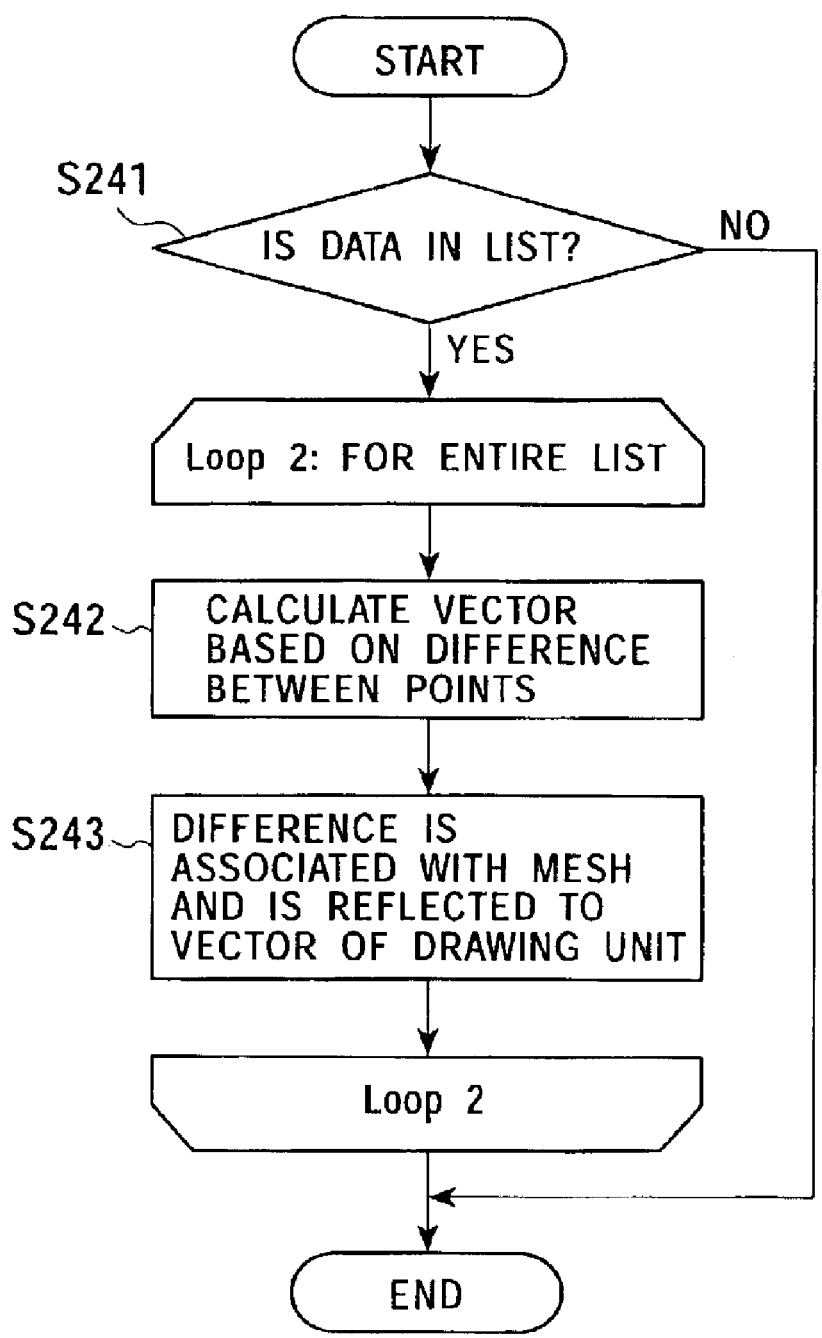
FIG. 55 is a flowchart of a process of generating the parameters based on the drag information of the mouse.

FIG. 55 is a flowchart of a process for generating parameters based on the drag information of the mouse 113, the process corresponding to step S234 of the flowchart shown in FIG. 54.

First, it is checked whether or not data is generated in the list by mouse interaction (step S241).

If data is generated, a vector is calculated based on the difference between points (step S242), and the difference is associated with each drawing unit of the object and is reflected to the vector of mesh_data (see FIG. 14) in step S243.

The present invention has been described with reference to the specific embodiment. However, it is apparent that those skilled in the art can modify the embodiment without deviating from the scope of the present invention. The present invention has been disclosed in a form of an example, and the description in this specification should not be limitedly understood. In order to determine the scope of the present invention, the attached claims should be considered.

As described above, the present invention can provide an excellent image editing apparatus, image editing method, storage medium, and computer program, for preferably creating and editing a two-dimensional or three-dimensional image in a computer system in accordance with a hand-drawn stroke input by using a mouse or the like.

Also, the present invention can provide an excellent image editing apparatus, image editing method, storage medium, and computer program, for providing an intuitive drawing interface which performs a pseudo drawing operation in which a pseudo water color or oil color is painted on a canvas in a digital space by regarding a stroke input by a user with a mouse as a hand-drawn operation with a pen or a brush.

Further, the present invention can provide an excellent image editing apparatus, image editing method, storage medium, and computer program, for painting on a canvas in a digital space by using inks which have various attributes and activities, such as texture and animation, in accordance with a stroke input by a user.

Still further, the present invention can provide an excellent image editing apparatus, image editing method, storage medium, and computer program, in which animation and various attributes can be added to a drawing object by an easy and intuitive GUI operation, without technical knowledge such as setting of parameters and description of script.

In the present invention, the user can add attributes of an ink, such as animation and texture, to a drawing object simply by selecting an arbitrary ink from among attribute inks and then painting the ink to the drawing object through the drawing interface on the desktop. All that the user has to do is to select and paint an ink. Animation and texture can be added to a two-dimensional image, a three-dimensional scene, or a three-dimensional object, without performing parameter setting or script description. A user operation in the drawing interface corresponds to drawing with paints in the real world, and anyone can easily and intuitively operate the system. The attributes of inks of the present invention include natural phenomena (cloud, fire, snow, smoke, fog, water, and so on), texture (clothes, iron, glass, rubber, and so on), and others (wool, dust, ground, and so on). These attributes include phenomena which can be painted and added and which change in accordance with a spatial or temporal change or a light source.

As methods for depicting animation and attributes, a depiction method based on a mesh using a cellular automaton and a depiction method using particles can be applied. By using these methods, a painted area is automatically calculated. In the drawing interface according to the present invention, a depiction method is connected with a painting interaction. By using these methods for depicting the attributes of an ink, attributes can be graphically expressed, and realistic attributes can be easily generated only by painting an object.

Also, the palette is prepared in the drawing interface according to the present invention. Thus, a new (or customized) ink can be prepared by mixing inks having different attributes on the palette. The inks can be mixed without technical knowledge and special operations, such as setting of parameters and description of script. Further, a water ink can be mixed with a fire ink so as to make a virtual ink, which is impossible in the real world.

Further, the drawing interface according to the present invention includes inks for supporting interaction (an ink for adjusting the thickness of an ink) as well as the attribute ink. By mixing such an ink with the attribute ink on the palette, the speed of animation and the fineness of texture can be adjusted based on a painting operation.

Also, in the drawing interface according to the present invention, a painted area is directly calculated. Therefore, the effect of the attribute ink can be checked on the display without previewing or rendering. As a result, the operation efficiency of the user significantly increases.

In the known image editing tool, technical operations such as setting of parameters and description of script must be performed for the ink attributes of the present invention. However, in the present invention, the operations are simplified and thus attributes can be easily added to a drawing object even by beginners or children.

With this easy operation, a three-dimensional scene (for example, architecture simulation) with animation can be created even by a beginner of a three-dimensional computer graphics. Also, such image editing can be introduced to classrooms for children. For example, by using a two-dimensional image, a Christmas card can be made by using a snow ink, or diary with animation can be described. Also, by mixing a plurality of inks, various inks having attributes and animation which do not exist in the real world can be prepared so that special effects of the inks can be obtained.

In the image editing apparatus and method according to the present invention, a two-dimensional image is formed based on a bit map, and thus the two-dimensional image can be easily transferred to another image editing system.

Also, the drawing interface according to the present invention can be applied not only for painting but also for reflecting ink attributes to a sentence. For example, by writing characters with a water ink, a swaying sentence can be generated. This method can be applied as an effect to Web content.

Further, in the drawing interface according to the present invention, a three-dimensional object can be deformed by applying an ink. For example, by applying a water ink to a portion to be deformed and by dragging that portion with a mouse, deformation based on the motion of water can be performed. In the present invention, the user can perform such a deformation operation without being aware of polygons and tops of a three-dimensional model.

Although many known deformation methods using a clay attribute exist, it is difficult to sharply form a portion of an object by using those methods. On the other hand, in the present invention, a deformation operation can be easily performed simply by applying an ink partially and dragging the portion to be deformed with a mouse.

What is claimed is:

1. An image editing apparatus for drawing on a display in accordance with a hand-drawn stroke input by a user, the apparatus comprising:

a drawing interface unit which displays on the display an ink area provided with at least one usable ink and a work area for performing drawing;

an input unit for inputting coordinates indicated by the user on the display; and a drawing processing unit for processing a drawing object in the work area based on the input by the user, wherein the ink area includes color inks defined in the RGB color space and attribute inks having an animation function in which the drawing object continuously changes according to set attribute parameters, and the drawing processing unit associates an ink selected by using the input unit in the ink area with the hand-drawn stroke to be input by using the input unit, associates the hand-drawn stroke input to the work area by using the input unit with the drawing object, and draws the drawing object by using the associated ink to paint the drawing object.

2. The apparatus according to claim 1, wherein the attribute inks include a natural-phenomenon ink for depicting a dynamic natural phenomenon which continuously changes in accordance with the attribute parameters, such as water, cloud, snow, flame, and smoke.

3. The apparatus according to claim 1, wherein the drawing interface unit further displays a palette area for mixing a plurality of inks, and the drawing processing unit associates an ink selected by using the input unit in the ink area or the palette area with the hand-drawn stroke to be input by using the input unit and sequentially associates the hand-drawn stroke made by using the input unit in the palette area with the drawing object, thereby mixing two or more inks associated with the same drawing object.

4. The apparatus according to claim 3, wherein the drawing processing unit mixes two or more attribute inks by calculating the average of the attribute parameters of each attribute ink.

5. The apparatus according to claim 1, wherein the drawing processing unit forms a mesh by dividing the drawing object in the work area and/or the palette area into minute drawing units and manages ink information for each of the drawing units.

6. The apparatus according to claim 1, wherein the drawing processing unit forms a mesh by dividing the drawing object in the work area and/or the palette area into minute drawing units, calculates an interaction such as an attractive or repulsive force between adjoining drawing units, and changes the attribute parameters of each drawing unit based on the calculation result, thereby generating the animation function of the attribute ink.

7. The apparatus according to claim 1, wherein the drawing processing unit forms a mesh by dividing the drawing object in the work area and/or the palette area into minute drawing units, and emits particles corresponding to the attribute ink from an emitter provided in each drawing unit so as to calculate the animation function of the attribute ink.

8. The apparatus according to claim 7, wherein the drawing processing unit sets the particles emitted from the emitter, direction and angle of emission, emission speed, gravity and an electrostatic force including attractive and repulsive forces applied to the particles, a swirl effect, a wind effect, a turbulence effect, and the duration, characteristics for the forces, size, color, transparency, and texture of each particle based on the attribute parameters of the attribute ink, and also provides an obstacle in a region where the particles act.

9. The apparatus according to claim 1,
wherein a technical ink for adjusting the thickness of the attribute ink is provided in the ink area, and
the drawing processing unit forms a mesh by dividing the drawing object in the work area and/or the palette area into minute drawing units, strengthens an attractive force or weakens a repulsive force between the adjoining drawing units so as to calculate the attribute parameters when a technical ink for increasing the thickness of the attribute ink is applied to the drawing object, and weakens an attractive force or strengthens a repulsive force between the adjoining drawing units so as to calculate the attribute parameters when a technical ink for decreasing the thickness of the attribute ink is applied to the drawing object.

10. The apparatus according to claim 1,
wherein a technical ink for adjusting the fineness of the attribute ink is provided in the ink area, and
the drawing processing unit forms a mesh by dividing the drawing object in the work area and/or the palette area into minute drawing units, combines a plurality of adjoining drawing units into one drawing unit when a technical ink for decreasing the fineness of the attribute ink is applied to the drawing object, and divides one drawing unit into a plurality of drawing units when a technical ink for increasing the fineness of the attribute ink is applied to the drawing object.

11. The apparatus according to claim 1, wherein the drawing processing unit adds depth to the drawing object created in the work area so that the drawing object created in the two-dimensional work area is transformed to a three-dimensional drawing object.

12. The apparatus according to claim 1, wherein the drawing processing unit converts each of the drawing units forming the drawing object created in the work area to a three-dimensional Voxel and performs calculation for generating an animation function for Voxels to which the attribute ink is applied so that the animation function is extended to three-dimensional space.

13. The apparatus according to claim 1, wherein the drawing processing unit changes the attribute parameters of the attribute ink associated with the drawing object based on the stroke input by using the input unit.

14. An image editing method for drawing on a display in accordance with a hand-drawn stroke input by a user, the method comprising:
a drawing interface displaying step for displaying on the display an ink area provided with at least one usable ink and a work area for performing drawing;
an input step for inputting coordinates indicated by the user on the display; and
a drawing processing step for processing a drawing object in the work area based on the input by the user,
wherein the ink area includes color inks defined in the RGB color space and attribute inks having an animation function in which the drawing object continuously changes according to set attribute parameters, and
in the drawing processing step, an ink selected in the ink area in the input step is associated with the hand-drawn stroke to be input in the input step, the hand-drawn stroke input to the work area in the input step is associated with the drawing object, and the drawing object is drawn by using the associated ink so that the drawing object is painted.

15. The method according to claim 14, wherein the attribute inks include a natural-phenomenon ink for depicting a dynamic natural phenomenon which continuously changes in accordance with the attribute parameters, such as water, cloud, snow, flame, and smoke.

16. The method according to claim 14,
wherein, in the drawing interface displaying step, a palette area for mixing a plurality of inks is further displayed, and
in the drawing processing step, an ink selected in the ink area or the palette area in the input step is associated with the hand-drawn stroke to be input in the input step and the hand-drawn stroke made in the palette area in the input step is sequentially associated with the drawing object, whereby two or more inks associated with the same drawing object are mixed.

17. The method according to claim 16, wherein, in the drawing processing step, two or more attribute inks are mixed by calculating the average of the attribute parameters of each attribute ink.

18. The method according to claim 14, wherein, in the drawing processing step, a mesh is formed by dividing the drawing object in the work area-and/or the palette area into minute drawing units and ink information is managed for each of the drawing units.

19. The method according to claim 14, wherein, in the drawing processing step, a mesh is formed by dividing the drawing object in the work area and/or the palette area into minute drawing units, an interaction such as an attractive or repulsive force between adjoining drawing units is calculated, and the attribute parameters of each drawing unit are changed based on the calculation result, whereby the animation function of the attribute ink is generated.

20. The method according to claim 14, wherein, in the drawing processing step, a mesh is formed by dividing the drawing object in the work area and/or the palette area into minute drawing units, and particles corresponding to the attribute ink are emitted from an emitter provided in each drawing unit so that the animation function of the attribute ink is calculated.

21. The method according to claim 20, wherein, in the drawing processing step, the particles emitted from the emitter, direction and angle of emission, emission speed, gravity and an electrostatic force including attractive and repulsive forces applied to the particles, a swirl effect, a wind effect, a turbulence effect, and the duration, characteristics for the forces, size, color, transparency, and texture of each particle are set based on the attribute parameters of the attribute ink, and an obstacle is also provided in a region where the particles act.

22. The method according to claim 14, wherein a technical ink for adjusting the thickness of the attribute ink is provided in the ink area, and in the drawing processing step, a mesh is formed by dividing the drawing object in the work area and/or the palette area into minute drawing units, an attractive force is strengthened or a repulsive force is weakened between the adjoining drawing units so as to calculate the attribute parameters when a technical ink for increasing the thickness of the attribute ink is applied to the drawing object, and an attractive force is weakened or a repulsive force is strengthened between the adjoining drawing units so as to calculate the attribute parameters when a technical ink for decreasing the thickness of the attribute ink is applied to the drawing object.

23. The method according to claim 14, wherein a technical ink for adjusting the fineness of the attribute ink is provided in the ink area, and in the drawing processing step, a mesh is formed by dividing the drawing object in the work area and/or the palette area into minute drawing units, a plurality of adjoining drawing units are combined into one drawing unit when a technical ink for decreasing the fineness of the attribute ink is applied to the drawing object, and one drawing unit is divided into a plurality of drawing units when a technical ink for increasing the fineness of the attribute ink is applied to the drawing object.

24. The method according to claim 14, wherein, in the drawing processing step, depth is added to the drawing object created in the work area so that the drawing object created in the two-dimensional work area is transformed to a three-dimensional drawing object.

25. The method according to claim 14, wherein, in the drawing processing step, each of the drawing units forming the drawing object created in the work area is converted to a three-dimensional Voxel and calculation for generating an animation function for Voxels to which the attribute ink is applied is performed so that the animation function is extended to three-dimensional space.

26. The method according to claim 14, wherein, in the drawing processing step, the attribute parameters of the attribute ink associated with the drawing object is changed based on the stroke input in the input step.

27. A storage medium for physically storing computer readable software, which performs in a computer system an image editing process for drawing on a display in accordance with a hand-drawn stroke input by a user, the computer software comprising:

a drawing interface displaying step for displaying on the display an ink area provided with at least one usable ink and a work area for performing drawing;

an input step for inputting coordinates indicated by the user on the display; and a drawing processing step for processing a drawing object in the work area based on the input by the user, wherein the ink area includes color inks defined in the RGB color space and attribute inks having an animation function in which the drawing object continuously changes according to set attribute parameters, and in the drawing processing step, an ink selected in the ink area in the input step is associated with the hand-drawn stroke to be input in the input step, the hand-drawn stroke input to the work area in the input step is associated with the drawing object, and the drawing object is drawn by using the associated ink so that the drawing object is painted.

28. A computer program for performing in a computer system an image editing process for drawing on a display in accordance with a hand-drawn stroke input by a user, the computer program comprising:

a drawing interface displaying step for displaying on the display an ink area provided with at least one usable ink and a work area for performing drawing;

an input step for inputting coordinates indicated by the user on the display; and a drawing processing step for processing a drawing object in the work area based on the input by the user, wherein the ink area includes color inks defined in the RGB color space and attribute inks having an animation function in which the drawing object continuously changes according to set attribute parameters, and in the drawing processing step, an ink selected in the ink area in the input step is associated with the hand-drawn stroke to be input in the input step, the hand-drawn stroke input to the work area in the input step is associated with the drawing object, and the drawing object is drawn by using the associated ink so that the drawing object is painted.

* * * * *